United States Patent
Wang et al.

(10) Patent No.: US 12,461,779 B2
(45) Date of Patent: Nov. 4, 2025

(54) METHOD AND APPARATUS FOR CONTROLLING RUNNING OF OPERATING SYSTEM, AND EMBEDDED SYSTEM AND CHIP

(71) Applicant: SUZHOU METABRAIN INTELLIGENT TECHNOLOGY CO., LTD., Jiangsu (CN)

(72) Inventors: Endong Wang, Jiangsu (CN); Jiaming Huang, Jiangsu (CN); Ming Sun, Jiangsu (CN); Jin Chen, Jiangsu (CN); Chaofan Chen, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/549,718

(22) PCT Filed: Apr. 28, 2023

(86) PCT No.: PCT/CN2023/091864
§ 371 (c)(1),
(2) Date: Sep. 8, 2023

(87) PCT Pub. No.: WO2024/221465
PCT Pub. Date: Oct. 31, 2024

(65) Prior Publication Data
US 2025/0036463 A1    Jan. 30, 2025

(51) Int. Cl.
*G06F 9/48* (2006.01)
*G06F 9/4401* (2018.01)
(52) U.S. Cl.
CPC ......... *G06F 9/4881* (2013.01); *G06F 9/4406* (2013.01); *G06F 9/4812* (2013.01)

(58) Field of Classification Search
CPC ..... G06F 9/4881; G06F 9/4406; G06F 9/4812
(Continued)

(56) References Cited

U.S. PATENT DOCUMENTS 5,473,771 A * 12/1995 Burd ............... G06F 11/2097
709/248
5,706,424 A * 1/1998 Whittaker ........ G06F 11/2733
714/48
(Continued)

FOREIGN PATENT DOCUMENTS

| CN | 1791862 A | 6/2006 |
|---|---|---|
| CN | 115237480 A | 10/2011 |

(Continued)

OTHER PUBLICATIONS

International Search Report received for PCT Serial No. PCT/CN2023/091864 on Apr. 28, 2023, 3 pgs.
(Continued)

*Primary Examiner* — Paul R. Myers
(74) *Attorney, Agent, or Firm* — Merchant & Gould P.C.

(57) ABSTRACT

Provided in the embodiments of the present disclosure are a method and apparatus for controlling running of an operating system, and an embedded system and a chip. The embedded system includes a chip and at least two operating systems. The chip includes a processor, a hardware controller, a first bus, and a second bus. The bandwidth of the first bus is higher than the bandwidth of the second bus; the first bus is configured as a multi-master and multi-slave mode; and the second bus is configured as a one-master and multi-slave mode. The at least two operating systems are configured to run on the basis of the processor; the at least two operating systems are configured to communicate with (Continued)

each other by the first bus; and the at least two operating systems are configured to control the hardware controller by the second bus.

19 Claims, 8 Drawing Sheets

(58) Field of Classification Search
USPC .................................................. 713/2
See application file for complete search history.

(56) References Cited

U.S. PATENT DOCUMENTS

| | | | | |
|---|---|---|---|---|
| 5,904,733 A * | 5/1999 | Jayakumar | ............ | G06F 15/177 713/1 |
| 6,286,110 B1 * | 9/2001 | Klein | ................ | G06F 11/1474 714/10 |
| 7,281,082 B1 * | 10/2007 | Knapp | ............. | H03K 19/17744 326/39 |
| 8,271,700 B1 * | 9/2012 | Annem | ................... | G06F 13/28 710/22 |
| 8,429,276 B1 * | 4/2013 | Kumar | ................ | G06F 9/5077 718/1 |
| 2002/0193989 A1 * | 12/2002 | Geilhufe | ................ | G10L 15/26 704/E15.045 |
| 2005/0235084 A1 * | 10/2005 | Nariai | ................ | G06F 13/4022 710/316 |
| 2005/0240669 A1 * | 10/2005 | Khanna | ............... | G06F 11/3447 709/225 |
| 2005/0251806 A1 | 11/2005 | Auslander | | |
| 2005/0289268 A1 * | 12/2005 | Miller | ................ | G06F 13/4054 710/110 |
| 2006/0039468 A1 * | 2/2006 | Emerson | ............. | G06F 11/2294 375/240.24 |
| 2006/0184836 A1 * | 8/2006 | Al-Omari | ........... | G06F 11/2268 714/45 |
| 2007/0050770 A1 | 3/2007 | Geisinger | | |
| 2007/0168635 A1 * | 7/2007 | Allen | ................... | G06F 9/5077 711/173 |
| 2008/0307440 A1 | 12/2008 | Fujimoto | | |
| 2008/0320194 A1 * | 12/2008 | Vega | ..................... | G06F 9/4812 710/263 |
| 2009/0031175 A1 * | 1/2009 | Aggarwal | ............... | G06F 17/18 712/E9.086 |
| 2009/0077365 A1 * | 3/2009 | Masuyama | ......... | G06F 11/3476 713/2 |
| 2009/0241122 A1 * | 9/2009 | Wong | .................... | G06F 9/5077 718/104 |
| 2010/0067394 A1 * | 3/2010 | Laipio | ................... | H04W 24/08 370/252 |
| 2011/0010713 A1 * | 1/2011 | Matsumoto | ........ | G06F 9/45541 718/1 |
| 2011/0153940 A1 * | 6/2011 | Lee | ....................... | G06F 15/167 711/E12.001 |
| 2012/0143838 A1 * | 6/2012 | Ross | ................... | G06F 9/30105 707/704 |
| 2014/0156905 A1 * | 6/2014 | Butcher | .................. | G06F 13/36 710/315 |
| 2015/0039795 A1 * | 2/2015 | Hur | ..................... | G06F 13/4022 710/110 |
| 2015/0121152 A1 | 4/2015 | Chen | | |
| 2017/0213053 A1 | 7/2017 | Areno | | |
| 2017/0344360 A1 * | 11/2017 | Jayapaul | ............... | G06F 9/4406 |
| 2019/0156039 A1 | 5/2019 | Harsany | | |
| 2019/0286590 A1 * | 9/2019 | Chou | ................... | G06F 13/362 |

FOREIGN PATENT DOCUMENTS

| | | |
|---|---|---|
| CN | 115379512 A | 11/2022 |
| CN | 115421871 A | 12/2022 |

OTHER PUBLICATIONS

Japanese Office Action received for JP Application No. 2023-580595 on Jul. 9, 2025, 6 pgs.

European Partial Search Report received for EP Application No. 23817286.0 on Jul. 30, 2024, 10 pgs.

* cited by examiner

METHOD AND APPARATUS FOR CONTROLLING RUNNING OF OPERATING SYSTEM, AND EMBEDDED SYSTEM AND CHIP

CROSS-REFERENCE TO RELATED APPLICATION

The present application is a National Stage Filing of PCT International Application No. PCT/CN2023/091864 filed on Apr. 28, 2023, which is incorporated herein by reference in its entirety.

TECHNICAL FIELD

The embodiments of the present disclosure relate to the field of computers, and in particular, to a method and apparatus for controlling running of an operating system, and an embedded system and a chip.

BACKGROUND

Most of the current devices such as servers, personal computers and industrial personal computers use a system architecture of operating system and hardware equipment, for example, hardware logic devices such as Complex Programmable Logic Devices (CPLD), Embedded Controller (EC) chips or control chips, to achieve device control. However, the use of the hardware logic devices such as the CPLD, the EC chip and the control chip inevitably leads to an increase in system costs, and systems needs to interact with each other across devices due to the increase of the hardware logic devices, thus seriously affecting the running efficiency of the operating system.

No effective solutions have been proposed for problems of low running efficiency of the operating system in a related art.

SUMMARY

A first aspect provides an embedded system, which includes a chip and at least two operating systems.

The chip includes a processor, a hardware controller, a first bus, and a second bus. The bandwidth of the first bus is higher than the bandwidth of the second bus; the first bus is configured as a multi-master and multi-slave mode; and the second bus is configured as a one-master and multi-slave mode. The at least two operating systems run on the basis of the processor; the at least two operating systems communicate with each other by means of the first bus; and the at least two operating systems control the hardware controller by means of the second bus.

A second aspect provides another embedded system, which includes a first operating system, a second operating system, a controller, and a processor. The first operating system and the second operating system run on the basis of a processor. The controller is configured to detect a running state of the first operating system during running, and control, according to the running state, processor resources used by the first operating system.

A third aspect provides a method for controlling running of an operating system. The method includes the following operations.

A running state of a first operating system during running is detected, and the first operating system and a second operating system run on the basis of a processor. Processor resources used by the first operating system are controlled according to the running state.

A fourth aspect provides a apparatus for controlling running of an operating system. The apparatus includes a first detection component and a control component.

The first detection component is configured to detect a running state of a first operating system during running. The first operating system and a second operating system run on the basis of a processor.

The control component is configured to control, according to the running state, processor resources used by the first operating system.

A fifth aspect further provides a chip. The chip includes a programmable logic circuit and at least one of executable instructions. The chip runs in an electronic device and is configured to implement steps in any one of the above method embodiments.

A sixth aspect further provides a Baseboard Management Controller (BMC) chip, which includes a storage unit and a processing unit connected to the storage unit. The storage unit is configured to store a program; and the processing unit is configured to run the program to execute steps in any one of the above method embodiments.

A seventh aspect further provides a mainboard, which includes: at least one processor; and at least one memory, configured to store at least one program. When the at least one program is performed by the at least one processor, the at least one processor is enabled to implement steps in any one of the above method embodiments.

An eighth aspect further provides a server, which includes a processor, a communication interface, a memory, and a communication bus. The processor, the communication interface, and the memory communicate with each other by means of the communication bus. The memory is configured to store a computer program. The processor is configured to implement steps in any one of the above method embodiments when executing the program stored in the memory.

A ninth aspect further provides a non-transitory readable storage medium. The non-volatile readable storage medium stores a computer program. Steps in any one of the above method embodiments are executed when the computer program is configured to run.

A tenth aspect further provides an electronic device. The electronic device includes a memory and a processor. The memory is configured to store a computer program. The processor is configured to run the computer program to execute steps in any one of the above method embodiments.

DETAILED DESCRIPTION OF THE INVENTION

The embodiments of the present disclosure are described below in detail with reference to the drawings and the embodiments.

It is to be noted that terms "first", "second" and the like in the description, claims and the above-mentioned drawings of the present disclosure are used for distinguishing similar objects rather than describing a specific sequence or a precedence order.

Figure 1:
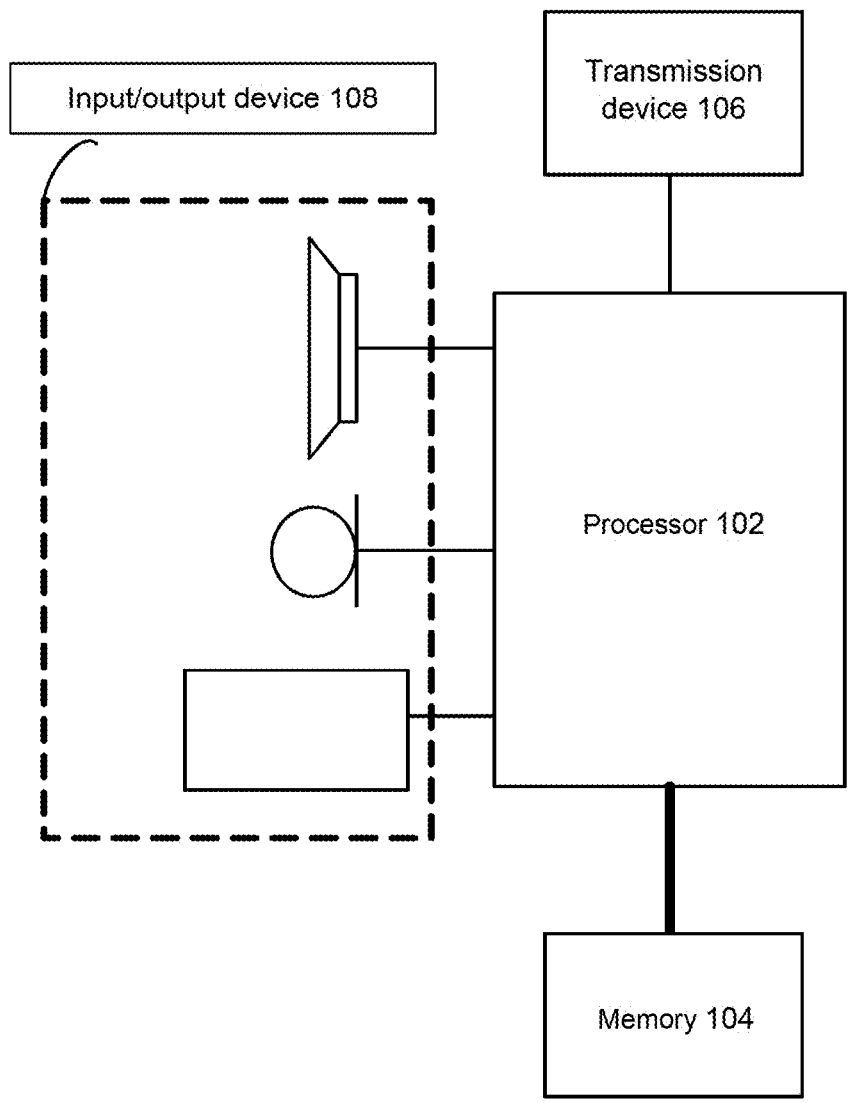
FIG. 1 is a schematic diagram of a hardware environment of a method for controlling running of an operating system according to an embodiment of the present disclosure.

The method embodiments provided in the embodiments of the present disclosure may be executed in a server, a computer terminal, a device terminal, or a similar computing apparatus. Taking running on the server as an example, FIG. 1 is a schematic diagram of a hardware environment of a method for controlling running of an operating system according to an embodiment of the present disclosure. As shown in FIG. 1, the server may include one or more (there is only one shown in FIG. 1) processors 102 (the processors 102 may include, but are not limited to, processing apparatuses such as microprocessors MCU or programmable logic devices FPGA) and a memory 104 configured to store data. In an embodiment of the present disclosure, the server may further include a transmission device 106 configured to achieve a communication function and an input/output device 108. Those skilled in the art may understand that the structure shown in FIG. 1 is only for schematic purposes, which does not limit the structure of the above server. For example, the server may further include more or less components than those shown in FIG. 1, or have different configurations that are equivalent or more functional than those shown in FIG. 1.

The memory 104 may be configured to store a computer program, for example, a software program and a component of application software, such as a computer program corresponding to a method for controlling running of an operating system in the embodiments of the present disclosure. The processor 102 runs the computer program stored in the memory 104, so as to execute various functional applications and data processing, that is, to realize the above method. The memory 104 may include a high-speed random-access memory, and may further include a non-volatile memory, such as one or more magnetic disk memory apparatuses, a flash memory device, or other non-volatile solid-state memory devices. In some embodiments, the memory 104 may include memories remotely disposed relative to the processor 102. These remote memories may be connected to a server via a network. Examples of the above network include, but are not limited to, the Internet, an intranet, a local area network, a mobile communication network, and a combination thereof.

The transmission device 106 is configured to receive or send data via the network. The optional example of the above network may include a wireless network provided by a communication provider of the server. In an example, the transmission device 106 includes a Network Interface Controller (NIC), and may be connected to other network devices by using a base station, so as to communicate with the Internet. In an example, the transmission device 106 is a Radio Frequency (RF) component, which is configured to communicate with the Internet in a wireless manner.

Figure 2:
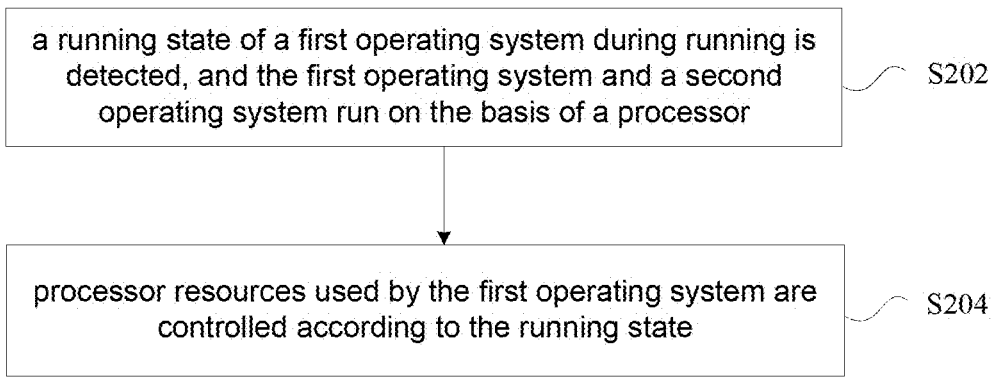
FIG. 2 is a flowchart of a method for controlling running of an operating system according to an embodiment of the present disclosure.

This embodiment provides a method for controlling running of an operating system. The method is applied to the hardware environment above. FIG. 2 is a flowchart of a method for controlling running of an operating system according to an embodiment of the present disclosure. As shown in FIG. 2, the flow includes the following steps.

At S202, a running state of a first operating system during running is detected, and the first operating system and a second operating system run on the basis of a processor.

At S204, processor resources used by the first operating system are controlled according to the running state.

By means of the steps, the first operating system and the second operating system run on the basis of the processor, to detect the running state of the first operating system during running, and control, according to the running state, the processor resources used by the first operating system. Since both the first operating system and the second operating system run on the basis of the same processor, addition and deployment of hardware devices are avoided, system costs are reduced, and the processor resources used by the operating system may be controlled during the running of the operating system, such that the processor resources may be rationally used to support the running between systems. Therefore, the technical problem of low running efficiency of the operating system may be solved, thereby achieving the technical effect of improving the running efficiency of the operating system.

An execution subject of the above steps may be a server, a device, a mainboard, a chip, a processor, an embedded system, and the like, and is not limited herein.

In some embodiments of the present disclosure, the first operating system and the second operating system may, but are not limited to, two heterogeneous or isomorphic operating systems. That is to say, the types of the first operating system and the second operating system may be the same or different.

Taking the first operating system and the second operating system being heterogeneous operating systems as an example, the first operating system and the second operating system may be the operating systems that are different in sensitivity to response time. For example, the degree of sensitivity of the first operating system to the response time is higher than that of the second operating system. Alternatively, the first operating system and the second operating system may be the operating systems with different occupation quantities on resources. For example, the occupation quantity of the first operating system on the resources is less than that of the second operating system.

The first operating system and the second operating system may be, but are not limited to, two heterogeneous operating systems that are deployed on a processor of an embedded system, which is an embedded operating system. The embedded operating system may be classified into a Real-Time Operating System (RTOS) and a non-RTOS according to the degree of sensitivity to the response time. The RTOS may include, but is not limited to, a Free RTOS and a Real Time Linux (RT Linux). The non-RTOS may include, but is not limited to, a Contiki Operating System, a Helix Operating System (HeliOS), and a Linux Operating System.

The embedded system is configured to control, monitor or assist in operation of apparatus such as machines and devices, and is a dedicated computer system. The embedded system is the dedicated computer system that is centered on applications, is based on a computer technology, is tailorable in software and hardware, and adapts to strict requirements of application systems in terms of functions, reliability, costs, sizes, and power consumption. Defined in terms of an application object, the embedded system is an integration of software and hardware, and may also cover accessory apparatuses such as machines.

From a hardware perspective, the embedded system may include, but is not limited to, hardware devices such as a processor, a memory, and a peripheral circuit. The first operating system and the second operating system run on the basis of the processor of the embedded system. From a software perspective, the embedded system may include, but is not limited to, a underlayer drive, an operating system, an application program, and the like. The first operating system and the second operating system are the operating systems in the embedded system.

In some embodiments of the present disclosure, the method for controlling running of an operating system may be, but is not limited to, executed by control logic implemented in the embedded system. The control logic achieves the control, allocation and scheduling of software and hardware resources such as the heterogeneous dual operating system, the processor and the memory in the embedded system.

The method for controlling running of an operating system may be, but is not limited to, executed by the first operating system, or executed by a function component for resource control that is provided on the first operating system.

In the technical solution provided in S202, during the running of the first operating system, the running state may represent, but is not limited to, a running condition of the first operating system. The running condition may be, but is not limited to, single-dimensional, or may be, but is not limited to, a combination of multiple dimensions. For example, the running state may include, but is not limited to, the usage of the software and hardware resources, the execution of instructions, and the running of the operation services.

In some embodiments of the present disclosure, the running process of the first operating system may; but is not limited to, refer to the entire process from power on to power off. In this process, the first operating system may, but is not limited to, be awake at all times, or may have both a wake-up phase and a hibernation phase.

In the technical solution provided in S204, the processor resources used by the first operating system may, but are not limited to, operation services, processor cores, storage spaces (such as memory and caching) on the processor, timers, registers, and input/output interfaces.

In some embodiments of the present disclosure, the control of the processor resources may be for one of the processor resources individually or, but not limited to, for multiple processor resources in concert.

In some embodiments of the present disclosure, the control of the processor resources may, but is not limited to, include operations of releasing, occupation, allocation, and recycling. A rational control operation is performed on the processor resources used by the first operating system according to the running state of the first operating system during running, the utilization rate of resources may be improved, thereby improving the running efficiency of the operating system.

In some embodiments of the present disclosure, the detected running state may determine the controlled processor resources. For example, detecting the service state may control adjustment of the operation service, and detecting the system state may control the use of the processor core. Different detection objects may also be set according to the processor resources as required. For example, if the operation service needs to be adjusted, the service state may be detected; and if the use of the processor core needs to be controlled, the system state may be detected.

In one aspect, the service state of the operation service run by the first operating system may reflect the running condition of the first operating system. Alternatively, if the operation service on the operating system needs to be controlled, the service state of the operation service may be detected. For example, in S202, it may, but is not limited to, detect the service state of the target operation service run by the first operating system on the basis of the processor. The running state includes the service state.

In some embodiments of the present disclosure, the target operation service may, but is not limited to, be an operation service that has a certain requirement for the running performance or a running environment of a system, for example, a fan control service having a certain requirement for running time, a log backtracking service having a certain requirement for a data storage space, an interface switching service having a certain requirement for a response speed, a hardware interface waveform signal simulation service, etc.

In some embodiments of the present disclosure, the service state of the operation service may, but is not limited to, represent the running condition of the operation service in each dimension, for example, whether it is interrupted, whether it runs to a certain level (for example, whether a running duration reaches a threshold, and whether a running result reaches a certain preset result), etc.

If the service state of the operation service reaches the target service state, that is, the operation service runs to a certain level, a control operation matching the target service state may be executed on the service, such that control adapting to the current service state, such as the transferring of the operation service from one operating system to another operating system for running, starting and stopping of the operation service, and suspending and restoring the operation service. For example, in S204, the target operation service is released when it is detected that the service state is a target service state. The processor resources include the target operation service. The second operating system is configured to run the target operation service.

In some embodiments of the present disclosure, if the service state of the target operation service reaches the target service state, for example, being interrupted, or running to a certain level (for example, the running duration reaches the threshold, and the running result reaches the preset result), the target operation service on the first operating system is released, and is continued to be run by the second operating system. Therefore, the alternate running of the operation service between the operating systems is realized, and the operation service is run on the operating system that is more suitable for the running of the operation service.

With regard to the service state of the target operation service run by the first operating system reaching the target service state, in one aspect, the target operation service run by the first operating system may be interrupted by the second operating system. For example, when a first interrupt request sent to the first operating system by the second operating system is acquired, it is determined that the service state is detected as the target service state. The first interrupt request is configured to request to take over the target operation service. Alternatively, a service attribute of the target operation service may reach a target service attribute. For example, when a service attribute of the target service state reaches a target service attribute, it is determined that the service state is detected as the target service state.

In some embodiments of the present disclosure, the time when the target operation service performs the conversion of the operating system may, but is not limited to, be determined by the second operating system. When determining to take over the target operation service, the second operating system may send the first interrupt request to the first operating system, so as to instruct the first operating system to take over the target operation service. When the first interrupt request is acquired, it may be considered that the service state of the first operating system for the running of the target operation service has reached the target service state, such that the target operation service may be released in response to the first interrupt request, and the running of the target operation service is taken over by the second operating system.

In some embodiments of the present disclosure, the service attribute of the target operation service may, but is not limited to, include a running duration, a running result, a running load, etc. That the running duration reaches the target service attribute may, but is not limited to, mean that the running duration reaches a preset duration; that the running result reaches the target service attribute may, but is not limited to, mean that the target operation service achieves a certain preset running result through running; and that the running load reaches the target service attribute may, but is not limited to, mean that running resources occupied by the target operation service exceed or are about to exceed a range that the first operating system may carry.

In some embodiments of the present disclosure, the time when the target operation service performs the conversion of the operating system may, but is not limited to, be determined by the service attribute of the target operation service itself. If the target operation service runs until the service attribute reaches the target service attribute, it may be considered that the service state of the first operating system for the running of the target operation service has reached the target service state, such that the running of the target operation service may be taken over by the second operating system.

In some embodiments of the present disclosure, a determination mechanism may, but is not limited to, be established for the qualification of the second operating system to take over the target operation service. For example, when the first interrupt request is acquired, in response to the first interrupt request, whether the target operation service is taken over by the second operating system is determined; and the target operation service is released insofar as the target hardware controller is taken over by the second operating system.

In some embodiments of the present disclosure, instead of releasing the target operation service run by the first operating system immediately when the first interrupt request is acquired, whether the target operation service is taken over by the second operating system is determined, so as to determine the qualification of the second operating system to take over the target operation service; and if it is determined that the target operation service is taken over by the second operating system, the target operation service run by the first operating system is released.

In the mechanism of determining the qualification of the second operating system to take over the target operation service, if the second operating system has no qualification to take over the target operation service, the takeover of the target operation service by the second operating system may be rejected. For example, after whether the target operation service is taken over by the second operating system is determined, insofar as the target operation service is not taken over by the second operating system, a second interrupt request is sent to the second operating system. The second interrupt request is configured to indicate rejection of the second operating system to take over the target operation service.

In some embodiments of the present disclosure, the rejection of the takeover of the target operation service by the second operating system may, but is not limited to, be indicated or notified to the second operating system by sending the interrupt request between the systems.

In some embodiments of the present disclosure, when the target operation service is not taken over by the second operating system, the second interrupt request may not be sent, and the first operating system does not release the target operation service and continues to run the target operation service, such that the second operating system may not take over the target operation service.

After the second interrupt request is sent to the second operating system to reject the second operating system to take over the target operation service, the first operating system may further continue to run the target operation service, until the condition of the second operating system to take over the target operation service is met (for example, the service attribute reaches a target attribute), and then the first operating system releases the target operation service to the second operating system, and notifies the second operating system to take over the running.

After the target operation service run on the first operating system is released, the second operating system may proactively sense that the target operation service has been released and take over the target operation service. Alternatively, if the second operating system proactively sends the first interrupt request to request to take over the target operation service, the second operating system may directly take over the target operation service by default as long as the second operating system does not receive, within a certain period of time, the second interrupt request for rejecting the second operating system to take over the target operation service, thereby improving the takeover efficiency of the target operation service.

If the target operation service run on the first operating system is released, the interrupt request may also be sent to the second operating system proactively to notify the second operating system that the target operation service has been released. For example, a third interrupt request is sent to the second operating system. The third interrupt request is configured to indicate that the target operation service has been released. The second operating system is configured to run the target operation service in response to the third interrupt request.

When the service attribute of the target operation service reaches the target service attribute, and if the first operating system proactively releases the target operation service, the third interrupt request may be sent to the second operating system to notify the second operating system that the target operation service has been released. After the third interrupt request is received, the subsequent running of the target operation service is taken over by the second operating system.

Figure 3:
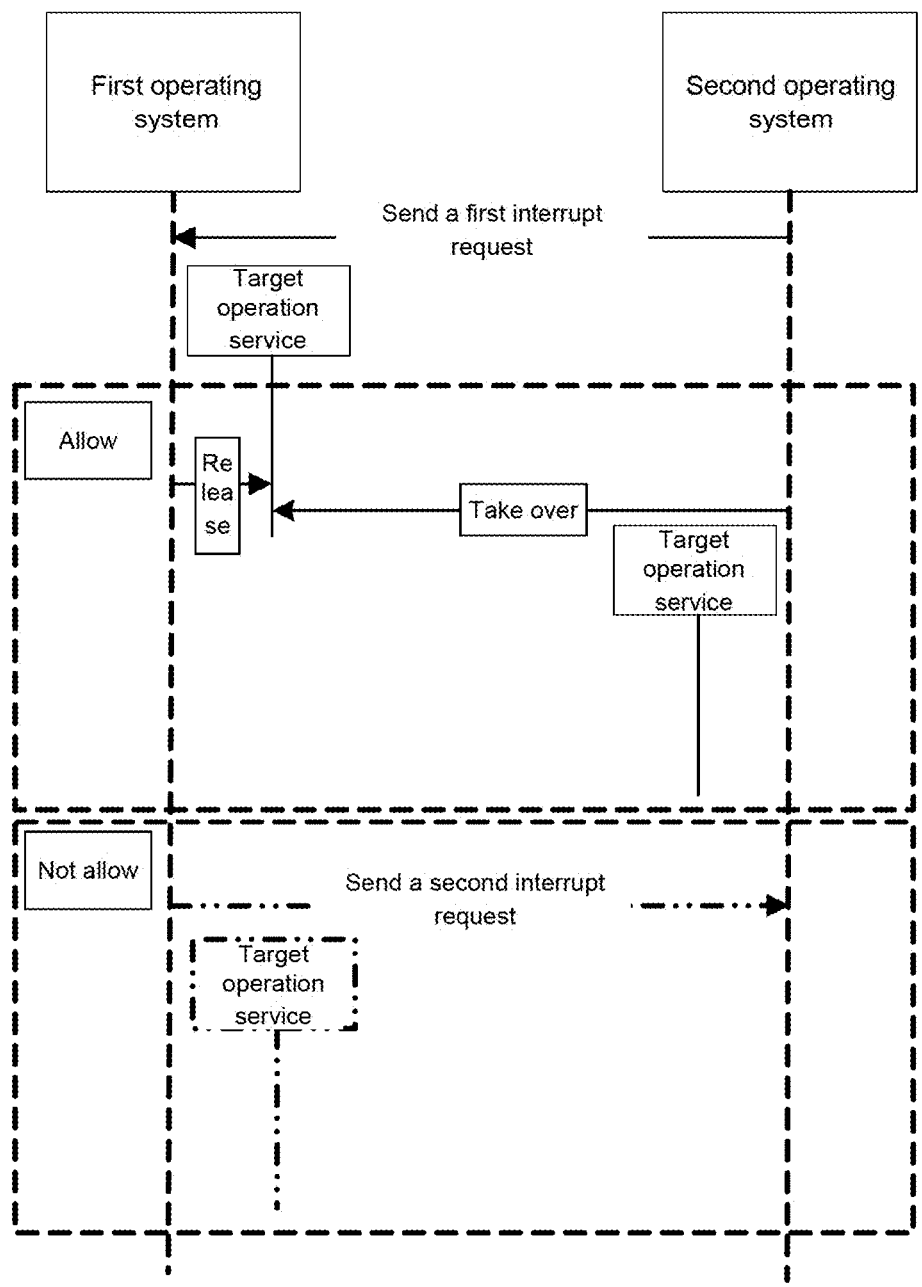
FIG. 3 is a schematic diagram of an operation service takeover process according to an embodiment of the present disclosure.

FIG. 3 is a schematic diagram of an operation service takeover process according to an embodiment of the present disclosure. As shown in FIG. 3, the second operating system sends the first interrupt request to the first operating system to take over the target operation service run on the first operating system. If the first operating system allows the second operating system to take over the target operation service, the target operation service is released, the target operation service is taken over by the second operating system, and the target operation service runs on the second operating system. If the first operating system does not allow the second operating system to take over the target operation service, the second interrupt request is sent to the second operating system to reject the second operating system to take over the target operation service, and the target operation service continues to run on the first operating system.

In another aspect, the system state of the first operating system may reflect the running state of the first operating system; and rational control may; but is not limited to, be performed on the processor core used by the first operating system according to the system state of the first operating system. Alternatively, if the processor core used by the operating system needs to be controlled, the system state of the operating system may be detected. For example, in S202, the system state of the first operating system may, but is not limited to, be detected. The running state includes the system state, and the first operating system runs on the basis of a target processor core in the processor.

In some embodiments of the present disclosure, the target processor core may, but is not limited to, be a processor core in the processor that is allocated for the first operating system and configured to run the first operating system. The number of the target processor core may, but is not limited to, be one or more.

In some embodiments of the present disclosure, the system state of the operating system may, but is not limited to, represent the running condition of the operating system in each dimension, for example, whether it is interrupted, whether it runs to a certain level (for example, whether a running duration reaches a threshold, and whether a running result reaches a certain preset result), etc.

If the system state reaches a target system state, that is, the operating system runs to a certain level, a control operation matching the target system state may be executed on the processor core used by the operating system, such that rational allocation and utilization of the processor cores are realized. For example, in S204, the target processor core is released when it is detected that the system state is the target system state. The processor resources include the target processor core. The second operating system is configured to add the target processor core into a scheduling resource pool of the second operating system. The scheduling resource pool includes a processor core in the processor that is allocated for the second operating system.

In some embodiments of the present disclosure, if the system state of the first operating system reaches the target system state, for example, being interrupted, or running to a certain level (for example, the running duration reaches the threshold, the running result reaches the preset result, and the running load is lower than a preset value), the target processor core used by the first operating system is released, and is used by the second operating system. Therefore, the alternative use of the processor cores between the operating systems is realized, and the processor cores are used more rationally.

With regard to the system state of the first operating system reaching the target system state, in one aspect, the first operating system may be interrupted by the second operating system. For example, when a fourth interrupt request sent to the first operating system by the second operating system is acquired, it is determined that the system state is detected as the target system state. The fourth interrupt request is configured to request to occupy the target processor core. Alternatively, a service attribute of the first operating system may reach a target system attribute. For example, when the service attribute of the first operating system reaches the target system attribute, it is determined that the system state is detected as the target system state.

In some embodiments of the present disclosure, the time when the target processor core performs the conversion of the operating system may, but is not limited to, be determined by the second operating system. When determining to take over the target processor core, the second operating system may send the fourth interrupt request to the first operating system, so as to instruct the first operating system to take over the target processor core. When the fourth interrupt request is acquired, it may be considered that the system state of the first operating system has reached the target system state, such that the target processor core may be released in response to the fourth interrupt request, and the target processor core is taken over by the second operating system and added into a scheduling resource pool for use.

In some embodiments of the present disclosure, after the fourth interrupt request sent to the first operating system by the second operating system is acquired, data currently running on the first operating system is pushed into a stack; and then the first operating system enters a hibernation state, and the target processor core occupied by the second operating system for scheduling and usage.

In some embodiments of the present disclosure, the second operating system may, but is not limited to, initiate the fourth interrupt request according to the needs of the second operating system for processor core resources. For example, the second operating system detects whether a resource occupation rate of cores allocated for the second operating system is higher than a certain threshold or detect whether a resource remaining quantity of the cores allocated for the second operating system are enough to run the next process. If the resource occupation rate is higher than the certain threshold or the resource remaining quantity is insufficient to run the next process, it may be considered that the second operating system needs additional processor cores. The second operating system may proactively send the fourth interrupt request to the first operating system to request to occupy the target processor core, so as to reduce a running pressure of the second operating system or support the running of the next process.

In some embodiments of the present disclosure, when the second operating system (for example, Linux) detects that the resource occupation rate of the cores allocated for the second operating system is higher (for example, the occupation rate is higher than 95% of total resources), the fourth interrupt request is sent to the first operating system (for example, RTOS). After the first operating system (RTOS) receives the fourth interrupt request, a running service site is saved (for example, the running data is pushed into the stack), and the used target processor core is released. The target processor core is occupied by the second operating system (Linux) and allocates threads that needs to be run for the target processor core, or schedule threads on other processor cores with high occupation rate onto the target processor core for running.

In some embodiments of the present disclosure, the system attribute of the operating system may, but is not limited to, include the running duration, running result, running load, and the like of the system. That the running duration of the system reaches the target system attribute may, but is not limited to, mean that the running duration of the system reaches the preset duration; that the running result of the system reaches the target system attribute may; but is not limited to, mean that the operating system achieves a certain running result through running; and that the running load of the system reaches the target system attribute may, but is not limited to, mean that the resource occupation rate of the operating system is lower than or is about to lower than a lower occupation rate limit set by the operating system.

In some embodiments of the present disclosure, the time when the target processor core performs the conversion of the operating system may, but is not limited to, be determined by the system attribute of the operating system itself. If the operating system runs until the system attribute reaches the level of the target system attribute, it may be considered that the system state of the operating system has reached the target system state, such that the target processor core may be occupied by the second operating system.

In some embodiments of the present disclosure, a determination mechanism may, but is not limited to, be established for the qualification of the second operating system to occupy the target processor core. For example, when the fourth interrupt request is acquired, in response to the fourth interrupt request, whether the target processor core is occupied by the second operating system is determined; and the target processor core is released insofar as the target processor core is occupied by the second operating system.

In some embodiments of the present disclosure, instead of releasing the target processor core immediately when the fourth interrupt request is acquired, whether the target processor core is occupied by the second operating system is determined, so as to determine the qualification of the second operating system to occupy the target processor core; and if it is determined that the target processor core is occupied by the second operating system, the target processor core is released and occupied by the second operating system.

In the mechanism of determining the qualification of the second operating system to occupy the target processor core, if the second operating system has no qualification to occupy the target processor core, the occupation of the target processor core by the second operating system may be rejected. For example, insofar as the target processor core is not occupied by the second operating system, a fifth interrupt request is sent to the second operating system. The fifth interrupt request is configured to indicate rejection of the second operating system to occupy the target processor core.

In some embodiments of the present disclosure, the rejection of the occupation of the target processor core by the second operating system may, but is not limited to, be indicated, or notified to the second operating system by sending the interrupt request between the systems.

In some embodiments of the present disclosure, when the target processor core is not occupied by the second operating system, the second interrupt request may not be sent, and the first operating system does not release the target processor core and continues to occupy the target processor core, such that the second operating system may not occupy the target processor core.

After the fifth interrupt request is sent to the second operating system to reject the second operating system to occupy the target processor core, the first operating system may further continue to use the target processor core to process the operation services, until the condition of the second operating system to occupy the target processor core is met (for example, the system attribute reaches the target system attribute), and then the first operating system releases the target operation service to the second operating system, and notifies the second operating system to take over the running.

Figure 4:
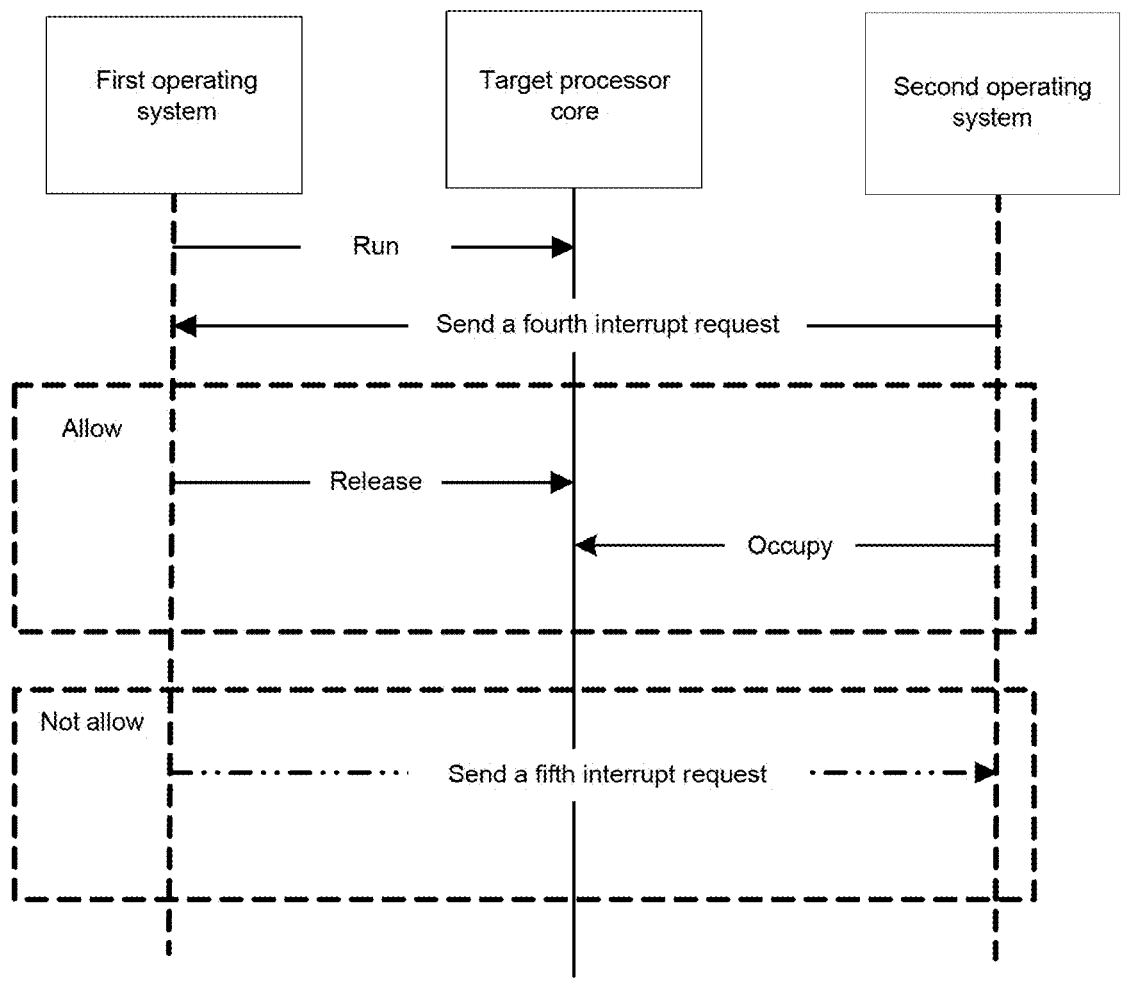
FIG. 4 is a schematic diagram of a processor core occupation process according to an embodiment of the present disclosure.

FIG. 4 is a schematic diagram of a processor core occupation process according to an embodiment of the present disclosure. As shown in FIG. 4, the first operating system runs on the basis of the target processor core. During running, the second operating system sends the second interrupt request to the first operating system to request to occupy the target processor core used by the first operating system. If the second operating system is allowed to occupy the target processor core, the target processor core is released; and the target processor core is occupied by the second operating system and added into the resource scheduling pool. If the second operating system is not allowed to occupy the target processor core, the fifth interrupt request is sent to the second operating system for rejection.

After the target processor core used by the first operating system is released, the second operating system may proactively sense that the target processor core has been released and occupies the target processor core. Alternatively, if the second operating system proactively sends the fourth interrupt request to request to occupy the target processor core, the second operating system may directly occupy the target processor core by default as long as the second operating system does not receive, within a certain period of time, the fifth interrupt request for rejecting the second operating system to occupy the target processor core, thereby improving the occupation efficiency of the target processor core.

If the first operating system proactively releases the target processor core used by the first operating system, the interrupt request may be proactively sent to the second operating system to notify the second operating system that the target processor core has been released. For example, a sixth interrupt request is sent to the second operating system. The sixth interrupt request is configured to indicate that the first operating system has released the target processor core. The second operating system is configured to add the target processor core into the scheduling resource pool in response to the sixth interrupt request.

When the system attribute reaches the target system attribute, the first operating system proactively releases the target processor core, and the sixth interrupt request may be sent to the second operating system to notify the second operating system that the target processor core has been released. After the sixth interrupt request is received, the target processor core is occupied by the second operating system for scheduling and usage of resources.

In some embodiments of the present disclosure, when the first operating system (for example, RTOS) determines that there is no thread to be scheduled during running (for example, the resource occupation rate of the operating system is lower than or is about to lower than the lower occupation rate limit set by the operating system), active hibernation of the first operating system (RTOS) may be triggered; the first operating system (RTOS) sends the sixth interrupt request to the second operating system (Linux), and hibernates after saving the running site (for example, the run data is pushed into the stack); and after the second operating system (Linux) receives the sixth interrupt request, the target processor core is added into the resource scheduling pool of the second operating system for scheduling and usage.

Figure 5:
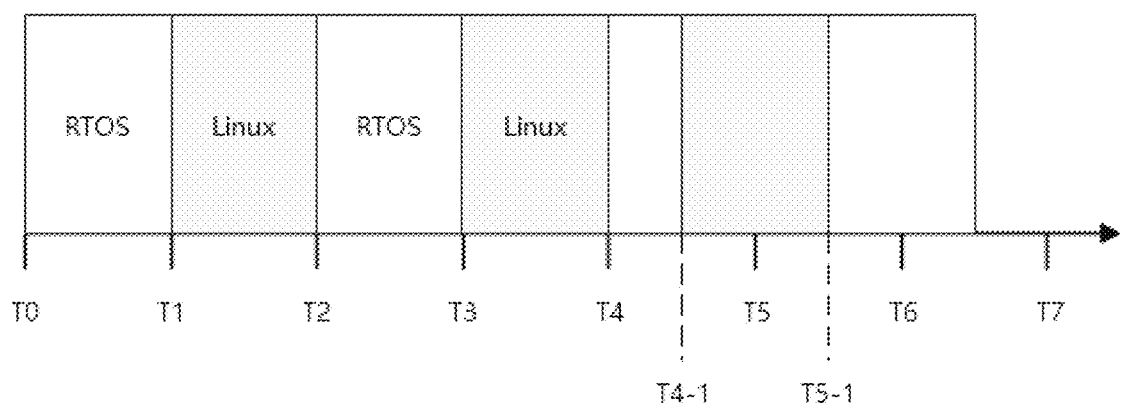
FIG. 5 is a schematic diagram I of a processor resource control process according to an embodiment of the present disclosure.

In an application scenario, a dual operating system is carried in a chip and runs on the basis of a multi-core processor (CPU). The first operating system may, but is not limited to, be the RTOS; and the second operating system may, but is not limited to, be the Linux. CPU core 0 is allocated to the RTOS for usage, and the rest of the cores are allocated to the Linux for usage. FIG. 5 is a schematic diagram I of a processor resource control process according to an embodiment of the present disclosure. As shown in FIG. 5, the periodicity of the RTOS is waken up for running; the RTOS and the Linux alternately occupy and schedule the CPU core 0; and within a time slice (T4, T5) when the RTOS schedules the CPU core 0, the Linux generates an interrupt (which is equivalent to the fourth interrupt request) taking over the CPU core 0 at T4-1, causing the RTOS to have to hibernate. In this case, the RTOS saves a site in a stack for hibernation; then the CPU core 0 is released to the Linux for taking over; after the Linux completes the scheduling, the interrupt that the RTOS occupies the CPU core 0 is generated at T5-1 to wake up the RTOS; and the RTOS starts, from T5-1, to enter a round-robin mode to occupy and schedule the CPU core 0.

In some embodiments of the present disclosure, the takeover of inter-system operation services and the occupation of the processor cores may, but are not limited to, be separate, for example, only taking over the operation services, or only occupying the processor cores. It may also be occupied together, that is, both taking over the operation services and occupying the processor cores.

In some embodiments of the present disclosure, taking the operation service being a device control service as an example, how the second operating system takes over the processor resources of the first operating system is described. This implementation provides a start control process of an operating system. The process includes the following steps.

At step A, a hardware controller of a target device is controlled by the first operating system run on a first processor core of the processor via a first bus, so as to control a running state of the target device.

For devices such as a server, a personal computer, and an industrial personal computer, some specific devices may be equipped to execute operations related to the running of the devices. In the related art, these specific devices generally start to work after a system is powered on. Since, after the system is powered on, it takes a period of time for the operating system run on the processor to normally take over the specific devices, so as to control the running states of the specific devices, the specific devices are uncontrollable during the starting of the operating system.

For example, a fan starts to work after the system is powered on; since it takes a period of time for the operating system run on a CPU to normally take over the fan after the system is powered on, so as to set a rotary speed of the fan, the fan is uncontrollable during the starting of the operating system.

For example, in order to control the fan during the starting of the operating system, the server uses a control mode of combining a BMC and CPLD; the personal computer uses a control mode of an EC chip (the EC chip adjusts the function of the rotary speed of the fan according to temperatures); and the industrial personal computer uses a control mode of a custom chip. During the starting of server, personal computer and industrial personal computer operating systems, the CPLD, the EC chip and the custom chip step in to control the rotary speed of the fan; and after the operating system is completely started, the control power of the fan is handed over to an application program in the operating system for controlling.

In order to at least partially solve the above technical problems, a start control mode of a multi-core multi-system (for example, a multi-core dual system) may be used to run different operating systems of an embedded system on different processor cores of the processor. Different operating systems have different response speeds. When the second operating system is not started or restarted or the running states of the specific devices may not be controlled, the running states of the specific devices may be controlled by the first operating system of which response speed is higher than that of the second operating system, such that uncontrollable situations of the running states of the specific devices may be reduced. In addition, since extra costs do not need to be added, good extendibility is also achieved.

In some embodiments of the present disclosure, when the second operating system is not started or restarted or the running states of the specific devices may not be controlled, the hardware controller of the target device may be controlled by the first operating system via the first bus, so as to control the running state of the target device. The target device here may be the fan or other devices that are required to run when the system is started. For the fan, the corresponding hardware controller is a fan controller, such as a Pulse Width Modulation (PWM) controller and a FanTach controller. Herein, by using the first operating system (for example, RTOS) to replace traditional CPLD, EC chip and custom chip, in one aspect, hardware costs are reduced, and in the other aspect, since device control is implemented by software, higher extendibility is achieved.

For example, a dual system, the RTOS and the Linux system are implemented on the basis of a BMC dual core; and the fan is implemented on the basis of the multi-core dual system. By using the high real-time nature of the RTOS, during the starting of the Linux system, the fan may be controlled by replacing the CPLD, the EC chip and the custom chip with the RTOS, that is, taking over the control power of the fan, such that a running state of the fan is controlled at a fast enough speed.

At step B, a second processor core of the processor is booted to start the second operating system.

When the system is powered on or the second operating system is restarted, the second processor core of the processor may be booted to start the second operating system, so as to cause the second operating system to run on the second processor core. Herein, starting the second operating system on the second processor core means that the second processor core is scheduled to the second operating system. A system file or a mirror file of the operating system may be stored on the chip where the processor is located or in memories other than the chip, for example, in an external Random Access Memory (RAM).

At step C, after the second operating system is started, the second operating system takes over the hardware controller via the first bus, so as to take over the control power of the target device.

After the starting of the second operating system is completed, the running state of the target device may always be controlled by the first operating system. Considering that running a plurality of operating systems on a multi-core processor needs to perform data interaction among the plurality of operating systems, so as to cause one operating system to conveniently perform overall control of the device, the control power of the target device may also be taken over by the second operating system. For example, the hardware controller may be taken over by the second operating system via the first bus. The method that the second operating system takes over the control power of the target device may include: after the second operating system is started, sending, by the second operating system, a device takeover request to the first operating system. For example, the interrupt request is sent by a second bus, so as to request to take over the hardware controller of the target device. The first operating system may receive the device takeover request sent by the second operating system, hand over the control power of the target device to the second operating system and may also execute operations related to the transfer to the control power of the target device, for example, stopping running a service (process) for controlling the running state of the target device.

For example, after the Linux system is completely started, the RTOS hands over the control power of the fan to the Linux system, and then the fan is controlled by the Linux system. The above process may be executed after the system is powered on, that is, the start mode of the multi-core dual system is used; the RTOS is first started, facilitating earlier stepping-in of fan control; and then after the Linux system is completely started, the RTOS hands over the control power of the fan to the Linux system for controlling.

In some embodiments of the present disclosure, before the hardware controller of the target device is controlled by the first operating system run on the first processor core of the processor via the first bus, the method further includes: after powering on the chip where the processor is located, waking up the first processor core by the processor; and running a boot loader of the first operating system through the first processor core, so as to boot the first operating system to start on the first processor core.

The entire system may be divided into two phases according to working time periods, which are an initial start phase and a real-time running phase. A start control method in this embodiment may be executed at the initial start phase and the real-time running phase. For the initial start phase, the initial start phase starts when the system is powered on, that is, the chip where the processor is located is powered on. After the system is powered on, one core is woken up to execute a booting action of the operating system, and the rest of the cores are in a hibernation state temporarily. The woken core may be the first processor core.

In some embodiments of the present disclosure, after being powered on, the system first executes a preset core scheduling strategy (a start booting strategy). That is to say, the core scheduling strategy is executed by one processor core of the processor. The core scheduling strategy may be stored in an RAM or a non-volatile flash memory (Norflash) on a System on Chip (SOC). The scheduling strategy may be flexibly configured according to different design requirements. The main functions of the scheduling strategy include specify initial processing resources (processor cores) that need to be run for different operating systems, and determining a booting process of the heterogeneous operating systems, where the powering-on of the chip may refer to powering-on at an SOC level.

After the first processor core is woken up, the first operating system may be booted to run on the first processor core by means of the boot loader; and the first processor core may boot the first operating system to start on the first processor core by means of the boot loader. The boot loader may be located on a computer or other computer applications, and refers to a program that is used to boot the operating system to load, for example, an inherent program in Boot Rom. The inherent program refers to codes that boot the operating system to start, and belongs to a Boot Loader program. The Boot Rom is a small mask Read-Only Memory (ROM) or a write-protect flash memory in an embedded processor chip on the CPU.

At the initial start phase, by using the boot loader to boot the operating system to start on the corresponding processor core, the success rate of the starting of the operating system may be improved, and preparation is made for the real-time running phase.

In some embodiments of the present disclosure, controlling the hardware controller of the target device by the first operating system run on the first processor core of the processor via the first bus includes: executing, on the first processor core, a first control task of the first operating system, where the first control task is configured to control the hardware controller; reading, by means of the first processor core, sensor data of a specified sensor corresponding to the target device; and sending a device control instruction to the hardware controller through the first control task according to the sensor data of the specified sensor via the first bus, so as to cause the hardware controller to control the running state of the target device according to the device control instruction.

The control of the hardware controller of the target device by the operating system may be executed by controlling the hardware controller by a control task (service) on the processor core run by the operating system. The control task here may refer to the corresponding control task. For the hardware controller of the target device, the first control task (first control process) of the first operating system may be executed on the first processor core, and the hardware controller is controlled by the first control task.

The control of the hardware controller may be performed on the basis of the sensor data of the sensor. For different target devices, parameters affecting the running of the target devices are different; and correspondingly, there may be differences in the sensor data to be acquired. The target device may be a device that runs after the chip is powered on, and the sensor corresponding to the target device is the specified sensor. There may be various types of the specified sensors, which may, but is not limited to, include at least one of the following: a temperature sensor, a humidity sensor, or a noise sensor. The first control task is run on the first processor core, such that the sensor data of the specified sensor may be read by the first processor core. The sensor data of the specified sensor may be stored in a storage space in the specified sensor and may be transmitted to a specified storage space by the specified sensor. A reading position of the sensor data of the specified sensor is not limited in the embodiments of the present disclosure.

The read sensor data of the specified sensor may be sensor data within a time period or may be all the sensor data since the target device is started, and may also be the sensor data that meets other time-limited conditions. After the sensor data of the specified sensor is acquired, the first control task may control the running state of the target device according to the sensor data of the specified sensor. The control of the running state of the target device may be implemented by the following method, including sending, by the first control task, the device control instruction to the hardware controller of the target device, so as to cause the hardware controller to control the running state of the target device according to the device control instruction.

In some embodiments of the present disclosure, the first control task may determine an expected running state of the target device on the basis of the sensor data of the specified sensor: insofar as the current running state of the target device is different from the expected running state, the device control instruction may be generated; and the device control instruction may control and adjust the running state of the target device to the expected running state. The device control instruction may be sent to the hardware controller of the target device via the first bus. The first bus is similar to that in the foregoing embodiments and is not described herein again.

The utilization rate of resources is improved by reading the sensor data of the specified sensor and controlling the target device according to the sensor data, so as to control the running state of the target device.

In some embodiments of the present disclosure, sending the device control instruction to the hardware controller through the first control task according to the sensor data of the specified sensor via the first bus includes: determining, by the first control task, a target parameter value of device running parameters of the target device according to sensor data of the specified sensor, where the device running parameters are parameters for controlling the running state of the target device; and sending, by the first control task, the device control instruction carrying the target parameter value to the hardware controller via the first bus.

The first control task may determine the expected running state of the target device according to the sensor data of the specified sensor. The expected running state may be represented by a parameter value of the device running parameters. The device running parameters may be parameters for controlling the running state of the target device. For different types of devices, the corresponding device running parameters may be different. For example, for the fan, the corresponding device running parameter may be the rotary speed; and for other types of devices, the device running parameters may be other running parameters. The expected running state may correspond to the target parameter value of the device running parameters of the target device.

After the target parameter value of the device running parameters of the target device is determined, the target parameter value may be carried in the device control instruction. That is to say, the device control instruction carrying the target parameter value is sent to the hardware controller through the first control task. The mode of sending the device control instruction to the hardware controller may be similar to that in the foregoing embodiments and is not described herein again.

The accuracy of device control may be improved by determining the parameter value of the device running parameters of the target device according to the sensor data and carrying the determined parameter value in the device control instruction.

In some embodiments of the present disclosure, determining, by the first control task, the target parameter value of the device running parameters of the target device according to the sensor data of the specified sensor includes: when the target device is the fan, determining, by the first control task, a target parameter value of fan running parameters of the fan according to the sensor data of the specified sensor.

The target device may be the fan, which may be configured to cool a server or other devices, that is, a cooling fan. In this case, the device running parameters may be the fan running parameters. There may be one or more fan running parameters; and the fan running parameters may include, but are not limited to, at least one of the following: a rotary speed, a rotary period, or period switching time, and may also be other running parameters. This embodiment is not limited thereto.

Correspondingly, determining, by the first control task, the target parameter value of the device running parameters of the target device according to the sensor data of the specified sensor may be to determine, by the first control task, the target parameter value of the fan running parameters of the fan according to the sensor data of the specified sensor. After the target parameter value is obtained, the first control task sends the device control instruction carrying the target parameter value to the hardware controller of the fan via the first bus, so as to control the running state of the fan.

By controlling the running state of the fan, the running state of the fan may be rapidly controlled in scenarios such as the powering on of the system and the restarting of the system, so as to control the fan in time.

In some embodiments of the present disclosure, when the target device is the fan, determining, by the first control task, the target parameter value of the fan running parameters of the fan according to the sensor data of the specified sensor includes: when the target device is the fan and the specified sensor is a temperature sensor, determining, by the first control task, a target rotary speed value of the rotary speed of the fan according to the sensor data of the temperature sensor, where the rotary speed of the fan is positively correlated with the temperature measured by the temperature sensor.

For the scenario that the target device is the fan, the specified sensor may be the temperature sensor. There may be one or more temperature sensors. The arrangement position of the temperature sensor may be configured according to requirements. Different temperature sensors may be arranged on different positions. In some embodiments of the present disclosure, the sensor data of the temperature sensor is configured to represent the temperature measured by the temperature sensor. For this, the first control task may determine the target rotary speed value of the rotary speed of the fan according to the sensor data of the temperature sensor. Herein, the rotary speed of the fan is positively correlated with the temperature measured by the temperature sensor.

When there are a plurality of temperature sensors, the highest temperature measured by the plurality of temperature sensors may be determined according to the sensor data of each temperature sensor. The rotary speed of the fan may be determined according to the highest temperature measured by the plurality of temperature sensors. The rotary speed of the fan is determined relative to an average temperature measured by the plurality of temperature sensors, such that the running safety of the devices may be guaranteed. For the scenario that there are a plurality of fans, the rotary speed of each fan may also be determined on the basis of the highest temperature or the average temperature measured by the temperature sensor matching each fan.

For example, the rotary speed of the fan may be controlled by using the first operating system (for example, RTOS) to replace processing units such as the CPLD, the EC chip and the custom chip (BMC fan control may be performed in real time). When the system is just powered on, the first processor core (for example, CPU0, the first processor core may be woken up by hardware) may be woken up. The first processor core runs the boot loader (for example, a specified program in the Boot Rom), so as to load the first operating system to start. The first processor core performs fan control (for example, fan speed control) by reading various sensor data related to the temperatures, to completely simulate the processing units, so as to complete the regulation functions of the fan. When fan speed control is performed, the first operating system may calculate a PWM value according to the temperature sensor, so as to adjust the rotary speed of the fan. In this way, the rotary speed of the fan may be controlled by the first operating system during the starting of the second operating system.

In some embodiments of the present disclosure, booting the second operating system to start on the second processor core of the processor includes: executing a Second Program Loader (SPL) by the first processor core, so as to cause the SPL to wake up the second processor core; and running a Universal Boot Loader (U-Boot) of the second operating system by the second processor core, so as to boot the second operating system to start on the first processor core.

In some embodiments of the present disclosure, when the operating system is started, the SPL may be loaded in an internal memory, such as a Static Random-Access Memory (SRAM) in the SOC; and the SPL may be responsible for loading the U-Boot into an RAM. The SPL may boot and load the second operating system and may also boot and load the first operating system.

The second operating system may execute the SPL through the first processor core, so as to cause the SPL to wake up the second processor core; and by means of the second processor core, the U-Boot of the second operating system may be run, so as to boot the second operating system to start on the first processor core. Herein, the boot program of the second operating system is booted and loaded by the SPL; and the boot program of the second operating system may include the U-Boot.

It is to be noted that, the SPL is codes executed at a first phase of the U-Boot, and may be responsible for carrying codes of a second phase of the U-Boot into a system RAM (which is also called an off-chip memory) for running. The U-Boot is open-source software that follows a General Public License (GPL) protocol and may be regarded as a comprehensive bare metal routine.

For example, after the system is powered on, the processor first wakes up the CPU0 core, so as to let the RTOS to run as fast as possible; then a program in the Boot Rom is used to boot the RTOS to start; and during the starting of the RTOS, the U-Boot is continuously loaded through the SPL, and the U-Boot boots the second operating system to start on the CPU1, until the Linux system is normally started.

It is to be noted that, the Boot Rom is an ROM solidification program in the chip (for example, the SOC), and is a boot code of the U-Boot. The Boot Rom reads start information (for example, dial switch settings) of hardware, and reads a uboot-spl code (that is, the SPL) from a specified start medium (for example, SD and MMC). The SPL is mainly responsible for initializing the external RAM and environment and loading a real U-Boot image into the external RAM for execution. The external RAM may be a Double Data Rate (DDR) Synchronous Dynamic Random-Access Memory or may be other RAMs.

The second processor core is woken up by the SPL, and then the second processor core runs the U-Boot, such that the second operating system on the corresponding processor core is booted, thereby improving the convenience and success rate of the starting of the operating system.

As an example of the present disclosure, a start process of the multi-core dual system is explained and described by using the RTOS and the Linux system as an example.

In order to take over fan management as fast as possible, the RTOS may be started as much as possible; and after the starting of the Linux system is completed, the Linux system takes over the control power of the fan. The start process of the multi-core dual system may include the following steps.

At S1, the CPU0 is woken up when the system is just powered on.

At S2, the CPU0 runs a specified program in the Boot Rom, so as to load the RTOS to start.

At S3, during the starting of the RTOS, a CPU1 is woken up to boot the U-Boot, and a fan control program (FanCtrl_RTOS_APP) in the first operating system is started.

At S4, booting the U-Boot by the CPU1 may include an SPL phase and a U-Boot phase, and the SPL phase is entered by calling the SPL.

At S5, at the SPL phase, the SPL boots the U-Boot to start.

At S6, at the U-Boot phase, Linux cores (CPU1-CPUN) are loaded, and a BMC service program and a fan control program (FanCtrl_Linux_APP) in the second operating system are started.

By means of the example of the present disclosure, during the starting and running of the dual system, the RTOS is first started to control the fan, and after the Linux system is started, the second operating system takes over the control power of the fan, such that the fan may be rapidly controlled when the system is powered on, thereby improving the efficiency of fan control.

In some embodiments of the present disclosure, after the hardware controller is taken over by the second operating system via the first bus, the method further includes: when the second operating system is to be restarted, waking up the first operating system by the second operating system via the second bus, and taking over the hardware controller by the first operating system via the first bus, so as to take over the control power of the target device; and controlling the second operating system to perform system restarting.

When restarting is required due to reasons such as system breakdown and receiving of a reboot command, the second operating system may first wake up the first operating system, and the hardware controller is taken over by the first operating system, so as to take over the control power of the target device. The waking up of the first operating system may be executed by the second bus, and the takeover of the hardware controller by the first operating system may be executed via the first bus.

When the second operating system is restarted, the first operating system is woken up to take over the control power of the target device, such that the reliability of device control may be improved.

In some embodiments of the present disclosure, when the second operating system is to be restarted, waking up the first operating system by the second operating system via the second bus includes: when the second operating system is to be restarted, sending a system wake-up interrupt to the first operating system by the second operating system via the second bus, where the system wake-up interrupt is configured to wake up the first operating system.

The waking up of the first operating system may be implemented by means of inter-core interruption. If the second operating system is to be restarted (for example, system breakdown and receiving of the reboot command), the second operating system may send the system wake-up interrupt to the first operating system, so as to wake up the first operating system. The system wake-up interrupt may be an active wake-up interrupt. After the first operating system takes over the hardware controller, the second operating system may be controlled to perform system restarting; and after the second operating system is restarted, the hardware controller may be taken over again. The process of taking over the hardware controller is similar to that in the foregoing embodiments and is not described herein again.

In some embodiments of the present disclosure, the occupation of the first operating system on the processor core allocated for the first operating system may, but is not limited to, enjoy a higher level of priority; or the current use of the processor core allocated for the first operating system by which operating system may, but is not limited to, be determined through negotiation between the operating systems. If the target processor core used and allocated for the first operating system has been occupied by the second operating system, when the first operating system is woken up for running, it may be detected whether the target processor core is released; and if the target processor core has been released, the first operating system runs on the basis of the target processor core. If the target processor core is not released, a seventh interrupt request may be sent to the second operating system to request the second operating system to release the target processor core: and after the second operating system releases the target processor core in response to the seventh interrupt request, the first operating system runs on the basis of the target processor core. For example, when the target processor core in the processor has been added into the scheduling resource pool of the second operating system and the first operating system is woken up for running, whether the target processor core is released is detected, where the scheduling resource pool includes a processor core in the processor that is allocated for the second operating system; and insofar as the second operating system has released the target processor core when the first operating system is woken up, the first operating system runs on the basis of the target processor core.

In some embodiments of the present disclosure, that the target processor core has been added into the scheduling resource pool the second operating system may, but is not limited to, indicate that the target processor core has been occupied by the second operating system; and if the first operating system is woken up for running in this case, the second operating system may proactively release the target processor core. Alternatively, the target processor core may also be continuously occupied, until the first operating system proactively requests to release the target processor core.

In some embodiments of the present disclosure, the first operating system detects whether the target processor core is released; and if it is detected that the target processor core is not released, the second operating system may be requested by means of the interrupt request to release the target processor core. For example, when it is detected that the target processor core is not released, the seventh interrupt request is sent to the second operating system. The seventh interrupt request is configured to request the second operating system to release the target processor core. The second operating system is configured to release the target processor core in response to the seventh interrupt request.

In some embodiments of the present disclosure, the second operating system may, but is not limited to, directly release the target processor core when receiving the seventh interrupt request, may, but is not limited to, also determine whether the target processor core is released, and then determines whether to immediately release the target processor core to the first operating system, or to continue to run to obtain a running result, so as to release the target processor core to the first operating system.

Figure 6:
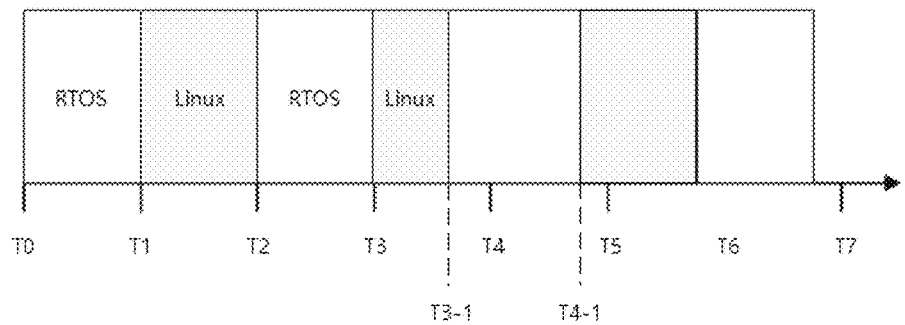
FIG. 6 is a schematic diagram II of a processor resource control process according to an embodiment of the present disclosure.

In the above optional application scenario, FIG. 6 is a schematic diagram II of a processor resource control process according to an embodiment of the present disclosure. As shown in FIG. 6, within a time slice (T3, T4) when the Linux schedules the CPU core 0, the RTOS is in a hibernation state; at T3-1, the RTOS may be woken up due to an interrupt event reported by hardware; then the Linux saves a process site run on the CPU core 0, and the RTOS occupies the CPU core 0; after the interrupt event reported by the hardware is processed, the hibernation state is entered again at T4-1; and in this case, the RTOS reports and releases the interrupt of the CPU core 0 to the Linux, and the Linux continues to schedule the CPU core 0 according to a set period, so as to recover a site running process.

During the running of the operating system, service data interaction may be performed. An interaction process may, but is not limited to, be implemented by means of cooperative transmission of the storage space and the interrupt request. Data is transmitted between the operating systems through the storage space, and mutual instruction notification is performed by means of the interrupt request. For example, service data generated in the process that the first operating system runs on the basis of the processor is acquired; the service data is stored to the storage space on the processor; and an eighth interrupt request is sent to the second operating system. The eighth interrupt request is configured to request the second operating system to read the service data from the storage space. The second operating system is configured to read the service data from the storage space in response to the eighth interrupt request.

In some embodiments of the present disclosure, the service data generated in the process that the first operating system runs on the basis of the processor is stored in the storage space on the processor; and the second operating system is notified by the eighth interrupt request, to cause the second operating system to read the service data from the storage space, so as to achieve the interaction of the service data.

In some embodiments of the present disclosure, the service data interacted between the operating systems may, but is not limited to, any data that needs to be transmitted between the systems during the running of the operation services by the operating system, such as, process data of services and result data of the services.

In some embodiments of the present disclosure, a dedicated storage position in the storage space on the processor may, but is not limited to, be configured for an interaction process between the operating systems and may be called a shared memory. The shared memory may, but is not limited to, be re-allocated according to the operating systems, that is, each operating system corresponds to a dedicated section of the shared memory.

Information (for example, a storage address) of the shared memory corresponding to the first operating system may be carried in the eighth interrupt request used for requesting the second operating system to read the service data from the storage space. The second operating system reads the service data on the indicated shared memory in response to the eighth interrupt request.

In some embodiments of the present disclosure, each interrupt request may, but is not limited to, be transmitted between the systems by means of software protocols or may also be transmitted by means of hardware components. For example, the interrupt request is transmitted in the form of the hardware component mailbox. A mailbox channel may be established between the first operating system and the second operating system. The service data is read through the storage space, and the interrupt request is transmitted through the mailbox channel.

In some embodiments of the present disclosure, a inter-core communication mode is provided. The mode includes the following steps.

At step a, the first operating system sends target data (which may be the above service data) to a target virtual channel (which may be the above storage space) in a processor memory.

In some embodiments of the present disclosure, the first operating system and the second operating system may be RTOSes and may also be non-RTOSes. The first operating system and the second operating system may be single core operating systems and may also be multi-core operating systems. The target data is the data to be sent. The target virtual channel is an idle storage space in the memory. The first operating system sending the target data to the target virtual channel in the processor memory means that a CPU core of the first operating system writes, into the target virtual channel, the data to be transmitted.

At step b, an interrupt notification message (which may be the eighth interrupt request) is sent to the second operating system.

In some embodiments of the present disclosure, the CPU core of the first operating system sends the interrupt notification message to a CPU core of the second operating system. The interrupt notification message may carry an address of the target virtual channel and is configured to notify the second operating system to acquire the target data from the target virtual channel. The interrupt notification message may be triggered by software or hardware.

At step c, the second operating system acquires the target data from the target virtual channel in the memory in response to the interrupt notification message.

In some embodiments of the present disclosure, the CPU core of the second operating system analyzes the address of the target virtual channel from the interrupt notification message in response to the interrupt notification message, and then positions the target virtual channel in the memory according to the analyzed address, so as to acquire the target data from the target virtual channel, thereby achieving the data interaction between the first operating system and the second operating system.

By means of the above steps, when the plurality of operating systems run on the processor need to transmit data mutually, the first operating system sending the data sends the target data to the target virtual channel in the processor memory and sends the interrupt notification message to the second operating system. The second operating system receiving the data acquires the target data from the target virtual channel in response to the interrupt notification message. Therefore, the problems that an inter-core communication process wastes resources and is highly dependent on the operating system are solved, and the effect of reducing resource waste and dependence on the operating system during the inter-core communication process is achieved.

In some embodiments of the present disclosure, the memory includes a data storage area and a metadata storage area. The data storage area is divided into a plurality of storage units, and each storage unit is configured to store the service data. The metadata storage area is configured to store the size and occupied state of each storage unit of the data storage area.

In some embodiments of the present disclosure, the target virtual channel is formed by one or a plurality of storage units of the data storage area. The metadata storage area may be divided into storage slices with the same number as the storage units. Each storage slice is configured to record the size and occupied state of one storage unit. The size of the storage unit may be represented by a head address and an end address of the storage unit and may also be represented by the lengths of the head address and the end address. An occupation state includes the occupied state and an unoccupied state and may be represented by the value of a free token.

In some embodiments of the present disclosure, the first operating system sending the target data to the target virtual channel in the processor memory includes: reading records in the metadata storage area by the first operating system, and determining, according to the read records, at least one storage unit that is in an idle state in the data storage area and has a total space greater than or equal to the length of the target data, so as to obtain the target virtual channel; and setting, to the occupied state, the state of the at least one storage unit corresponding to the target virtual channel in the metadata storage area, and storing the target data to the target virtual channel.

It is to be noted that, in order to ensure that the target data may be continuously written into the memory; the written target virtual channel needs a storage space that is idle and greater than or equal to the length of the target data. Since the memory is divided into the metadata storage area and the data storage area, the occupation state of each storage unit recorded in the metadata storage area may be read, so as to find the storage units that are in an idle state and may meet data storage requirements.

For example, the size of each storage unit is the same. If the length of the target data is greater than the length of the storage space, the number of the storage units required is determined according to the length of the target data, such that a plurality of continuous storage units that are in the idle state and with the number meeting the data storage requirements are found, so as to form the target virtual channel.

For another example, the size of each storage unit is the same, and the storage units have been combined in the data storage area in advance, so as to obtain a plurality of virtual channels with different sizes. Each virtual channel is formed by combining one or the plurality of storage units and may read the occupation state of each virtual channel that is recorded in the metadata storage area, so as to find the virtual channel that is in the idle state and has the length greater than the length of the target data, that is, the target virtual channel. It is to be noted that, when system software needs to apply a shared memory space, whether the length of the data to be applied is greater than the maximum length of the data stored in the virtual channel is determined; and if the length is greater than the maximum length of the data stored in the virtual channel, the system software may send the data to be sent in a plurality of times, so as to ensure that the length of the data sent each time is less than or equal to the maximum length of the data stored in the virtual channel, thereby guaranteeing a smooth communication.

In some embodiments of the present disclosure, the second operating system acquiring the target data from the target virtual channel in the memory in response to the interrupt notification message includes: reading the records in the metadata storage area by the second operating system, and determining the target virtual channel according to the read records; and acquiring the target data from the at least one storage unit corresponding to the target virtual channel, and setting the state of the at least one storage unit to the idle state.

That is to say, after the second operating system extracts the target data from the storage unit corresponding to the target virtual channel, in order not to affect the use of the target virtual channel by other systems or tasks, the state of the storage unit corresponding to the target virtual channel is set to the idle state.

In some embodiments of the present disclosure, the first operating system sending the target data to the target virtual channel in the processor memory includes: receiving the target data by a driving layer of the first operating system, and determining, in the memory, the virtual channel in the idle state, so as to obtain the target virtual channel; and setting the state of the target virtual channel to the occupied state, and storing the target data to the target virtual channel.

In some embodiments of the present disclosure, both the RTOS and the non-RTOS have the driving layers. After the driving layer receives the target data to be sent, an interface is called to find the target virtual channel from the memory. In order to prevent other systems from applying to use the target virtual channel during a process of writing the data, after the target virtual channel is found, the state of the target virtual channel is set to the occupied state, and then the target data is written into the target virtual channel.

In some embodiments of the present disclosure, when the first operating system includes an application layer, the application layer is provided with a human-computer interaction interface. Before the driving layer of the first operating system determines the virtual channel in the idle state in the memory, the method further includes: by means of the human-computer interaction interface, receiving, by the application layer of the first operating system, data to be sent that is inputted by a user; using a preset format to encapsulate the data to be sent, so as to obtain the target data; and calling a data writing function to transmit the target data to the driving layer by means of a preset communication interface, where the preset communication interface is provided on the driving layer.

In some embodiments of the present disclosure, the application layer fills the data to be sent according to the preset format, so as to obtain the target data; then a device file ipidev is generated at a/dev path of the system. When the application layer needs to read and write the data from the driving layer, an open function built-in the system may be first used to open the device file/dev/ipidev; then a write function built-in the system may be used to send the target data from the application layer to the driving layer; and the driving layer then puts the data in the target virtual channel in the shared memory, and then triggers the interrupt to notify the second operating system to obtain the data.

In some embodiments of the present disclosure, the second operating system acquiring the target data from the target virtual channel in the memory in response to the interrupt notification message includes: triggering an interrupt processing function by the second operating system on the basis of the interrupt notification message, determining the target virtual channel from the memory through the interrupt processing function, and acquiring the target data from the target virtual channel.

In some embodiments of the present disclosure, determining the target virtual channel from the memory through the interrupt processing function, and acquiring the target data from the target virtual channel includes calling a target task through the interrupt processing function, determining the target virtual channel from the memory by the target task, and acquiring the target data from the target virtual channel.

In some embodiments of the present disclosure, the interrupt processing function sends a task notification to wake up the target task responsible for data extraction; and the target task first calls the interface to find the target virtual channel in the shared memory, then reads the target data from the target virtual channel and performs data analysis.

In some embodiments of the present disclosure, when the second operating system includes an application layer, the memory stores a function identifier. The function identifier indicates a target function. Determining the target virtual channel from the memory through the interrupt processing function, and acquiring the target data from the target virtual channel includes: determining the function identifier and the target virtual channel from the memory through the interrupt processing function, and sending address information of the target virtual channel to a target application program matching the function identifier, where the target application program is a target application program in the application layer; and calling a data reading function by the target application program, and transmitting the address information to the driving layer through the preset communication interface; acquiring, by the driving layer, the target data from the target virtual channel, and transmitting the target data to the target application program, where the preset communication interface is provided at the driving layer; and processing the target data by the target application program according to a processing function matching the function identifier, so as to execute a target function.

In some embodiments of the present disclosure, after the second operating system receives the interrupt notification message, the application layer calls the corresponding interrupt processing function to find the target virtual channel from the memory, so as to obtain the address information of the target virtual channel; then the device file ipidev is generated at the/dev path of the system. When the application layer needs to read and write the data from the driving layer, the open function built-in the system may be first used to open the device file/dev/ipidev; then a read function built-in the system may be used to read the target data in the target virtual channel. That is to say, the driving layer finds the corresponding target data from the shared memory according to the address information of the target virtual channel and returns the target data and the length of the target data to the application layer. In an exemplary embodiment of the present disclosure, the state of the target virtual channel is set to be idle.

It is to be noted that, different application programs of the application layer may implement different functions by using the target data. The memory stores a function identifier, which indicates the target function implemented by the application program through the target data. In some embodiments of the present disclosure, the function identifier may be Net or Cmd. When the system is initialized, the Net, the Cmd and a PID of the application program are registered to a drive; the driving layer may find the PID of the application program according to the received NetFn and Cmd; and send the data to the corresponding application program according to the PID.

For example, NetFn=1 and Cmd=1 indicate that the first operating system and the second operating system send "hello word" to each other. When the system starts, an array is initialized. There are three columns in the array; and the first column is NetFn, the second column is Cmd, and the third column corresponds to the processing functions of the NetFn and the Cmd, and is recorded as xxCmdHandler. For example, when the second operating system receives a message sent by the first operating system, the NetFn and the Cmd are obtained from the message; and if it is determined that NetFn=1 and Cmd=1, the processing function HelloCmdHandler corresponding to "hello word" is executed to complete a corresponding function.

In some embodiments of the present disclosure, the data storage area includes a plurality of memory channels, and each memory channel is formed by one or the plurality of storage units. The metadata storage area stores a plurality of records, and each record is configured to record metadata of one memory channel. The metadata of each memory channel at least includes a channel ID of the memory channel, the size of the memory channel, and the occupied state of the memory channel. Reading the records in the metadata storage area by the first operating system, and determining, according to the read records, at least one storage unit that is in the idle state in the data storage area and has the total space greater than or equal to the length of the target data, so as to obtain the target virtual channel includes: traversing the records stored in the metadata storage area, and determining whether there is a first target record indicating that the memory channel is in the idle state and the size of the memory channel is greater than or equal to the length of the target data; and if there is the first target record, determining, as the target virtual channel, the memory channel indicated by the channel ID recorded in the first target record.

It is to be noted that, the data storage area may be divided into n virtual memory channels, and each memory channel may have different sizes. That is to say, the sizes of the n virtual channels are $2^0 *m$, $2^1 *m$, $2^2 *m$, $2^3 *m$, . . . , $2^{n-1} *m$ in sequence, where m is the size of one storage unit; and the following structure bodies are designed as metadata management memory channels:

```
typedefstruct {
uint32_t Flag;
uint16_t ChannelId;
uint8_t  SrcId:
uint8_t  NetFn;
uint8_t  Cmd;
uint32_t Len;
uint32_t ChannelSize;
uint8_t  *pData;
uint8_t  CheckSum;
}IpiHeader_T
```

Where uint32_t Flag represents the state of the memory channel, for example, 0xA5A5A5A5 indicates that the channel is non-null, otherwise it is null; uint16_t ChannelId represents the channel ID; uint8_t SrcId represents a source CPU ID, and a source CPU refers to the CPU writing the data into the memory channel; uint8_t NetFn and uint8_t Cmd are function parameters; uint32_t Len is the length of the data stored in the memory channel; uint32_t ChannelSize represents the size of the memory channel; uint8_t*pData refers to a head address of the memory channel; and uint8_t CheckSum refers to checksum. When the first operating system needs to send data, a check value is calculated from the sent data through checking and an algorithm, and the check value is sent to the second operating system. When the second operating system receives the data and the check value, a check value is calculated according to the received data through the same checking and algorithm; the calculated check value is compared with the received check value; if the comparison results are consistent, it indicates that the received data is valid; and if the comparison results are inconsistent, it indicates that the received data is invalid. Each virtual memory channel corresponds to one structure body record. The structure body records are stored at a starting position of the shared memory in sequence according to an incremental mode of the channel IDs. After the system is powered on, these structure body records are initialized. Initializing Flag to 0 indicates that the channel is null; ChannelId is initialized to 0, 1, 2, . . . , and n−1 in sequence; ChannelSize is initialized to the size of the corresponding virtual memory channel; and pData is initialized to point to the head address of the corresponding virtual memory channel.

In some embodiments of the present disclosure, when the first operating system determines the target virtual channel, an interface GetEmpty Channel is used to find the virtual channel meeting the following two conditions from all the memory channels according to the size of the target data to be sent; a free token Flag in a channel structure body IpiHeader is not equal to 0xA5A5A5A5 (that is, the channel is in the idle state), and the size ChannelSize of the channel in the channel structure body IpiHeader is greater than or equal to the size of the target data (that is, the size of the memory may meet a storage requirement of the target data). After the target virtual channel meeting the above conditions is found, the state of the channel is set to be non-null. That is to say, the free token Flag in the channel structure body IpiHeader is set to 0xA5A5A5A5, and then the target data is copied into the target virtual channel.

In some embodiments of the present disclosure, when the memory channel is occupied, the metadata of the memory channel further includes an ID of the source CPU core of the target data and an ID of a destination CPU core of the target data. Reading the records in the metadata storage area by the second operating system, and determining the target virtual channel according to the read records includes: traversing the records stored in the metadata storage area, and determining whether there is a second target record, where the second target record indicates that the memory channel is in the occupied state and the ID of the destination CPU core is an ID of a CPU core of the second operating system, and the ID of the source CPU core is not the ID of the CPU core of the second operating system; and when there is the second target record, determining, as the target virtual channel, the memory channel indicated by the channel ID recorded in the second target record.

That is to say, the target virtual channel is the virtual channel in all the channels that meets the following three conditions: a first condition is that the free token Flag in the channel structure body IpiHeader is equal to 0xA5A5A5A5 (that is, indicating that the channel is in the occupied state);

a second condition is that TargetId in the channel structure body is equal to an ID of the current CPU (that is, indicating that a destination CPU of the target data is the CPU of the second operating system); and a third condition is that the TargetId in the channel structure body is not equal to SrcId (that is, indicating that the target data is not sent by the CPU of the second operating system).

It is to be noted that, if 1 bit is used to represent the free token Flag, 0 indicates that the channel is null, and 1 indicates that the channel is non-null; and if the Flag is 0 originally, but is mutated to 1, it is considered that the channel is non-null after the system reads the Flag, causing an abnormal communication. In some embodiments of the present disclosure, the free token Flag is set to a plurality of special characters, such as 0xA5A5A5A5. Since a plurality of bits are simultaneously mutated to the special characters, the probability is considerably less than 1-bit mutation probability, such that the mutation of a storage medium bit may be prevented from affecting the value of the Flag, thereby improving the safety of communications.

In some embodiments of the present disclosure, there is a mapping table stored in the metadata storage area. There is a plurality of records in the mapping table, and each record is configured to record the occupied state of one storage unit. Reading the records in the metadata storage area by the first operating system, and determining, according to the read records, at least one storage unit that is in the idle state in the data storage area and has the total space greater than or equal to the length of the target data, so as to obtain the target virtual channel includes: determining the preset number of the storage units to be occupied by the target data; successively scanning each record from an initial position of the mapping table; when the consecutive preset number of target records is scanned, determining the consecutive storage units indicated by the preset number of target records, where the target records indicate that the storage units are in the idle state; and determining the consecutive storage units as the target virtual channel.

It is to be noted that, for ease of storage and extraction of the data, since the operating system needs to occupy the consecutive storage units in the memory when transmitting the service data, the number of the storage units in a memory request instruction needs to be determined first; and since the memory space of each storage unit is the same, the preset number of the consecutive storage units required may be calculated by means of the space size of the required memory, and is recorded as numb.

In some embodiments of the present disclosure, the first operating system traverses the records from an index position in the mapping table. The index position may be the initial position of the mapping table. Starting from the initial position of the mapping table, each record of the mapping table is queried in sequence to determine whether there are consecutive records with free memory pages greater than or equal to the numb; if there are records meeting the above condition, the consecutive storage units in the processor are determined by recording a correspondence relationship with the memory pages; and the consecutive storage units are determined as the target virtual channel, so as to write the data into the target virtual channel.

In some embodiments of the present disclosure, the interrupt notification message includes the head address and preset number of the consecutive storage units. Reading the records in the metadata storage area by the second operating system, and determining the target virtual channel according to the read records includes: successively scanning each record from an initial position of the mapping table; and when the recorded head address of the consecutive storage units is scanned, determining, as the target virtual channel, the storage units indicated by the scanned address and the consecutive storage units with the present number minus one.

In some embodiments of the present disclosure, the consecutive storage units refer to the consecutive storage units of which number is equal to the numb. Each record in the mapping table further records the head address of the corresponding storage unit. When the second operating system scans, from the mapping table, the record of the head addresses of the consecutive storage units of which number is equal to the numb, it indicates that the head address of the target virtual channel is scanned. The storage unit indicated by the head address and the consecutive numb-1 storage units after the storage unit form the target virtual channel. The second operating system acquires the data from the target virtual channel, so as to complete the interaction with the data of the first operating system.

In some embodiments of the present disclosure, the scanned consecutive target records are recorded by a counter; during the process that each record is scanned in sequence from the initial position of the mapping table according to the number of the storage units, and when the target records are currently scanned, the counter is controlled to plus one; and when non-target records are scanned currently, the counter is controlled to reset.

In some embodiments of the present disclosure, whether there is the consecutive preset number of target records, that is, whether there is the preset number of the consecutive storage units, is determined by using a relationship between the value of the counter and the number of the required storage units. In some embodiments of the present disclosure, the count of the counter is recorded as cntr. If the scanned storage unit is null, an operation of adding 1 to the cntr is performed; if the scanned storage unit is not null, the number cntr of the accumulated and consecutive storage units in the idle state is cleared, and the consecutive storage units that are in the idle state are continuously found by starting from the address after the storage unit, until the cntr is equal to the numb, indicating that the consecutive storage units that are in the idle state and meet the memory requirements have been found; and if there is no cntr greater than or equal to the numb after the entire mapping table is scanned, it indicates that the current dynamic request for memory fails, and there is no preset number of the consecutive storage units.

In some embodiments of the present disclosure, before the first operating system reads the records in the metadata storage area, and determines, according to the read records, at least one storage unit that is in the idle state in the data storage area and has the total space greater than or equal to the length of the target data, so as to obtain the target virtual channel, the method further includes: sending the memory request instruction by the first operating system, and executing a locking operation on the memory of the processor, where the memory request instruction is configured to request to use the memory of the processor; and reading the records in the mapping table when the memory is successfully locked.

In some embodiments of the present disclosure, the memory request instruction is an instruction that the operating system run on the processor sends a request to use the memory of the processor. It is to be noted that, in order to prevent request conflicts when the plurality of operating systems simultaneously request to use the memory of the processor, the locking operation is first executed on the memory of the processor when the operating system sends the memory request instruction; the memory may only be requested to use after locking is successful, and the locking operation refers to an exclusive operation of memory request; and after the current operating system successfully performs locking, and if locking is not released, other servers do not have permission to use the processor memory.

In some embodiments of the present disclosure, executing the locking operation on the memory of the processor includes: determining whether the memory is currently in a locked state, where the locked state represents a state that the memory is requested for use; executing the locking operation on the memory when the memory is not currently in the locked state; and when the memory is currently in the locked state, determining that the locking of the memory fails, and requesting to lock the memory of the processor again after a preset duration, until the memory is successfully locked, or until the number of times for requesting for locking is greater than the preset number of times.

Before the processor runs, an initialization operation needs to be performed on the metadata storage area and the data storage area in the processor. In some embodiments of the present disclosure, the records stored in the mapping table in the metadata storage area are initialized, and the initialization operation is performed on memory management information.

Before a memory request operation is performed, the following configurations are performed on the memory management information.

```
typedefstruct {
uint32_t MemReady;
uint32_t MemLock;
}MallocMemInfo_T;
```

Where a member variable MemLock of a structure body MallocMemInfo_T indicates whether the shared memory has been initialized; a variable MemReady is 0xA5A5A5A5, and indicates that the initialization operation has been completed, and dynamic request and memory releasing may be normally performed; and a member variable MemReady of the structure body MallocMemInfo_T represents whether it is locked.

In some embodiments of the present disclosure, if the variable MemLock is read to be 0, it indicates that there is no system or task requesting for memory at the moment, that is, the memory is not in the locked state currently. If the variable MemLock is read to be 0xA5A5A5A5, it indicates that there is a system or a task requesting for memory, and re-requesting needs to wait until the current request is completed, such that the locking of the current request fails.

In some embodiments of the present disclosure, if locking failure occurs when the locking operation is performed on the memory, the locking of the memory is requested again after waiting for the preset duration, until locking is succeeded. For example, the preset duration may be 100 microseconds.

In some embodiments of the present disclosure, if the locking of the request fails, and the number of times for repeated requests exceeds the preset number of times, it indicates that the memory in the processor within the current duration is in an unallocable state, and then the request operation is stopped. For example, the preset number of times may be 3. When the number of times for locking requests is greater than 3, a message that the current memory is unavailable may be returned to the operating system sending the request.

In some embodiments of the present disclosure, after there is the target virtual channel that may be used by the first operating system in the memory space of the processor, the first operating system stores the target data to be transmitted to the corresponding target virtual channel. In some embodiments of the present disclosure, the occupation state of the memory space of the processor is updated according to a data writing condition of the first operating system, that is, a target consecutive memory space is changed from the unoccupied state to the occupied state. In addition, in order to cause other systems or tasks to request for memory, the locking of the memory is released.

In some embodiments of the present disclosure, the method further includes releasing the locking of the memory when the consecutive preset number of target records is not scanned.

In some embodiments of the present disclosure, after the records in the mapping table are scanned, the preset number of consecutive storage units that are in the idle state is not detected, and it indicates that there is no enough space memory page in the memory of the processor for the first operating system to use, such that the current dynamic request for memory fails, and the locking of the memory is released.

In some embodiments of the present disclosure, the interrupt notification message is sent to the second operating system by means of a Software Generated Interrupt (SGI).

In some embodiments of the present disclosure, sending the interrupt notification message to the second operating system by means of the SGI includes: writing an interrupt number and the ID of the CPU core of the second operating system to a preset register of the processor, and generating the interrupt notification message on the basis of the interrupt number and the ID of the CPU core of the second operating system.

In some embodiments of the present disclosure, the SGI is an interrupt generated by the software; and the software may send the interrupt to the CPU core that executes the software and may also send the interrupt to other CPU cores. The preset register may be a GICD_SGIR register; an SGI number and a destination CPU ID may be written into the GICD_SGIR register through the software, so as to generate the SGI; and the SGI number is the SGI number reserved for inter-core communication.

In a multi-core heterogeneous operating system, in order to maximize the compatibility with a resource allocation mode, No. 8-15 (8 interrupts in total) are used to represent an inter-core interrupt vector table. When the first operating system is the RTOS and the second operating system is the Linux operating system, one feasible allocation plan of the vector table is shown in Table 1.

TABLE 1

| Serial Number | Interrupt number | Trigger source | Response source | Meaning |
|---|---|---|---|---|
| 1 | 8 | RTOS core | Linux core | The RTOS proactively releases a CPU core |
| 2 | 9 | Linux core | RTOS core | The Linux system requests to take over the CPU core |
| 3 | 10 | RTOS core | Linux core | The RTOS passively releases the CPU core |
| 4 | 11 | RTOS core | Linux core | The RTOS rejects to release the CPU core |
| 5 | 12 | RTOS core | Linux core | The RTOS occupies the CPU core |

In some embodiments of the present disclosure, the interrupt notification message is sent to the second operating system by means of a hardware interrupt.

In some embodiments of the present disclosure, the hardware interrupt refers to an interrupt generated by a hardware device, and may be a privately-owned peripheral interrupt, or may also be a shared peripheral interrupt. It is to be noted that, the hardware interrupt is the interrupt introduced by hardware outside the CPU, and is random in nature; and the SGI is the interrupt introduced by the interrupt instruction executed by the software run in the CPU, and is predetermined. The mode of generating the interrupt notification message is not limited in this embodiment.

In some embodiments of the present disclosure, a method for sharing a memory is provided. The method includes the following steps.

At S101, the memory request instruction is received, and the locking operation is executed on the memory of the processor. The memory request instruction is configured to request to use the memory of the processor.

In some embodiments of the present disclosure, the memory request instruction is an instruction that the operating system run on the processor sends a request to use the memory of the processor. It is to be noted that, in order to prevent request conflicts when the plurality of operating systems simultaneously request to use the memory of the processor, the locking operation is first executed on the memory of the processor when the operating system sends the memory request instruction; the memory may only be requested to use after locking is successful, and the locking operation refers to an exclusive operation of memory request; and after the current operating system successfully performs locking, and if locking is not released, other servers do not have permission to use the processor memory.

In the method for sharing a memory provided in this embodiment of the present disclosure, before the locking operation is executed on the memory of the processor, the method further includes: determining whether the memory is currently in the locked state, where the locked state represents the state that the memory is requested for use; and executing the locking operation on the memory when the memory is not currently in the locked state.

In some embodiments of the present disclosure, since request conflicts occurs when the plurality of systems or the plurality of tasks simultaneously request to use the memory, the memory of the processor may only be locked by one system or task within the same time period, such that when it is detected that the current memory is not in the locked state, the current operating system may execute the locking operation on the memory.

In some embodiments of the present disclosure, whether the memory is in the locked state is determined by determining whether a preset variable stored in the memory is a preset value; if the preset variable is not a preset parameter number, it indicates that the memory is not in the locked state, and there is no other system or task requesting for memory spaces, such that the locking succeeds; otherwise, the preset variable is a preset parameter, it indicates that the memory is in the locked state at the current moment, and there are other systems or tasks other than the operating system requesting for the memory spaces, such that the locking fails.

In the method for sharing a memory, after whether the memory is currently in the locked state is determined, the method further includes: when the memory is currently in the locked state, determining that the locking of the memory fails; and when the locking of the memory fails, requesting again to lock the memory of the processor after the preset duration, until the memory is successfully locked, or until the number of times for requesting for locking is greater than the preset number of times.

In some embodiments of the present disclosure, if locking failure occurs when the locking operation is performed on the memory, the locking of the memory is requested again after waiting for the preset duration, until locking is succeeded. For example, the preset duration may be 100 microseconds.

In some embodiments of the present disclosure, if the locking of the request fails, and the number of times for repeated requests exceeds the preset number of times, it indicates that the memory in the processor within the current duration is in an unallocable state, and then the request operation is stopped. For example, the preset number of times may be 3. When the number of times for locking requests is greater than 3, a message that the current memory is unavailable may be returned to the operating system sending the request.

At S102, when the memory is successfully locked, the occupied state of the memory is read, and whether there is an idle target memory space in the memory is determined according to the occupied state of the memory. The size of the target memory space is greater than or equal to the size of the memory requested by the memory request instruction.

After request locking succeeds, the operating system requests for the memory of the processor. In some embodiments of the present disclosure, information used for recording the occupied state of the memory is scanned; and whether there is the target memory space is determined. That is to say, whether there are consecutive memory spaces that are in the unoccupied state and may meet memory usage requirements in the processor is determined. Meeting the memory usage requirements means that the size of the memory space is greater than or equal to the size of the memory requested by the operating system.

It is to be noted that, discontinuous memory spaces may also be used when the memory is requested. A pointer may be added after a memory block which is not the smallest, and points to the next smallest memory block obtained through request. In addition, when data is read and written, data reading and writing across data blocks are realized according to a storage address and the pointer. The form of the target memory space is not limited in this embodiment.

At S103, when there is the target memory space in the memory, the address information of the target memory space is fed back to a sending end of the memory request instruction, the occupied state of the memory is updated, and the locking of the memory is released.

The sending end refers to the operating system sending the memory request instruction. It is to be noted that, since the operating system sends and receives the data by using the shared memory during inter-core communication and accesses the data by using an address returned by the requested memory during data sending and receiving, the address information of the memory space that has been requested needs to be determined.

In some embodiments of the present disclosure, after there is the target memory space that may be used by the operating system in the memory spaces of the processor, the address information of the target consecutive space is sent to the operating system, and according to the address information, the operating system stores, in the corresponding memory space, the data to be transmitted.

In some embodiments of the present disclosure, the occupation state of the memory spaces of the processor is updated according to the data writing condition of the operating system. That is to say, the target memory space is changed from the unoccupied state to the occupied state, and the locking operation before dynamic memory requesting is released, so as to cause other operating systems to request to use the memory spaces of the processor.

By means of the above steps of receiving the memory request instruction, and executing the locking operation on the memory of the processor, where the memory request instruction is configured to request to use the memory of the processor; when the memory is successfully locked, reading the occupied state of the memory, and determining, according to the occupied state of the memory; whether there is an idle target memory space in the memory, where the size of the target memory space is greater than or equal to the size of the memory requested by the memory request instruction; and when there is the target memory space in the memory, feeding back the address information of the target memory space to a sending end of the memory request instruction, updating the occupied state of the memory; and releasing the locking of the memory, the problems of low use efficiency, poor flexibility and over-dependence on the operating system of the memory sharing among a plurality of cores are solved, and the effect of improving the flexibility and use efficiency of the shared memory and reducing the dependence on the operating system is achieved.

In the method for sharing a memory, the memory includes the metadata storage area and the data storage area. The data storage area is configured to store the service data. The metadata storage area stores the mapping table, and the mapping table is configured to record the occupied state of the data storage area. Reading the occupied state of the memory, and determining, according to the occupied state of the memory, whether there is the idle target memory space in the memory includes: reading the records in the mapping table from the metadata storage area, and determining, according to the records in the mapping table, whether there is the target memory space in the data storage area.

The occupied state of the memory is queried by means of querying the records in the mapping table. In some embodiments of the present disclosure, the metadata storage area stored in the processor is acquired, and the mapping table in the metadata storage area is identified; the occupied state of the data storage area is read by traversing the records in the mapping table; and whether there are consecutive memory spaces that are in the idle state and meet the memory usage requirements in the data storage area is determined.

In the method for sharing a memory provided in this embodiment of the present disclosure, the data storage area is formed by a plurality of memory pages; and there are the plurality of records in the mapping table, and each record is configured to record an occupied state of the memory page. Reading the records in the mapping table from the metadata storage area, and determining, according to the records in the mapping table, whether there is the target memory space in the data storage area includes: determining the preset number of the memory pages requested by the memory request instruction; successively scanning each record from the initial position of the mapping table; and when the a consecutive preset number of target records is scanned, determining that there is the target memory space in the memory, where the target records indicate that the memory pages are in the idle state.

It is to be noted that, the data storage area is divided into a plurality of allocation units according to the memory size, and each allocation unit is recorded as one memory page. For example, the memory space of the data storage area is A bytes, and the divided allocation units are B bytes, such that the data storage area totally includes A/B memory pages. The records in the mapping table are memory page records, and each memory page record is configured to record the occupied state of the memory page. The number of the memory page records in the mapping table is the same as the number of the memory pages in the data storage area.

The data storage area is a dynamic allocation memory block area; and the metadata storage area includes a dynamic allocation memory mapping table area. The mapping table area is divided into the same number of the records as the number of the memory pages in the data storage area; the records are recorded as the memory page records; and all the memory page records are combined into the mapping table. All the memory page records in the mapping table are in a one-to-one correspondence relationship with all the memory pages in the data storage area. Each memory page record indicates an allocation state of the corresponding memory page, that is, whether the memory page is occupied.

In some embodiments of the present disclosure, since the operating system needs to occupy the consecutive memory pages in the processor when performing cooperation of the service data, the preset number of the memory pages in a memory request instruction first needs to be determined first; and since the memory space of each memory page is the same, the preset number of the consecutive memory pages required may be calculated by means of the space size of the required memory, and is recorded as numb.

In some embodiments of the present disclosure, after the mapping table in the metadata storage area of the processor is acquired, the memory page records are traversed from the index position in the mapping table. The index position may be the initial position of the mapping table. Starting from the initial position of the mapping table, each memory page record of the mapping table is queried in sequence to determine whether there are consecutive memory page records with free memory pages greater than or equal to the numb; and if there are memory page records meeting the above condition, through a correspondence relationship between the memory page records and the memory pages, it is determined that there is the target memory space in the processor.

In the method for sharing a memory provided in this embodiment of the present disclosure, after each record is scanned in sequence from the initial position of the mapping table, the method further includes determining that there is no target memory space in the memory when all the records in the mapping table are scanned and there are no consecutive preset number of the target records.

In some embodiments of the present disclosure, starting from the initial position of the mapping table, whether there are consecutive spaces and have the number of the memory pages greater than or equal to the numb is determined by querying the memory page records of the mapping table; and if the consecutive preset number of idle memory pages is still not found after the entire mapping table is scanned, it indicates that there is no target memory space.

In the method for sharing a memory provided in this embodiment of the present disclosure, the number of the scanned target records is recorded by the counter; during the process that each record is scanned in sequence from the initial position of the mapping table, and when the target records are currently recorded, the counter is controlled to plus one; and when non-target records are scanned currently, the counter is controlled to reset. The non-target records indicate that the memory pages are in the occupied state.

In some embodiments of the present disclosure, whether there is the consecutive preset number of the target records, that is, whether there is the target memory space, is determined by using the relationship between the value of the counter and the number of the required memory pages. In some embodiments of the present disclosure, the count of the counter is recorded as cntr. If the scanned memory page is null, an operation of adding 1 to the cntr is performed; if the scanned memory page is not null, the number cntr of the accumulated and consecutive memory pages in the idle state is cleared, and the consecutive empty memory pages are continuously found by starting from the address after the memory page, until the cntr is equal to the numb, indicating that the consecutive memory pages that are in the idle state and meet the memory requirements have been found; and if the cntr is less than the numb during the scanning of the entire mapping table, it indicates that the current dynamic request for memory fails, and there is no target memory space.

In the method for sharing a memory provided in this embodiment of the present disclosure, when the initial position is the last position in the mapping table, feeding back the address information of the target memory space to the sending end of the memory request instruction includes: determining the last scanned target record in the consecutive preset number of the target records, and feeding back, to the sending end, a head address of the memory page indicated by the last scanned target record.

In some embodiments of the present disclosure, when the mapping table is scanned, a scanning mode may select to scan from the first position of the mapping table or start scanning from the last position of the mapping table. When the scanning mode is to scan from the last position of the mapping table, and when the value cntr displayed by the counter is greater than or equal to the preset number numb, the last memory page scanned records the head address of the corresponding memory page, and the states of these memory pages are set to be non-null in the memory page records; and the head address is used as the head address of the entire consecutive memory page of the current memory request instruction.

In some embodiments of the present disclosure, the address is fed back to the operating system sending the memory request instruction, and the data writing operation is performed on the memory by the operating system according to the address information.

In the method for sharing a memory provided in this embodiment of the present disclosure, the initial position is the first position in the mapping table. Feeding back the address information of the target memory space to the sending end of the memory request instruction includes: determining the first scanned target record in the consecutive preset number of the target records, and feeding back, to the sending end, a head address of the memory page indicated by the first scanned target record.

In some embodiments of the present disclosure, when the scanning mode is to scan from the first position of the mapping table, and when the value cntr displayed by the counter is greater than or equal to the preset number numb, the address recorded by the first memory page scanned is used as the head address; and the head address is sent to the operating system sending the memory request instruction, and the data writing operation is performed on the memory by the operating system according to the address information.

In the method for sharing a memory provided in this embodiment of the present disclosure, during the process of successively scanning each record from the initial position of the mapping table, the first target record scanned in the consecutive target records is stored through a preset variable.

In some embodiments of the present disclosure, the preset variable refers to a variable in the mapping table that is configured to store the address information of the initial position and is recorded as offset. When the idle and consecutive memory page is scanned each time, the operation of adding 1 to the value cntr displayed on the counter is performed; and when the value cntr displayed on the counter is greater than or equal to the preset number numb, the address information stored by the offset currently is used as the address of the first target record.

In the method for sharing a memory provided in this embodiment of the present disclosure, after the occupied state of the memory is read, and whether there is the idle target memory space in the memory is determined according to the occupied state of the memory, the method further includes: releasing the locking of the memory when there is no idle target memory space in the memory.

In some embodiments of the present disclosure, after the memory page records in the mapping table are scanned, and when it is detected that the preset number of consecutive idle memory pages is not included, that is, the target memory space is not included, it indicates that there is no enough space memory page in the memory of the processor for the operating system to use, such that the current dynamic request for memory fails, and the locking of the memory is released.

In the method for sharing a memory provided in this embodiment of the present disclosure, the memory includes the metadata storage area and the data storage area. The data storage area is configured to store the service data. The metadata storage area stores memory management information. Determining whether the memory is currently in the locked state includes: reading the memory management information stored in the metadata storage area, and determining whether the memory management information includes preset information, where the preset information indicates that the memory is in the locked state; if the memory management information includes the preset information, determining that the memory is not in the locked state currently; and if the memory management information does not include the preset information, determining that the memory is currently in the locked state.

With regard to determining whether the memory of the processor is in the locked state, determination needs to be performed by using the memory management information in the metadata storage area. In some embodiments of the present disclosure, when the memory management information in the metadata storage area is acquired, whether the memory management information includes the preset information is determined, and the preset information is configured to indicate whether the memory is in the locked state; and if the memory management information does not include the preset information, it indicates that the current memory is in an unlocked state, otherwise the memory is in the locked state.

In the method for sharing a memory provided in this embodiment of the present disclosure, the memory management information includes first field information and second field information; the first field information is configured to describe whether the memory is in the locked state; and the second field information is configured to describe whether the initialization of the memory is completed. Before the memory request instruction is received, the method further includes: initializing the first field information and the second field information that are stored in the data storage area.

Before the embedded system runs, an initialization operation needs to be performed on the metadata storage area and the data storage area in the processor. In some embodiments of the present disclosure, the memory page records stored in the mapping table in the metadata storage area are initialized, and the initialization operation is performed on the memory management information.

In some embodiments of the present disclosure, the memory management information is formed by the first field information and the second field information. That is to say, the first field information represents whether to be locked, and the second field information is configured to represent whether initialization is completed. Before the memory requesting operation is performed, the following configurations are performed on the memory management information.

```
typedefstruct {
  uint32_t MemReady;
  uint32_t MemLock;
}MallocMemInfo_T;
```

Where the member variable MemLock (the second field information) of the structure body MallocMemInfo_T indicates whether the shared memory has been initialized; the member variable MemReady (the first field information) of the structure body MallocMemInfo_T indicates whether to be locked; if the variable MemLock is 0, it indicates that there is no system or task requesting for memory at the moment, that is, locking is not performed; if MemLock is 0xA5A5A5A5, it indicates that there is a system or task requesting for memory, and other systems or tasks need to request again after the current request is completed; and if variable MemReady is 0xA5A5A5A5, it indicates that the initialization operation has been completed, and dynamic request and memory releasing may be normally performed.

In the method for sharing a memory provided in this embodiment of the present disclosure, updating the occupied state of the memory includes changing, to the occupied state, the state of the memory page corresponding to the target memory space recorded in the mapping table.

In some embodiments of the present disclosure, when the operating system needs to occupy the target memory space, the memory page records in the mapping table area of the metadata storage area are updated according to the correspondence relationship between the memory pages and the memory page records by identifying the address information of the plurality of memory pages of the target memory space, such that the memory page records are changed from the unoccupied state to the occupied state.

In some embodiments of the present disclosure, a communication mode between operating systems is provided. The method includes the following steps.

At S201, the memory request instruction of the first operating system is received, and the locking operation is executed on the memory of the processor. The memory request instruction is configured to request to use the memory of the processor.

It is to be noted that, in order to avoid request failure when the plurality of operating systems simultaneously request the memory spaces of the processor, when sending the memory request instruction, the first operating system requests to perform the locking operation on the memory of the processor, and the memory may only be requested after the locking request succeeds.

In some embodiments of the present disclosure, whether locking succeeds is determined by determining whether the preset variable stored in the memory is the preset value; if the preset variable is not the preset parameter, it indicates that there is no other system or task requesting for memory spaces, such that the locking succeeds; otherwise, if the preset variable is the preset parameter, it indicates that there are other systems or tasks other than the operating system requesting for the memory spaces, such that the locking fails.

At S202, when the memory is successfully locked, the occupied state of the memory is read, and whether there is an idle target memory space in the memory is determined according to the occupied state of the memory. The size of the target memory space is greater than or equal to the size of the memory requested by the memory request instruction.

In some embodiments of the present disclosure, when the request locking succeeds, according to the memory request instruction sent by the operating system, whether there is the target memory space is determined by scanning the information used for recording the occupied state of the memory, that is, whether there are consecutive memory spaces that are in the unoccupied state in the processor is determined. In an exemplary embodiment of the present disclosure, whether the sizes of the consecutive memory spaces that are in the unoccupied state are greater than or equal to the size of the memory requested by the operating system is determined, so as to obtain a determination result.

At S203, when there is the target memory space in the memory, the address information of the target memory space is fed back to the first operating system, the occupied state of the memory is updated, and the locking of the memory is released.

In some embodiments of the present disclosure, after the determination result indicates that there is the target memory space that may be used by the operating system in the memory spaces of the processor, the address information of the target consecutive space is sent to the operating system, and according to the address information, the operating system stores, in the corresponding memory space, the data to be transmitted.

In some embodiments of the present disclosure, the occupation state of the memory spaces of the processor is updated according to the data writing condition of the operating system. That is to say, the target memory space is changed from the unoccupied state to the occupied state, and the locking operation before the memory is dynamically requested is released.

At S204, in response to a storage operation of the first operating system, the target data is stored to the target memory space, and the address information of the consecutive memory spaces is sent to the second operating system.

In some embodiments of the present disclosure, after the memory is successfully requested, the first operating system stores the target data to be transmitted to the requested target memory space and sends the address information of the target memory space to the second operating system cooperating with the first operating system, so as to notify the second operating system to perform data acquisition.

At S205, an acquisition instruction sent by the second operating system on the basis of the address information is received, and the target data stored in the target memory space is sent to the second operating system.

In some embodiments of the present disclosure, after the second operating system receives the address information of the target memory space, the acquisition instruction of the data is sent, and the embedded system receives the instruction and sends the target data stored in the target memory space to the second operating system.

By means of the above steps of receiving the memory request instruction of the first operating system, and executing the locking operation on the memory of the processor, where the memory request instruction is configured to request to use the memory of the processor; when the memory is successfully locked, reading the occupied state of the memory, and determining, according to the occupied state of the memory, whether there is an idle target memory space in the memory, where the size of the target memory space is greater than or equal to the size of the memory requested by the memory request instruction; when there is the target memory space in the memory; feeding back the address information of the target memory space to a sending end of the memory request instruction, updating the occupied state of the memory, and releasing the locking of the memory; in response to a storage operation of the first operating system, storing the target data to the target memory space, and sending the address information of the consecutive memory spaces to the second operating system; and receiving the acquisition instruction sent by the second operating system on the basis of the address information, and sending the target data stored in the target memory space to the second operating system, the problems of low use efficiency, poor flexibility and over-dependence on the operating system of the memory sharing among a plurality of cores are solved, and the effect of improving the flexibility and use efficiency of the shared memory and reducing the dependence on the operating system is achieved.

In some embodiments of the present disclosure, when the first operating system performs a data reading and writing operation by using a physical address, and the second operating system performs the data reading and writing operation by using a virtual address, the second operating system converts the address information of the target memory space into the virtual address, and uses the virtual address to access the memory; so as to read the target data from the target memory space.

Since the address returned by the dynamically-requested memory is used when the shared memory sends and receives the data during inter-core communication, but address systems used by different system may be different, for example, the RTOS is the first operating system, and the non-RTOS is the second operating system. The physical address may be directly used to access the shared memory in the RTOS, and the non-RTOS may not directly use the physical address to access the shared memory, such that the mapped virtual address needs to be used. After the second operating system receives the address information of the target memory space, conversion is performed through the address information offset, so as to map the address information to the virtual address, and an operation is performed according to the virtual address. In some embodiments of the present disclosure, a shared memory virtual-based address under the non-RTOS is vBase (assuming that a shared memory real physical address is 0x96000000); and a shared memory physical-based address under the RTOS is pBase (that is, 0x96000000).

The address returned by the dynamically-requested memory in the non-RTOS is also the virtual address vData. In the non-RTOS, Offset=vData−vBase; and the data is sent from the non-RTOS to the RTOS, and the RTOS uses an address pData to access the dynamically-requested shared memory pData=pBase+Offset.

The address returned by the dynamically-requested memory in the RTOS is the physical address pData. In the RTOS, Offset=pData−pBase; and the data is sent from the RTOS to the non-RTOS, and the non-RTOS uses the address vData to access the dynamically-requested shared memory vData=vBase+Offset.

In some embodiments of the present disclosure, the memory includes the metadata storage area and the data storage area. The data storage area is formed by the plurality of memory pages, and each memory page is configured to store the service data. The metadata storage area stores the mapping table, the mapping table includes the plurality of records, and each record is configured to record the occupied state of the memory page. Reading the occupied state of the memory, and determining, according to the occupied state of the memory, whether there is the idle target memory space in the memory includes: determining the preset number of the memory pages requested by the memory request instruction; successively scanning each record from the initial position of the mapping table; and when the a consecutive preset number of target records is scanned, determining that there is the target memory space in the memory, where the target records indicate that the memory pages are in the idle state.

In some embodiments of the present disclosure, the metadata storage area stored in the processor is acquired, and the mapping table in the metadata storage area is identified; each memory page record is traversed from the index position in the mapping table; each memory page record of the mapping table is queried in sequence to determine whether there are consecutive memory page records with free memory pages greater than or equal to the preset number; and if there are memory page records meeting the above condition, through the correspondence relationship between the memory page records and the memory pages, it is determined that there is the target memory space in the processor.

In some embodiments of the present disclosure, when the initial position is the last position in the mapping table, feeding back the address information of the target memory space to the sending end of the memory request instruction includes: determining the last scanned target record in the consecutive preset number of the target records, and feeding back, to the sending end, a head address of the memory page indicated by the last scanned target record.

In some embodiments of the present disclosure, when the mapping table is scanned, a scanning mode may select to scan from the first position of the mapping table or start scanning from the last position of the mapping table. When the scanning mode is to scan from the last position of the mapping table, the last memory page scanned records the head address of the corresponding memory page, and these memory pages are set to be non-null; and the head address is used as the head address of the entire consecutive memory page of the current memory request instruction. In an exemplary embodiment of the present disclosure, the address is fed back to the operating system sending the memory request instruction, and the data writing operation is performed on the memory by the operating system according to the address information.

This embodiment further provides a method for sharing a memory. The method includes: before the operating system sends the memory request instruction, in order to prevent request conflicts from occurring when the plurality of operating systems simultaneously request the memory spaces of the processor, requiring to request the locking operation, and determining whether the locking succeeds; when the determination result indicates that the dynamically-requested memory is successfully locked, calculating the number of the consecutive memory pages to be allocated according to the size of the memory in the sent memory request instruction, and recording the number as nmemb; if the determination result indicates that the locking of the request fails, sending a request again after waiting for a period of time (which may be 100 microseconds), until the request succeeds; and if the number of times of failed locking requests is greater than the preset number of times (the preset number of times may be three), exiting memory requesting.

In some embodiments of the present disclosure, after the locking request succeeds, the initialization operation is performed on the metadata storage area of the processor, and the last position of the mapping table is recorded as offset; the number of the consecutive memory pages required is calculated according to the space size of the required memory in the memory request instruction, and the number of the memory pages is recorded as nmemb, and set a counter to record the number of memory pages, which is recorded as cmemb; then the mapping table of the metadata storage area in the processor is acquired, and the entire mapping table starts to be scanned from the offset position of the mapping table; consecutive empty memory pages are found through the correspondence relationship between the memory page records stored in the mapping table and the memory pages in the data storage area; if the current memory page scanned is in the occupied state, offset=offset−cmemb; then the data cmemb of the accumulated consecutive empty memory pages in the counter is cleared, and the consecutive empty memory pages are continuously found from a new offset position; if the scanned memory pages are null, that is, in the idle state, the value cmemb of the count is added with 1, and offset=offset−1, so as to continuously determine the next memory page, until the cmemb is equal to the nmemb, that is, when the data of the counter is the same as the space size of the required memory, it indicates that the consecutive memory pages meeting requirements are scanned.

In some embodiments of the present disclosure, the memory pages meeting the requirements are marked as occupied state in the corresponding mapping table; the head address of the last found memory page is used as the head address of the entire consecutive memory page of the dynamic request; and the lock of the dynamically-requested memory is released, such that the current dynamic request for memory succeeds.

If the value of the offset is less than 0 during the scanning of the entire mapping table, it indicates that there is no memory page meeting the requirements for the operating system to use; and the lock of the dynamically-requested memory is released, such that the current dynamic request for memory fails.

In addition, the size may also be dynamically adjusted after the space is dynamically requested and found to be insufficient. In some embodiments of the present disclosure, the updated memory request instruction may be sent again, and the locking operation is executed on the memory; when the locking succeeds, and if the memory space that needs to be requested by the updated memory request instruction is increased, whether there is the required memory space after the target consecutive memory that has been requested is determined; if so, the request succeeds; and if the memory space that needs to be requested by the updated memory request instruction is reduced, part of the memory space is released.

In some embodiments of the present disclosure, the effect of improving the flexibility and use efficiency of the shared memory may be achieved by dividing a plurality of storage areas, using the index position for the dynamic request according to the space size actually required, releasing the space after use, and dynamically adjusting the size after the space is dynamically requested and found to be insufficient.

Figure 7:
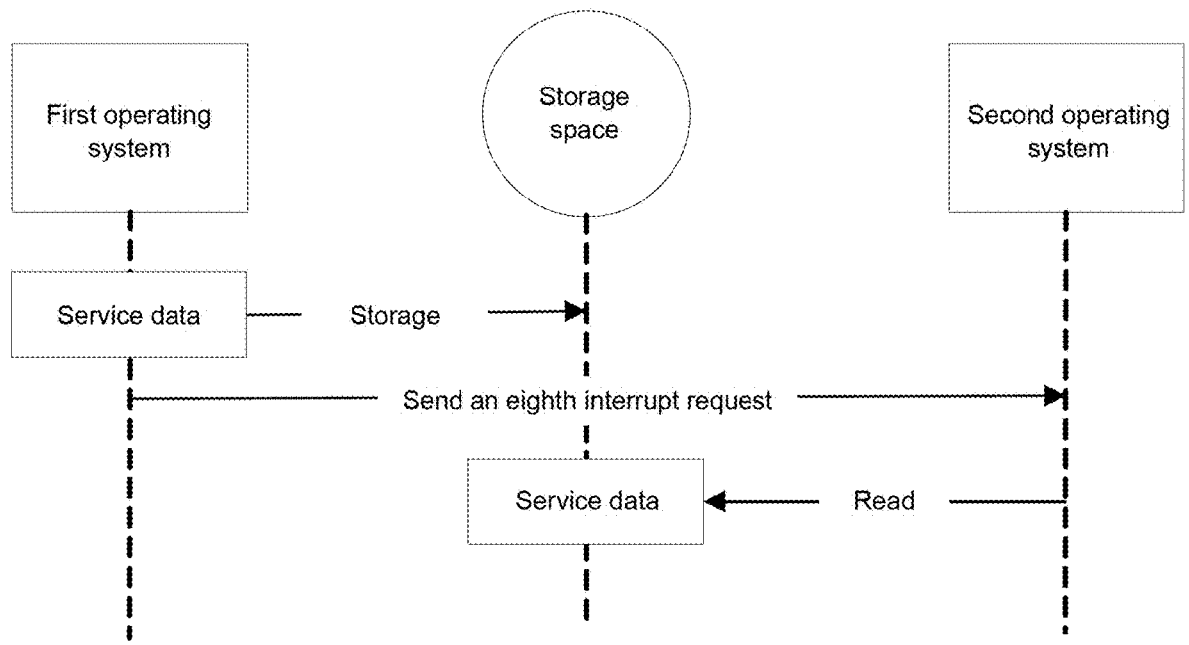
FIG. 7 is a schematic diagram of a service data interaction process according to an embodiment of the present disclosure.

In some embodiments of the present disclosure, FIG. 7 is a schematic diagram of a service data interaction process according to an embodiment of the present disclosure. As shown in FIG. 7, the first operating system generates the service data during running, and determines that the service data is required by the second operating system or needs to be sent to the second operating system. In this case, the first operating system stores the service data to the storage space and sends an eighth interrupt request to the second operating system. The second operating system reads the service data from the storage space in response to the eighth interrupt request and performs subsequent processing.

The first operating system may, but is not limited to, have different running mechanisms, which are configured to, for example: control the first operating system to run on the basis of the periodicity of the processor; or in response to a received wake-up request, control the first operating system to run on the basis of the processor; or according to a matching degree between an operation service generated on the processor and the first operating system, control the first operating system to run on the basis of the processor.

In some embodiments of the present disclosure, the running mechanism of the first operating system may, but is not limited to, include periodic running and triggered running. The periodic running may also be called a round-robin mode. The triggered running may also be called a triggered mode, and may, but is not limited to, include two modes. One mode may be request triggered, and the wake-up running of the first operating system is triggered by a wake-up request. The other mode may be condition triggered, and the wake-up running of the first operating system is triggered by a matching degree between the operation service and the first operating system.

In some embodiments of the present disclosure, when the first operating system is in the periodic running, the duration of a single running period may be the same or different from an interval duration between two running periods. Within the interval duration between the two running periods, the first operating system may, but is not limited to, be in the hibernation state; and the processor core allocated for the first operating system is used by the second operating system. If the duration of the single running period is the same as the interval duration between the two running periods, the first operating system and the second operating system alternately occupy the processor core allocated for the first operating system with the same duration. If the duration of the single running period is different from the interval duration between the two running periods, the first operating system and the second operating system alternately occupy the processor core allocated for the first operating system with different durations. The duration occupied by the first operating system may be greater than the duration occupied by the second operating system, or the duration occupied by the second operating system may be greater than the duration occupied by the first operating system.

According to different running scenarios, different system functions may, but are not limited to, use different running mechanisms to run the first operating system, so as to find, more flexibly, the running mechanism that is more compatible with the current running scenario and the system function, thereby improving the processing efficiency of the operation services.

Figure 8:
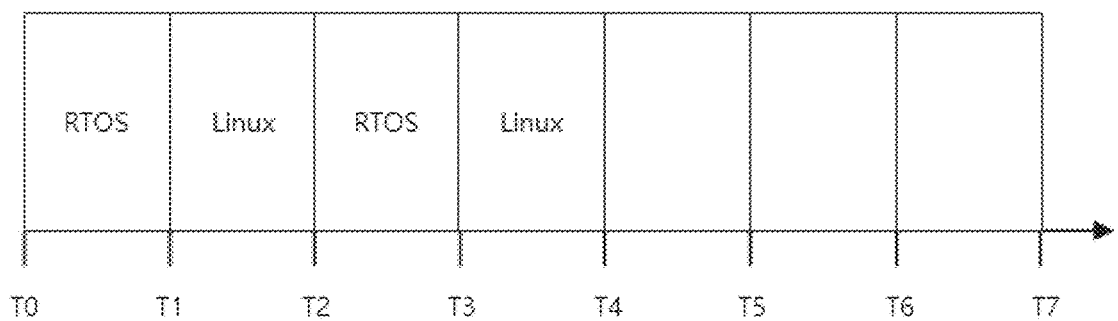
FIG. 8 is a schematic diagram I of a running process of a first operating system according to an embodiment of the present disclosure.

An implementation of the present disclosure provides a wake-up strategy of the first operating system (for example, the RTOS) under the round-robin mode. FIG. 8 is a schematic diagram I of a running process of a first operating system according to an embodiment of the present disclosure. As shown in FIG. 8, the round-robin mode may be a round-robin scheduling mode based on time slices, and periodic wake-up running of the RTOS may be performed according to set time. During the running of a multi-system (using a dual system of the Linux and the RTOS as an example) under this mode, (T0, T1)=(Tn, T(n+1)), where n is a non-zero positive integer, that is to say; the dual system alternately occupies the CPU core 0 with the same time. The RTOS schedules the CPU core 0 to run a process within a time slice (T0, T1); and the Linux schedules the CPU core 0 to run a process within a time slice (T1, T2). Within the time slice, the RTOS is in the hibernation state, and so on, the subsequent time slices are segmented according to periods.

For a request triggering mode in the triggered mode, the wake-up request may, but is not limited to, be initiated by a device connected to the first operating system, or may, but is not limited to, be initiated by the second operating system.

Figure 9:
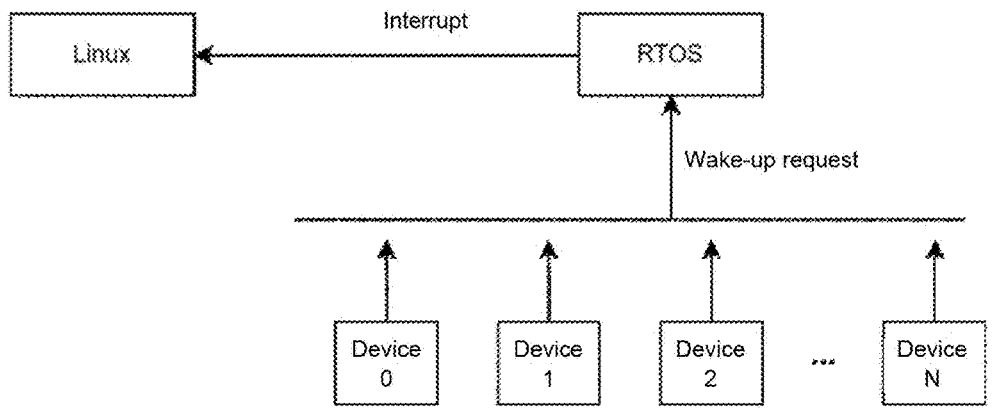
FIG. 9 is a schematic diagram II of a running process of a first operating system according to an embodiment of the present disclosure.

In some embodiments of the present disclosure, for example, the device triggers the first operating system to wake up and run. A wake-up strategy of the first operating system (for example, the RTOS) under the triggered mode is provided. FIG. 9 is a schematic diagram II of a running process of a first operating system according to an embodiment of the present disclosure. As shown in FIG. 9, the triggered mode may be initiated by an interrupt initiated by devices at an RTOS bus domain. The RTOS bus domain is connected to the device 0 to device N. When the RTOS is in the hibernation state, assuming that the device 0 triggers the interrupt to the RTOS at a certain moment, the RTOS is then woken up, and the woken RTOS first triggers the interrupt occupying the CPU core 0 to the Linux; the Linux releases the CPU core 0 after receiving the interrupt, and saves a site (pushing the run data into a stack); then the RTOS schedules the CPU core 0 to process the operation service indicated by the interrupt triggered by the device 0 and if the system is currently in the round-robin mode, the subsequent processing process is the same as the round-robin mode, such that details are not described herein again.

If the first operating system is triggered to wake up and run by the second operating system, and if the second operating system currently occupies the processor core allocated for the first operating system, the processor core may be directly released; and after the first operating system is woken up, the processor core is used to process the operation services allocated by the second operating system.

In some embodiments of the present disclosure, services run on the first operating system may, but are not limited to, include a generation service of a hardware interface signal. The implementation of the present disclosure provides a process of generating the hardware interface signal. The process includes the following steps.

At S11, a request command is acquired by the first operating system.

In S11, the request command may be a generation command of the hardware interface signal. For example, the hardware interface signal may be a Platform Environment Control Interface (PECI) signal, and then the request command is a PECI request command based on a PECI protocol.

In some embodiments of the present disclosure, the hardware interface signal may also be a hardware interface signal of other protocol types, such as a High Definition Multimedia Interface (HDMI) signal, a Reduced Gigabit Media Independent Interface (RGMII) signal, a Serial Gigabit Media Independent Interface (SGMII) signal, a General-Purpose Input/Output (GPIO) signal, a Serial Peripheral Interface (SPI) SPI, etc. Based on this, the request command may also be a request command of other protocol types. For example, when the hardware interface signal is the GPIO signal, the request command is a GPIO request command. Optional types of the request command and the hardware interface signal are not particularly limited in the present disclosure.

At S12, a plurality of pieces of logical bit information corresponding to the request command are determined.

In S12, after the first operating system obtains the request command, the plurality of pieces of logical bit information corresponding to the request command may be obtained through analysis. There is a sequential order among the plurality of pieces of logical bit information. The first operating system may generate a waveform signal (i.e., the hardware interface signal) corresponding to the request command through the plurality of pieces of logical bit information corresponding to the request command, such that information included in the request command is transmitted to other devices through the hardware interface signal.

In some embodiments of the present disclosure, the request command includes at least one field, and each field may be represented by a logical bit 0 or 1. Based on this, a corresponding conversion relationship between each field and the logical bit 0 or 1 is the logical bit information corresponding to the field. When the request command corresponds to a plurality of fields, the request command corresponds to the plurality of pieces of logical bit information. In addition, each logical bit may be represented by the combined use of a high-level signal and a low-level signal. For example, the logical bit 0 may be represented by the combined use of the high-level signal with a first preset duration and the low-level signal with a second preset duration; and the logical bit 1 may be represented by the combined use of the high-level signal with the second preset duration and the low-level signal with the first preset duration. The first preset duration is different from the second preset duration. Based on this, since each logical bit includes both the high-level signal and the low-level signal, each logical bit is actually represented by a segment of waveform signal (the transformation between the high-level signal and the low-level signal is presented as a waveform). Since the request command corresponds to the plurality of pieces of logical bit information, that is, corresponding to a plurality of logical bits, the hardware interface signal corresponding to the request command is the waveform signal that is obtained by combining the waveform signal corresponding to each logical bit.

At S13, the hardware interface signal corresponding to the request command is generated according to the plurality of pieces of logical bit information and a timer.

In some embodiments of the present disclosure, the timer in S13 may be a timing program in the first operating system. The timer may also be a register on a chip where the first operating system is located. The timer may provide at least a timing function and a counting function. In the present disclosure, the hardware interface signal corresponding to the request command is generated by using the timing function and the counting function of the timer, in combination with the plurality of pieces of logical bit information.

It is to be noted that, for example, the chip is a BMC chip, and the hardware interface signal is the PECI signal. In the related art, in order to achieve a PECI communication between the BMC chip and a component such as a CPU, the BMC chip is required to have the hardware logic design of a PECI controller in the related art, causing the problem of high design cost of the BMC chip. In other words, in the related art, in order to generate the PECI signal on the BMC chip, the hardware logic design of the PECI controller has to be realized in advance on the BMC chip. In the present disclosure, the PECI signal may be generated on the BMC chip by only the first operating system, without realizing the hardware logic design of the PECI controller on the BMC chip, such that the design difficulty and design cost of the BMC chip are reduced.

On the basis of the content of S11 to S13, it may be learned that, in some embodiments of the present disclosure, the manner of generating, by the first operating system, the hardware interface signal corresponding to the request command is used to first acquire the request command through the first operating system; then the plurality of pieces of logical bit information corresponding to the request command are determined; and finally, the hardware interface signal corresponding to the request command is generated according to the plurality of pieces of logical bit information and the timer.

From the above content, it may be learned that, in some embodiments of the present disclosure, the hardware interface signal corresponding to the request command is generated by the first operating system, such that the technical effect of simulating the generation of the hardware interface signal in a software manner is realized. Therefore, the purpose that the chip does not need to have the hardware logic design of the related hardware interface signal is achieved, the design difficulty of the chip may be reduced, and the design cost of the chip may also be reduced.

It may be seen that, in some embodiments of the present disclosure, the purpose of using a software system to generate the hardware interface signal without performing hardware logic design of the hardware interface signal on the chip is achieved, such that the design difficulty of the chip is reduced, thereby solving the technical problem in the related art of high design cost of the chip caused by the requirement of the chip for the hardware logic design of the controller.

In some embodiments of the present disclosure, when a first request triggered by the second operating system is detected by the first operating system, request data is acquired. The first operating system and the second operating system run on the same processor. The request data is generated by the second operating system; and a service response speed of the second operating system is less than a service response speed of the first operating system. Finally, the request data is analyzed by the first operating system, so as to obtain the request command.

In some embodiments of the present disclosure, before the request data is acquired, the request data may be stored to a target memory (i.e., the storage space on the processor) by the second operating system; and after the request data is stored, the first request is triggered by the second operating system. The first request is configured to notify the first operating system to read the request data from the target memory; and the target memory is a memory that may be accessed by the first operating system and the second operating system.

In some embodiments of the present disclosure, the first operating system may also receive response data corresponding to the hardware interface signal. A transmission mode of the response data is the same as a transmission mode of the hardware interface signal. Next, the first operating system further adjusts a data structure of the response data to a second data structure.

In addition, after the data structure of the response data is adjusted to the second data structure, a second request is triggered by the first operating system. The second request is configured to notify the second operating system to read the response data.

For example, the first operating system is the RTOS the second operating system is the Linux system, and the hardware interface signal is the PECI signal. In views of a command request process, an upper-layer application (such as fault diagnosis and CPU temperature acquisition) of a PECI service involved in the Linux system first actively initiate PECI request commands according to needs. These request commands include, but are not limited to, a basic Ping ( ) command, a command for acquiring CPU temperatures, and a command for reading Machine Specific Register (MSR) information. Code implementation of different PECI request commands is completed by corresponding interface functions.

In some embodiments of the present disclosure, the Linux system writes the request data, such as a target address, reading and writing lengths, a command code and a para parameter, of each request command into the target memory according to PECI protocol specifications; and after the request data is completely written into the target memory, the Linux system generates the first request to notify the RTOS. The first request may be an SGI request (a communication interrupt request between the processor cores).

It is to be noted that, during the process that the request data is stored to the target memory by the second operating system, the second operating system stores the request data to the target memory according to the form of a first data structure. The first data structure at least includes a device address, a writing length, a reading length, a command code and a request parameter. The device address is configured to represent the address of a target device, and the target device is a device that generates the response data on the basis of the hardware interface signal. The command code is configured to distinguish different request commands. The writing length is configured to represent the number of bytes from the start of the command code to the end of the request data. The reading length is configured to represent the number of bytes in the request data including a completion code and read data. The request parameter is configured to represent a parameter of the request command.

In views of a command response process, the response data transmitted from a PECI bus is received by the RTOS; then data analysis is completed, so as to convert a signal form of the response data into the form of a software signal from the form of the hardware interface signal. For example, a waveform change between the high-level signal and the low-level signal in the hardware interface signal is identified, so as to obtain the corresponding logical bit information, and software signal data is obtained on the basis of the logical bit information. The analyzed response data is adjusted by a command parameter structured component and written into the target memory. After the analyzed response data is completely written, the RTOS triggers the second request to notify the Linux system. The Linux system detects the second request, and proactively reads the analyzed response data that is stored in the target memory; and the data is returned to the upper-layer application after being processed. The second request may be the SGI request.

The target memory may be another memory other than the shared memory, such as an RAM and a Flash.

In an embodiment of the present disclosure, after the hardware interface signal corresponding to the request command is generated according to the logical bit information and the timer, the first operating system may convert the voltage of the hardware interface signal, so as to obtain a target hardware interface signal.

In some embodiments of the present disclosure, the first operating system may input the hardware interface signal into a voltage converter, so as to obtain the target hardware interface signal outputted by the voltage converter.

In some embodiments of the present disclosure, the voltage converter may be a CPLD, and the CPLD may be connected to the target device. The target device may be a CPU in a server.

It is to be noted that, in addition to be applied to replace the PECI to generate the PECI signal, the service may also be applied to other hardware interfaces.

From the above content, it may be learned that, the first operating system and the second operating system of the embedded system are combined; the interaction between the data in the embedded system is realized by means of inter-core interrupts and the shared memory; a waveform generation function component of the request command is established in the RTOS; and the communication of the hardware interface signal between the embedded system and an external device is realized by means of software simulation. In addition, the accuracy of a time sequence when a request command waveform is simulated is guaranteed by fully using the high real-time characteristic of the RTOS, such that flexible and efficient characteristics are realized. Therefore, the design difficulty of the chip may be significantly reduced. Since more possibilities are provided for optimized design between communication functions and other business functions in the embedded system by using the software to simulate the generation of the hardware interface signal, and since a controller in the chip that is particularly configured to achieve the communication of the hardware interface signal is omitted, the design cost and manufacturing cost of the chip may be reduced.

In some embodiments of the present disclosure, the services run on the first operating system may; but are not limited to, include a serial port switching service. This implementation provides a process of switching a serial port. The process includes the following steps.

At S21, when it is detected that the second operating system receives a serial port switching instruction, the serial port switching instruction is sent to the first operating system by the second operating system.

In some embodiments of the present disclosure, when a user initiates serial port switching, whether the serial port switching instruction initiated by the user is received is detected by the second operating system. It is to be noted that, the serial port switching instruction needs to include information about a target serial port to be switched to. For example, the serial port switching instruction includes a serial port number of the target serial port to be switched to.

In some embodiments of the present disclosure, the format of the serial port switching instruction may be <switch_command_app-n number-t sleep_time>, where switch_command_app represents a switching instruction program; -n represents a switched target serial port number; the value of number may be 1, 2 and 3; -t represents how long a switching action is executed after dormancy from the initiation of the command; and sleep_time is in seconds.

It is to be noted that, when serial port switching is implemented, serial ports that may currently perform serial port switching may be numbered, so as to switch the target serial port through the serial port number when serial port switching is performed subsequently.

In some embodiments of the present disclosure, the serial ports that may currently perform serial port switching include: a BMC Linux system serial port, a server Basic Input Output System (BIOS) serial port, and a smart Network Interface Controller (NIC) serial port. Correspondingly, 1 may be used to represent the BMC Linux system serial port; 2 represents the server BIOS serial port; and 3 represents the SMART NIC serial port.

At S22, serial port switching is executed by the first operating system according to the serial port switching instruction.

In some embodiments of the present disclosure, when it is detected that the second operating system receives the serial port switching instruction, the second operating system immediately sends the serial port switching instruction to the first operating system. It is to be noted that, the first operating system and the second operating system may be respectively run in two processor cores; and then inter-core communication is used between the first operating system and the second operating system. In this way, the reliability of signal transmission may be improved.

It is to be noted that, the response speed of the first operating system to the instruction is much faster than the response speed of the second operating system to the instruction. In this way, the serial port switching instruction may be rapidly responded by the first operating system, and a switching operation is completed within a very short time.

To sum up, a serial port switching software function is achieved by using the first operating system and the second operating system that run in the same processor to replace the CPLD or the FPGA; when the second operating system receives the serial port switching instruction, the serial port switching instruction is forwarded to the first operating system by the second operating system; and the first operating system implements serial port switching according to the serial port switching instruction, so as to avoid the fact that the serial ports need to be connected together through the CPLD or the FPGA, so as to implement serial port switching by means of using switch structures in the CPLD or the FPGA in the related art, such that hardware costs are reduced. In addition, after the first operating system receives the serial port switching instruction, serial port switching may be rapidly completed within a very short time. Therefore, by means of the technical method proposed in the present solution, the cost of serial port switching may be effectively reduced, and the efficiency of serial port switching may also be effectively improved.

In order to cause the second operating system to implement serial port switching, during a serial port switching process provided in some embodiments of the present disclosure, the serial port switching instruction includes at least the serial port number of the target serial port. Before serial port switching is executed by the first operating system on the basis of the serial port switching instruction, the method includes the following steps: acquiring, by the first operating system, an analysis rule of the serial port switching instruction from a target memory; and analyzing the serial port number of the target serial port in the serial port switching instruction according to the analysis rule, and determining a device corresponding to the serial port number. The target serial port is a serial port of the device, and the target serial port is connected in the chip.

Executing serial port switching by the first operating system according to the serial port switching instruction includes: determining a serial port address of the device by the first operating system; and mapping the target serial port to a target output interface of the chip according to the serial port address.

In order to cause the first operating system to implement serial port switching, the first operating system may analyze the serial port switching instruction, so as to obtain the device corresponding to the target serial port.

In some embodiments of the present disclosure, the analysis rule of the serial port switching instruction may be customized according to different chips or server mainboards and may be saved in the target memory. The target memory may be a storage medium such as an Electrically Erasable Programmable Read Only Memory (EEPROM) and a non-volatile memory (flash). It is to be noted that, the target memory may or may not be deployed in the chip. The safety of the data is improved by using the target memory to store the analysis rule; and the analysis rule may be customized according to different chips or server mainboards, such that better programmability and extendibility are achieved.

After the first operating system receives the serial port switching instruction, the analysis rule of the serial port switching instruction is read from the target memory; and then the serial port number of the target serial port in the serial port switching instruction is analyzed by using the analysis rule, so as to obtain the device corresponding to the serial port number.

After the device corresponding to the serial port number is obtained, the first operating system may map the target serial port to the target output interface of the chip through the serial port address of the device. After the serial port address of the device is mapped to the target output interface, the device may be accessed through the target output interface.

It is to be noted that, the serial port switching instruction and the analysis rule may be set according to the type of the used chip and the types of the first operating system and the second operating system.

In the serial port switching method provided in Embodiment I of the present disclosure, the chip includes a serial data bus. Before the serial port address of the device is determined by the first operating system, the method further includes: determining a plurality of devices connected to serial ports of the serial data bus; and mapping the serial port of each device to the memory of the chip through the serial data bus, so as to obtain the serial port address of each device.

In some embodiments of the present disclosure, the chip further includes the serial data bus. When TX and RX of the serial ports of the plurality of devices are connected to the serial data bus, for example, the current serial port includes the BMC Linux system serial port (Universal Asynchronous Receiver/Transmitter (UART)1), the server BIOS serial port (UART2), and the SMART NIC serial port (UART3). Universal Asynchronous Receiver/Transmitter (UART). The serial data bus maps TX and RX data of UART1, UART2 and UART3 into different address spaces of a BMC memory. That is to say, the serial data bus maps the serial port of each device into the memory of the chip. For example, UART1 TX and RX buffer are serial port addresses of the serial port UART1; UART2TX and RX buffer are serial port addresses of the serial port UART2; and UART3 TX and RX buffer are serial port addresses of the serial port UART3.

When the user issues the serial port switching instruction, the first operating system (RTOS) selects three different memories (one out of three) mapped by the UART and interacts one segment of memory data to a client, so as to achieve the purpose of simulating a CPLD hardware serial port switching circuit.

It is to be noted that, if the serial ports of different devices may not be distinguished, a developer may not accurately position which device has the defective serial port during maintenance, such that the positioning of abnormalities needs to be implemented through serial port switching.

In some embodiments of the present disclosure, after the target serial port is mapped to the target output interface of the chip according to the serial port address, and if the target output interface is connected to a target smart network card, the following operations are included: detecting, through a smart network card, whether an access request of the target serial port is received; and if the access request of the target serial port is received, forwarding the access request to the target serial port through the smart network card.

In some embodiments of the present disclosure, the target output interface of the chip may also be connected to the target smart network card; then whether the access request of the use for the target serial port is received is detected through the smart network card; and if the access request of the target serial port is received, serial port access to the devices may be directly implemented through the target smart network card, so as to realize a Serial over LAN (SOL) function. By means of the above steps, efficiency of serial port access to the devices is improved.

In some embodiments of the present disclosure, after the target serial port is mapped to the target output interface of the chip according to the serial port address, the method further includes the following step: acquiring an execution result of the serial port switching instruction by the first operating system, where the execution result is at least one of the following: switching succeeds and switching fails; and sending the execution result to the second operating system by the first operating system.

The execution result of the serial port switching instruction is received by the second operating system. The execution result is sent from the first operating system to the second operating system. The execution result is at least one of the following: serial port switching succeeds and serial port switching fails.

After switching the serial port, the first operating system acquires the execution result of the serial port switching instruction, and then feeds back the execution result of the serial port switching instruction to the second operating system, so as to notify the second operating system whether serial port switching succeeds or fails.

In order to improve the success rate of serial port switching, in some embodiments of the present disclosure, after the execution result of the serial port switching instruction is received by the second operating system, the method further includes: if the execution result is an execution failure, repeatedly executing the step of issuing the serial port switching instruction to the first operating system by the second operating system, until the execution result is successful, or the number of times for executing serial port switching exceeds the preset number of times. If the number of times for executing serial port switching exceeds the preset number of times, a prompt signal is triggered by the second operating system. The prompt signal is configured to prompt that serial port switching has failed.

If the execution result of the serial port switching instruction is an execution failure, the step of issuing the serial port switching instruction to the first operating system by the second operating system needs to be repeatedly executed, until the execution result is successful, or the number of times for executing serial port switching exceeds the preset number of times, where the preset number of times may be set to 3. If the number of times for executing serial port switching exceeds the preset number of times, the prompt signal is accordingly triggered by the second operating system, to prompt that serial port switching has failed, so as to process such situation in time.

Before it is detected that the first operating system receives the serial port switching instruction, the method further includes: after the starting of the second operating system is completed, triggering a first interrupt by a second processor core, and sending a first signal to the first operating system; detecting running states of the plurality of serial ports in the chip by the first operating system according to the first signal, so as to obtain a detection result; triggering a second interrupt by a first processor core, and sending the detection result to the second operating system through a second signal; and receiving the detection result by the second operating system, so as to determine the number of the serial ports that normally run in the chip.

After the first interrupt is triggered by the second processor core, and the first signal is sent to the first operating system, whether the first operating system receives the first signal is detected; if the first operating system receives the first signal, the running states of the plurality of serial ports in the chip are detected by the first operating system, so as to obtain the detection result.

After the starting of the second operating system is completed, the second processor core triggers the first interrupt (Inter-Processor Interrupt (IPI)) to send the first signal to the first operating system; the first operating system may learn, through the first signal, that the second operating system has started normally, and may normally interact with the second operating system; and the first operating system detects the running states of the plurality of serial ports in the chip according to the first signal, so as to determine whether all the serial ports run normally.

After the first operating system obtains the detection result through detection, the first processor core triggers the second interrupt to send the detection result to the second operating system through the second signal; and the second operating system determines, through the detection result, the number of the serial ports that may be switched (that is, the number of the serial ports that run normally), so as to perform serial port switching on these serial ports. In addition, in order to cause the first operating system to realize serial port switching more rapidly, after the first operating system completes the detection, the first operating system starts blocking and waits for receiving the serial port switching instruction sent by the second operating system.

In some embodiments of the present disclosure, when the first operating system is the RTOS and the second operating system is the Linux, the first operating system runs on a CPU0, and the second operating system runs on a CPU1. A preparation step before serial port switching includes: when the Linux system on the CPU1 is started to a specific phase, triggering the IPI by the CPU1 to notify the RTOS on the CPU0 that the Linux has normally started and may normally interact with the Linux on the CPU1; starting, by the RTOS, a serial port switching controller program after receiving the IPI from the CPU1, so as to check whether the UART1, UART2 and UART3 are normal; then triggering the IPI again by the CPU0 to notify the Linux operating system on the CPU1 that the RTOS has started and the reported information includes the number of switchable serial ports owned by the RTOS on the CPU0; and then starting blocking of the RTOS on the CPU0, and waiting for receiving the switching instruction sent by the operating system on the CPU1.

When the second operating system runs abnormally, the serial port switching instruction is issued to the first operating system through a service terminal; and serial port switching is executed by the first operating system on the basis of the serial port switching instruction.

Due to the fact that the second operating system runs more functions and takes on a larger volume of services, abnormal running or restarting may exist, such that when the second operating system runs abnormally, the serial port switching instruction may be directly issued to the first operating system through the service terminal, so as to ensure that the first operating system executes serial port switching normally. It is to be noted that, the service terminal may be a terminal on the server where the chip is located.

By means of the above steps, it is ensured that the first operating system implements serial port switching without depending on the second operating system, such that the independence of the first operating system on executing serial port switching is improved.

To sum up, during the serial port switching process provided in some embodiments of the present disclosure, a serial port switching software function is achieved by using the first operating system and the second operating system that run in the same processor to replace the CPLD or the FPGA; when the second operating system receives the serial port switching instruction, the serial port switching instruction is forwarded to the first operating system by the second operating system; and the first operating system implements serial port switching according to the serial port switching instruction, so as to prevent the use of hardware to implement serial port switching, such that hardware costs are reduced. In addition, after the first operating system receives the serial port switching instruction, serial port switching may be rapidly completed within a very short time. Therefore, the above process may not only effectively reduce the cost of serial port switching, but also effectively improve the efficiency of serial port switching.

For a condition triggered mode in the triggered mode, the matching degree between the current operation service and the first operating system may, but is not limited to, indicate whether the operation service generated on the processor adapts to be processed by the first operating system, and then suitable operation services are sent to the first operating system for processing, such that rational allocation of the operation services is realized, and the processing efficiency of the operation services is improved.

In some embodiments of the present disclosure, the first operating system may be, but is not limited to, controlled to run on the basis of the processor through the following manners: detecting service information of the current operation service generated on the processor; and when it is detected that the matching degree between the service information and the first operating system is higher than a matching degree threshold, controlling the first operating system to run the current operation service on the basis of the processor.

In some embodiments of the present disclosure, the matching degree between the operation service and the first operating system may be, but is not limited to, represented by the matching degree between the service information of the operation service and the first operating system. The service information may be, but is not limited to, any dimensions having processing requirements, such as a service response speed, a service resource occupation rate, a service coupling degree, service importance, etc.

In some embodiments of the present disclosure, if the matching degree between the service information and the first operating system is higher than a matching degree threshold, it may indicate that the operation service is suitable for running on the first operating system. The matching degree threshold may be, but is not limited to, dynamically adjusted according to the current resource usage situation of the first operating system or running requirements. Therefore, higher adaptability and flexibility of the first operating system are realized.

In some embodiments of the present disclosure, the service information of the current operation service generated on the processor may be, but is not limited to, detected through the following manners: detecting the target response speed and/or the target resource occupation quantity of the current operation service, where the service information includes the target response speed and/or the target resource occupation quantity, the target response speed is the response speed that the processor needs to achieve for the current operation service, and the target resource occupation quantity is the resource quantity that the processor is required to provide for the current operation service; and when the target response speed is less than or equal to the speed threshold, and/or the target resource occupation quantity is less than or equal to an occupation quantity threshold, determining that the matching degree between the service information and the first operating system is greater than the matching degree threshold.

In some embodiments of the present disclosure, the service information may, but is not limited to, include: the target response speed and/or the target resource occupation quantity. The target response speed is the response speed that the processor needs to achieve for the current operation service, and the target resource occupation quantity is the resource quantity that the processor is required to provide for the current operation service. The requirement of the current operation service for the processor response speed may be considered separately, or the requirement of the current operation service for available resources on the processor is considered separately. Allocation of the current operation service may also be comprehensively considered between the two.

In some embodiments of the present disclosure, the operation services and processing resources may be, but are not limited to, allocated for each operating system by using the following manners.

A group of services to be allocated are allocated to the corresponding operating systems in the embedded system according to a dynamic resource allocation rule. The dynamic resource allocation rule includes performing dynamic resource allocation according to at least one of the following: the service response speed, the service resource occupation rate, the service coupling degree, and the service importance. The embedded system includes the first operating system and the second operating system. The first operating system and the second operating system run on the processor, and the response speed of the first operating system is higher than that of the second operating system.

Resource allocation results corresponding to the group of services to be allocated is determined. The resource allocation result is configured to indicate the processing resource corresponding to each service to be allocated in the group of services to be allocated in the processing resources of the processor. The processing resources of the processor include processor cores.

The processing resources of the processor are allocated to the first operating system and the second operating system according to the operating system corresponding to each service to be allocated and the resource allocation result.

During the running of the processor, the group of services to be allocated may be acquired, that is, the services to be allocated to the first operating system and the second operating system. Since different services to be allocated may differ in dimensions such as the response speed, the service resource occupation rate, the service coupling degree with other services, and service importance, the dynamic resource allocation rule may be configured in advance. The dynamic resource allocation rule may include rules used for performing service allocation. The services are allocated to the corresponding operating systems, so as to cause the processing resources of the corresponding operating systems to execute the services allocated to themselves. In some embodiments of the present disclosure, the dynamic resource allocation rule may include performing dynamic resource allocation according to at least one of the following: the service response speed, the service resource occupation rate, the service coupling degree, and the service importance. Different allocation rules may have corresponding priority levels. For example, the priority levels are the service importance, the service coupling degree, the service response speed, and the service resource occupation rate according to a sequence from high to low. According to the dynamic resource allocation rule, the group of services to be allocated (or tasks to be allocated, different services to be allocated may correspond to different processes) may be allocated to the corresponding operating systems in the embedded system, so as to obtain a service allocation result.

In some embodiments of the present disclosure, on the basis of constraints on response time, the first operating system may be an operating system that has a clear fixed time constraint. All processing processes (task scheduling) need to be completed within the fixed time constraint, otherwise, the system makes an error. The first operating system may be the RTOS, such as FreeRTOS and RTLinux, or may be the RTOS in other embedded systems. The second operating system does not have the characteristic. The second operating system generally uses a fair task scheduling algorithm. When the number of threads/processes is increased, CPU time needs to be shared. Task scheduling is uncertain, and may be called the non-RTOS, such as contiki, HeliOS, and Linux (also known as GNU/Linux, a freely distributable Unix-like operating system), or may be the non-RTOS in other embedded systems. The Linux system is the multi-user, multi-task, multi-threaded, and multi-CPU operating system based on a Portable Operating System Interface (POSIX).

Correspondingly, the service allocated to the first operating system is generally a real-time service. The real-time service refers to a service that needs to be scheduled within a specified time. The service needs to be processed by the processor at a fast enough speed, and a processed result may also control a production process within the specified time or make a rapid response on the processing system. As a typical scenario, the control of robotic manipulators in industrial control belongs to the real-time service; and the system needs to take measures in time before misoperation of the robotic manipulators is detected, otherwise serious consequences may be caused. The service allocated to the second operating system generally is a non-real-time service. The non-real-time service refers to a service that is insensitive to a scheduling time, and has certain tolerance for scheduling delays, for example, sensor data of a temperature sensor is read in the server.

It is to be noted that, the RTOS refers to the operating system that may receive and process with the fast enough speed when an external event or data is generated, has the processed result that may control the production process within the specified time or make a rapid response on the processing system, completes real-time services by scheduling all available resources, and controls all the real-time services to run in a harmonized manner, and has the characteristics of timely response and high reliability:

After each service to be allocated is allocated to the corresponding operating system, according to the service allocation result, corresponding processing resources may be allocated for each service to be allocated, so as to obtain resource allocation results corresponding to the group of services to be allocated. When the processing resources are allocated for the services to be allocated, the processing resources of the first operating system may be allocated to the services that are allocated to the first operating system, and the processing resources of the second operating system are allocated to the service that are allocated to the second operating system. In addition, considering load balancing, when there are unallocated processing resources, the unallocated processing resources may be allocated for part of the services.

The processing resources of the processor may be dynamically allocated in units of time slices. Considering the frequent switching of the operating systems to which the processing resources belong and the fact that the service processing time is not necessarily an integer multiple of the time slice, resulting in prolonged response time of some services, processing resources may be allocated to the first operating system and the second operating system in units of processor cores, that is, the processor cores of the processor are allocated to the corresponding operating systems in units of the entire processor core. The number of the processor cores allocated for each operating system is an integer, and different operating systems are allocated with different processor cores.

The processing resources of the processor may be allocated to the first operating system and the second operating system according to the operating system corresponding to each service to be allocated and the resource allocation result. In some embodiments of the present disclosure, the unallocated processing resources of the processor may be allocated to the operating systems corresponding to the processing resources. The unallocated processing resources may be determined on the basis of the correspondence relationship between the unallocated processing resources and the services to be allocated and the correspondence relationship between the services to be allocated and the operating systems.

In some embodiments of the present disclosure, the allocation of the processing resources of the processor to the first operating system and the second operating system may be executed by a resource adaptive scheduling component (for example, a core adaptive scheduling component). The resource adaptive scheduling component may be a software component running on the first operating system or the second operating system. By running on the second operating system as an example, the resource adaptive scheduling component may be implemented by software in the Linux system and may complete an actual scheduling action on the processing resources of the processor (for example, processor hard core resources) according to the output of a service management component and the output of a dynamic resource allocation component. For example, through resource scheduling of a core resource adaptive component, M of (M+N) cores are scheduled to the RTOS, and N cores are scheduled to the non-RTOS.

For example, heterogeneous operating systems may run on different hard cores of the same processor, so as to cause the entire processor to have parallel processing capabilities of real-time and non-real-time services. In addition, the resource utilization rate of the processor is significantly improved by adaptively adjusting processor hard core resources (for example, processor cores) that are occupied by different operating systems. Herein, heterogeneity means that the operating systems running in the same multi-core processor of the embedded system are different in type; and the multi-system means that there are a plurality of operating systems running on the same multi-core processor of the embedded system, and these operating systems run at the same time in a time dimension.

In some embodiments of the present disclosure, the above process further includes configuring a file through a reading rule, so as to generate a rule structure body, where the rule structure body is configured to record the dynamic resource allocation rule.

The dynamic resource allocation rule may be configured on the basis of a rule configuration file; and through the read rule configuration file, the rule structure body configured to record the dynamic resource allocation rule may be generated. Herein, the rule configuration file may be a load balancing policy file (payload_balance.config). The load balancing policy file may be configured to configure methods for classifying various services (or processes) running, the principles of evaluating real-time levels, etc. In the load balancing policy file, the dynamic resource allocation rule may be configured with different parameters. One example of the load balancing policy file is shown below:

If the value of classification kinds=2//is 1, it indicates that the processes are classified according to attributes such as critical and non-critical, otherwise the processes are classified according to a preset classification method (for example, real-time and non-real-time).

If the value of real-time grade evaluation=2//is 1, it indicates that an average occupation rate of the CPUs within past statistic minutes is used as the principle of evaluating the real-time levels of the processes; otherwise, it indicates that a preset priority level is used as the principle of evaluating the real-time levels of the processes.

statistic minutes=5//represents statistical time (in minute) of the average occupation rate of the processes; and it is valid when real-time grade evaluation is 1.

In some embodiments of the present disclosure, the dynamic resource allocation rule may be stored in a load balancing policy component. Herein, the load balancing policy component may be a software component (for example, a software component running under the Linux system) running under the first operating system or the second operating system, and may provide strategic guidance for the service management component, including the methods for classifying various services (or processes) running in the system, the principles of evaluating real-time levels, etc. The service management component may perform service division and management on the services in the system according to the real-time levels and may selectively guide the resource adaptive scheduling component to re-allocate the processor resources. In some embodiments of the present disclosure, actual classification of the services may be executed according to the output of the load balancing policy component, so as to generate a list including real-time services and non-real-time services.

It is to be noted that, the above classification method and the principles of evaluating real-time levels are open, such that the user may define a certain method or principle himself. The rules on which the service management component performs service management is based may be dynamically configured, and settings on optional rules may be performed on the basis of existing rules. A plurality of rules having the same function may be set in the service management component, but there is no contradiction between the rules, that is, the currently used rule in the rules having the same function may be determined on the basis of rule selection conditions such as configuration time of the rules and the priority levels of the rules, so as to avoid contradiction between the rules. The above configuration file load_balance.config describes a possible scenario. In the configuration file, the variable classification_kinds indicates an optional classification standard (for example, according to the importance or real-time natures of the services) and a classification category (for example, important services and general services, real-time services and non-real-time services); the variable real-time_grade_evaluation indicates a real-time evaluation standard (which may be according to the average occupation rate of the CPUs within the past statistic_minutes or the preset service priority level); and the type of the real-time levels is defined by the user, may be defined as high, normal or low; or may be subdivided into more types.

The output of the load balancing policy component is the well-configured classification methods and the principles of evaluating real-time levels and may be the optional configuration files (for example, the load_balance.config file) or structure body variables during software implementation. These files or structure body variable may finally be accessed by the service management component, so as to acquire optional policies for load balancing.

By means of some embodiments of the present disclosure, the convenience of information configuration may be improved by reading the rule configuration file, and generating the rule structure body, so as to record the dynamic resource allocation rule.

In some embodiments of the present disclosure, the above process further includes: acquiring a rule update configuration file by an external interface of the second operating system, where the rule update configuration file is configured to update the dynamic resource allocation rule that has been configured; and using the rule update configuration file to update the rule structure body, so as to update the dynamic resource allocation rule recorded by the rule structure body.

The rule structure body may be in a fixed format, that is, modification is not allowed during the running of the embedded system; or the rule structure body may be in a format that may be flexibly configured, that is, configuration changing may be performed by the configuration file in a specific format. In some embodiments of the present disclosure, the rule update configuration file may be acquired. The rule update configuration file is configured to update the dynamic resource allocation rule that has been configured; and using the rule update configuration file may update the rule structure body, so as to update the dynamic resource allocation rule recorded by the rule structure body.

When the rule structure body is updated by using the rule update configuration file, a new rule structure body may be directly generated according to the rule update configuration file, and the newly-generated rule structure body is used to replace the existing rule structure body; alternatively, parameter values of rule parameters corresponding to the rule structure body may be updated by using parameter values of rule parameters indicated by the rule update configuration file.

In some embodiments of the present disclosure, the configuration file in the specific format may be read by the external interface of the first operating system or the second operating system. Considering a service magnitude required to be processed, the second operating system is mainly responsible for dynamic resource scheduling of the embedded system. When the rule update configuration file is acquired, the rule update configuration file may be acquired by the external interface of the second operating system.

For example, the load balancing policy component may be in a fixed format, or may be configured by the external interface of the Linux system, for example, the configuration file (load_balance.config) in the specific format may be defined, and configuration changing is performed by means of file reading and writing.

It is to be noted that, the external interface is an external interface of the multi-core processor, and may be a network interface, a Serial Peripheral Interface (SPI) controller interface, or a UART serial port, as long as the passage of the data may be acquired externally. There are different implementation solutions for hardware and file positions used for file reading. For example, the configuration file may be loaded from an interface of a World Wide Web (Web) through the network interface; the configuration file may be read from a SPI Flash of a board card through the SPI controller; and the configuration file may be acquired from a serial port data transmission and receiving software tool on another Personal Computer (PC) through the UART serial port.

By means of some embodiments of the present disclosure, the configuration flexibility of the dynamic resource allocation rule may be improved by acquiring the rule update configuration file and using the acquired rule update configuration file to update the rule structure body.

In some embodiments of the present disclosure, the group of services to be allocated may be, but are not limited to, allocated to the corresponding operating systems in the embedded system according to the dynamic resource allocation rule by using the following manners: allocating, to the first operating system, the services to be allocated of which service response speed in the group of services to be allocated is required to be greater than or equal to a set response speed threshold, and allocating, to the second operating system, the services to be allocated of which the service response speed in the group of services to be allocated is required to be less than the set response speed threshold.

When the services to be allocated are allocated, the services to be allocated may be required to be allocated to the corresponding operating systems on the basis of the service response speed of the services to be allocated. The service response speed may be configured to evaluate the real-time levels of the services. If the requirement for the service response speed is higher, the services are more sensitive to the scheduling time and response speed of the operating systems, and the real-time levels are higher. The services with high requirements for the service response speed needs the operating system to process with a fast enough speed, and the processed result may also control a production process within the specified time or make a rapid response on the processing system; and the services with low requirements for the service response speed have certain tolerance for scheduling delays.

The services to be allocated of which service response speed is required to be greater than or equal to the set response speed threshold are sensitive to the scheduling time and response speed of the operating systems, such that such services to be allocated may be allocated to the first operating system (for example, the real-time services are allocated to the RTOS). The services to be allocated of which service response speed is required to be less than the set response speed threshold are services that are not sensitive to the scheduling time and response speed, such that such services to be allocated may be allocated to the second operating system (for example, the non-real-time services are allocated to the non-RTOS). Herein, the requirement for the service response speed may be indicated by an indication parameter of the service response speed. The set response speed threshold may be a millisecond-level response speed threshold or a second-level response speed threshold, such as 100 ms, 200 ms, 1s, etc. the set response speed threshold is not limited in some embodiments of the present disclosure.

In some embodiments of the present disclosure, when the group of services to be allocated are allocated to the corresponding operating systems in the embedded system, a first service list corresponding to the first operating system and a second service list corresponding to the second operating system may be outputted. The first service list is configured to record the services that are allocated to the first operating system; and the second service list is configured to record the services that are allocated to the second operating system. That is to say, the service allocation result includes the first service list and the second service list, and the outputted first service list and second service list may be configured to perform the dynamic scheduling process of the processing resources of the processor.

For example, the real-time levels of the services of the system are divided, so as to obtain real-time service and non-real-time service lists. Assuming that there are total 20 services, the real-time services are Service 1 and Service 2, and the non-real-time services are Service 3 to Service 20.

Herein, the service management component may classify the current services to be executed. When a BMC system runs for the first time, since all the services that are about to be run currently by the system are known to the system, the service management component performs one-time classification on these services according to the output of the load balancing component. After classification, different services are allocated to different operating systems (the RTOS and the Linux system) for execution. In the subsequent running process, if the number of the service processes is changed (for example, some processes are hung up, or there are new processes started), the service management component continues to perform service division, so as to divide and manage the existing services in real time according to a load balancing policy. The service management component may be a resident process in the Linux system; and the service management component is always running and manages and divides the current running processes.

By means of some embodiments of the present disclosure, the timeliness of service response of the services sensitive to the scheduling time may be guaranteed by allocating the services to be allocated to the corresponding operating systems according to the requirement for the service response speed.

In some embodiments of the present disclosure, the group of services to be allocated may be, but are not limited to, allocated to the corresponding operating systems in the embedded system according to the dynamic resource allocation rule by using the following manners: allocating, to the first operating system, the services to be allocated of which service resource occupation rate in the group of services to be allocated is less than a first occupation rate threshold, and allocating, to the second operating system, the services to be allocated of which service resource occupation rate in the group of services to be allocated is greater than or equal to the first occupation rate threshold.

When the services to be allocated are allocated, the services to be allocated may be allocated to the corresponding operating systems on the basis of the service resource occupation rate of the services to be allocated. The service resource occupation rate may be an average proportion (for example, a CPU occupation rate of every minute) of the services per unit of time for the processing resources. The level of the service resource occupation rate affects the response speed of the current service and the response speed of the subsequent services. Therefore, the real-time levels of the services may be evaluated on the basis of the service resource occupation rate. If the service resource occupation rate is higher, the impact of the services on the scheduling time and response speed of the operating systems is larger, and the real-time levels are lower; and for the services of which service resource occupation rate is not high, the impact of the services on the scheduling time and response speed of the operating systems is not large, and the real-time levels are higher.

For the services to be allocated of which service resource occupation rate is less than the first occupation rate threshold, the impact of the services on the scheduling time and response speed of the operating systems is not large, such that such services to be allocated may be allocated to the first operating system. For the services to be allocated of which service resource occupation rate is greater than or equal to the first occupation rate threshold, the impact of the services on the scheduling time and response speed of the operating systems is large, such that such services to be allocated may be allocated to the second operating system. Herein, the first occupation rate threshold may be configured according to needs, which may be 10%, 15%, 20% or other thresholds. In addition, the first occupation rate threshold may be dynamically adjusted.

By means of some embodiments of the present disclosure, the timeliness of service response of the services with low service resource occupation rate may be guaranteed by allocating the services to be allocated to the corresponding operating systems according to the service resource occupation rate.

In some embodiments of the present disclosure, the group of services to be allocated may be, but are not limited to, allocated to the corresponding operating systems in the embedded system according to the dynamic resource allocation rule by using at least one of the following manners.

The services to be allocated in the group of services to be allocated that have a service coupling degree with the allocated services of the first operating system being greater than or equal to a first coupling degree threshold are allocated to the first operating system.

The services to be allocated in the group of services to be allocated that have a service coupling degree with the allocated services of the second operating system being greater than or equal to a second coupling degree threshold are allocated to the second operating system.

When the services to be allocated are allocated, the services to be allocated may be allocated to the corresponding operating systems on the basis of the service coupling degree of the services to be allocated. The service coupling degree may be configured to indicate an association degree between the services to be allocated and the allocated services in each operating system. If one service to be allocated has a higher second coupling degree with the allocated service in the operating system, the service is not suitable for being allocated to another operating system. Therefore, the services to be allocated may be allocated to the corresponding operating systems on the basis of the service coupling degree between the services to be allocated and the allocated services in each operating system.

In some embodiments of the present disclosure, the service coupling degree may be evaluated through the association between the input and the output of the services. The service coupling degree may be represented by different coupling degree levels. If there is no relationship between the input and the output of the services, the coupling degree level is low (or other coupling degree levels that indicate no association between the services); if the execution of one service depends on the output of another application (the service may not be started if there is no such output as the input), the coupling degree level between the services is high; and if the execution of one service uses the output of another application, but the output does not prevent the normal execution of the service (the output may be acquired when the service is executed to the corresponding operation, and the corresponding operation is not a core operation), the coupling degree level between the services is medium. In addition, the service coupling degree may also be represented by using values. The service coupling degree may be evaluated through one or more coupling degree conditions (for example, the association relationship between the input and the output); and then the value corresponding to the met coupling degree condition is determined as the value of the service coupling degree.

If there are services to be allocated in the group of services to be allocated that have the service coupling degree with the allocated services of the first operating system being greater than or equal to the first coupling degree threshold, such services to be allocated may be allocated to the first operating system; and if there are services to be allocated in the group of services to be allocated that have the service coupling degree with the allocated services of the second operating system being greater than or equal to the first coupling degree threshold, such services to be allocated may be allocated to the second operating system.

For example, in addition to generating the real-time service list and the non-real-time service list, the service management component is also responsible for service decoupling evaluation and management, that is, the services that may be separated out to hand over to the RTOS for running are found from all the real-time services, so as to allow the hardware dynamic resource allocation component to perform re-allocation of the processor resources; and for the services that may not be separated out to hand over to the RTOS for running, if the services have a high service coupling degree with the non-real-time services, the services may be allocated to the non-RTOS.

Herein, although some services have real-time requirements, the services frequently interact with other non-real-time services in the system (that is, the service coupling degree is high). In this case, in order to improve overall data interaction efficiency, such services are allocated to the non-RTOS. There is another type of real-time services that are relatively independent, and in this case, the services are divided to the RTOS. The process is a "decoupling" operation. There is no single criterion for determining the independence of the services, it may be the closeness of the association between the services or indicators that are concerned by other users.

The policy of re-allocation is open. One possible policy includes: when the system runs for the first time, allocating the processor cores according to the ratio of the number of services that are allocated to the RTOS and the non-RTOS by the service management component, and in the subsequent process, adjusting resource allocation according to the respective core resource occupation rates in the dual system. From this point of view; the re-allocation process and the core occupation and releasing process are processes that cooperate with each other.

By means of this embodiment of the present disclosure, the accuracy of service processing for the plurality of services with high service coupling degrees may be guaranteed by allocating the services to be allocated to the corresponding operating systems according to the service coupling degrees.

In some embodiments of the present disclosure, the group of services to be allocated may be, but are not limited to, allocated to the corresponding operating systems in the embedded system according to the dynamic resource allocation rule by using the following manners.

The services to be allocated in the group of services to be allocated that include sensitive information are allocated to a target operating system. The target operating system is an operating system in the first operating system and the second operating system that has a low frequency of interaction with a use object.

In some embodiments of the present disclosure, for the services to be allocated (which may be important and sensitive services, for example, services that do not want to be exposed to the users) including sensitive data (for example, sensitive information such as passwords), the services may be allocated to the target operating system; and then hard-core level security isolation is performed on the services to be allocated including the sensitive information by the target operating system. Herein, the target operating system is an operating system in the first operating system and the second operating system that has a low frequency of interaction with a use object, or an operating system with a fast response speed, for example, the first operating system.

For example, a service processing component is responsible for performing hard core level security isolation on system services, that is the important and sensitive services (which do not want to be exposed to the users) are classified as the real-time services; and finally, the services are unloaded from the non-RTOS to the RTOS, so as to achieve the effect of security protection. Herein, the service processing component divides different services, and organization may be performed by using the form of structure bodies during software implementation. By designing a safe space between the heterogeneous operating systems, the sensitive services are unloaded from the non-RTOS to the RTOS, so as to achieve the purpose of hard core level security protection. Herein, the sensitive services refer to the services related to security, for example, the services involving user privacy such as user passwords and identity information.

Herein, a hard-core level means that isolation is performed on the services at a processor core level, that is, the sensitive services are allocated to the RTOS (the cores occupied by the RTOS are different from that occupied by the non-RTOS, belonging to the isolation at a core level). Compared with the non-RTOS, the RTOS is relatively weak in frequency and degree of interaction with the users, such that it is hard for the users to "detect" the sensitive data generated by the services running thereon. For the upper-layer application, services such as identity management of the users and security encryption belong to the important sensitive services. The services are forcibly classified as the real-time services by the service management component, such that the services may run on the RTOS when hardware dynamic resource allocation is performed subsequently, so as to achieve the security isolation effect.

By means of some embodiments of the present disclosure, by allocating the services to be allocated including the sensitive information to the operating system that is low in frequency of interaction with the users, hard core level security isolation may be performed on the system services, thereby improving the safety of service execution.

In some embodiments of the present disclosure, the resource allocation results corresponding to the group of services to be allocated may be, but is not limited to, determined by using the following manner.

According to the allocation result of the group of services to be allocated, in combination with resource utilization of the processing resources of the first operating system and resource utilization of the processing resources of the second operating system, the mapping table of the group of services to be allocated and the processing resources of the processor is generated.

In some embodiments of the present disclosure, the allocation result of the group of services to be allocated is configured to indicate the correspondence relationship between the services to be allocated and the operating systems. The services to be allocated that are allocated to the operating system are generally executed by using the processing resources of the operating system; and if a service quantity allocated to the operating system is excessive and there is no unallocated processing resource currently, the unallocated processing resources may also be allocated to the services to be allocated that are allocated to the operating system. Therefore, according to the allocation result of the group of services to be allocated, in combination with resource utilization of the processing resources of the first operating system and resource utilization of the processing resources of the second operating system, the mapping table of the group of services to be allocated and the processing resources of the processor may be generated, so as to indicate the processing resources that are allocated to each service to be allocated.

Herein, each service to be allocated only has a mapping relationship with the processor core, and the same processor core may have a mapping relationship with a plurality of services to be allocated. Different services may have a mapping relationship with the same processor core through different time slices occupying the same processor core. At the same time, the same processor core is only occupied by one service, that is, only configured to execute one service. Different services allocated to one operating system may determine the time slice occupying the same processor core according to the allocation time, the requirement for the service response speed, or other manners.

For example, the dynamic resource allocation component performs dynamic adjustment on the processor resources according to an output result of the service management component, so as to form the mapping table of different services and actual hardware resources; and the deployment structure of different hardware resources under the heterogeneous operating system is optimized, so as to achieve the purpose of improving a full system hardware resource utilization rate. The above dynamic resource allocation process is managed and configured by the software in the second operating system.

Using an eight-core processor (Core 1 to Core 8) as an example, the processor core that have been scheduled to the first operating system include Core 1; and the processor core that have been scheduled to the second operating system include Core 2, Core 3 and Core 4. There are 6 services to be allocated; the real-time services are Service 1 and Service 2; and non-real-time services are Service 3 to Service 6. The corresponding processor cores are allocated for the 6 services; Core 1 is allocated for Service 1; Core 5 is allocated for Service 2; Core 2 is allocated for Service 3; Core 3 is allocated for Service 4; Core 4 is allocated for Service 5; and Core 6 is allocated for Service 6.

By means of some embodiments of the present disclosure, the rationality of processing resource allocation may be guaranteed on the basis of the correspondence relationship between the services and the operating systems, in combination with processing resource utilization of different operating systems.

In some embodiments of the present disclosure, the processing resources of the processor may be, but are not limited to, allocated to the first operating system and the second operating system according to the operating systems corresponding to each service to be allocated and the resource allocation result by using the following manners: when it is determined, according to the resource allocation result, that there are services to be allocated corresponding to the unallocated processing resources in the processing resources of the processor, allocating the unallocated processing resources to the operating system to which the services to be allocated corresponding to the unallocated processing resources are allocated.

When the processing resources are allocated, if there are services to be allocated corresponding to the unallocated processing resources in the processing resources of the processor, that is, the unallocated processing resources are allocated to the services to be allocated, the unallocated processing resources may be allocated to the operating system to which the services to be allocated corresponding to the unallocated processing resources are allocated.

In some embodiments of the present disclosure, the resource adaptive scheduling component may complete the actual scheduling action on the processing resources of the processor according to the dynamic resource allocation result. The resource adaptive scheduling component schedules a part of the processor cores to execute the services that are allocated to the first operating system, for example, M cores of a core group 1; and the rest of the processor cores are scheduled to run the services that are allocated to the second operating system, for example, N cores of a core group 2.

By using the eight-core processor as an example, the unallocated Core 4 may be allocated to the first operating system according to the service allocation result and the resource allocation result; and the unallocated Core 5 and Core 6 are allocated to the Linux system. The overall scheduling process may be led by the second operating system.

By means of some embodiments of the present disclosure, the utilization rate of the processor resources may be improved by scheduling the unallocated processor resources to the corresponding operating systems on the basis of the resource allocation result.

After the running of the first operating system ends, the first operating system may be controlled to enter the hibernation state. For example, the first operating system is controlled to hibernate at the end of running.

The end of the running of the first operating system may be the end of a running period, may also be a processing completion of the wake-up request, or may be a processing completion of the current operation service.

After the first operating system hibernates, the second operating system may occupy the processor cores allocated to the first operating system, thereby improving the utilization rate of resources. For example, after the first operating system is controlled to hibernate at the end of running, the second operating system is notified to be allowed to occupy the processor cores used by the first operating system. The second operating system is configured to, during the hibernation of the first operating system, add a target processor core used by the first operating system into a scheduling resource pool of the second operating system, wherein the scheduling resource pool comprises processors other than the target processor core in the processor.

In some embodiments of the present disclosure, the mode of notifying the second operating system to be allowed to occupy the processor cores used by the first operating system may, but is not limited to, include the mode of sending the interrupt request to the second operating system. After the first operating system hibernates, the interrupt request is sent to the second operating system to notify the second operating system to be allowed to occupy the processor cores used by the first operating system; and in response to the interrupt request, the second operating system adds the target processor core used by the first operating system into the scheduling resource pool for scheduling and use.

In some embodiments of the present disclosure, the operation services executed on the second operating system may be, but are not limited to, monitored. If an abnormal operation service is monitored, the running of the abnormal operation service may be taken over by the first operating system, so as to prevent the abnormal running of the operation service from affecting the entire processing process, thereby improving the success rate and efficiency of service running. For example, the operation services executed on the second operating system are monitored, and the abnormal operation service is taken over by the first operating system when there is an abnormal operation service in the operation services executed on the second operating system.

In some embodiments of the present disclosure, the second operating system may be, but is not limited to, monitored by the processor or the first operating system; and the monitored abnormal operation service (for example, an operation service of which service thread is hung up) is taken over by the first operating system. Alternatively, the monitored abnormal operation service may also be allocated to the operating system in the plurality of operating systems that has a high matching degree with the abnormal operation service for takeover.

In some embodiments of the present disclosure, the mode of monitoring the operation services executed on the second operating system may include, but is not limited to, the monitoring of a heartbeat signal, the monitoring of a service log, etc. For example, if generation of an abnormal log is monitored, it is determined that the operation service is abnormal.

In some embodiments of the present disclosure, the operation services executed on the second operating system may be, but are not limited to, monitored by using the following manners: receiving a heartbeat signal of each operation service executed on the second operating system; and determining, as the abnormal operation service, the operation service in which the frequency of the heartbeat signal does not match a corresponding target frequency.

In some embodiments of the present disclosure, each operation service executed on the second operating system generates the heartbeat signal, and the heartbeat signals of different operation services have different frequencies. The heartbeat signal of each operation service executed on the second operating system is accessed to a monitoring party of the operation service, for example, the processor or the first operating system. The frequencies of the accessed heartbeat signals are compared with a target frequency corresponding to the operation service; and the operation services in which the frequencies of the heartbeat signals do not match the corresponding target frequencies are taken over as the abnormal operation services.

In some embodiments of the present disclosure, whether the frequencies of the heartbeat signals match the corresponding target frequencies may be, but is not limited to, determined by determining, through comparison, whether the frequencies of the heartbeat signals are identical to the target frequencies; if so, it is determined that the frequencies of the heartbeat signals match the target frequencies; and if no, it is determined that the frequencies of the heartbeat signals do not match the target frequencies. Alternatively, a certain error range may be, but is not limited to, provided; whether the frequencies of the heartbeat signals match the target frequencies is determined by comparing whether the frequencies of the heartbeat signals fall into an error range of the target frequencies; if so, it is determined that the frequencies of the heartbeat signals match the target frequencies; and if no, it is determined that the frequencies of the heartbeat signals do not match the target frequencies.

In some embodiments of the present disclosure, after the abnormal operation service is taken over by the first operating system, the abnormal operation service on the second operating system may be, but is not limited to, restarted by using the following manner: sending a restart instruction to the second operating system, where the restart instruction is configured to indicate the restarting of the abnormal operation service.

In some embodiments of the present disclosure, the restart instruction is configured to indicate the restarting of the abnormal operation service; and after receiving the restart instruction, the second operating system may initialize the abnormal operation service until the abnormal operation service runs again.

In some embodiments of the present disclosure, after the abnormal operation service on the second operating system runs again, the first operating system may return the abnormal operation service taken over to the second operating system. The first operating system may save the current running site of the abnormal operation service into the shared memory and sends the interrupt request to the second operating system. The second operating system reads the current running site of the abnormal operation service from the shared memory and loads the running site into the abnormal operation service in which the running site runs, so as to cause the abnormal operation service to continue to run, thereby improving the running efficiency of the services.

Figure 10:
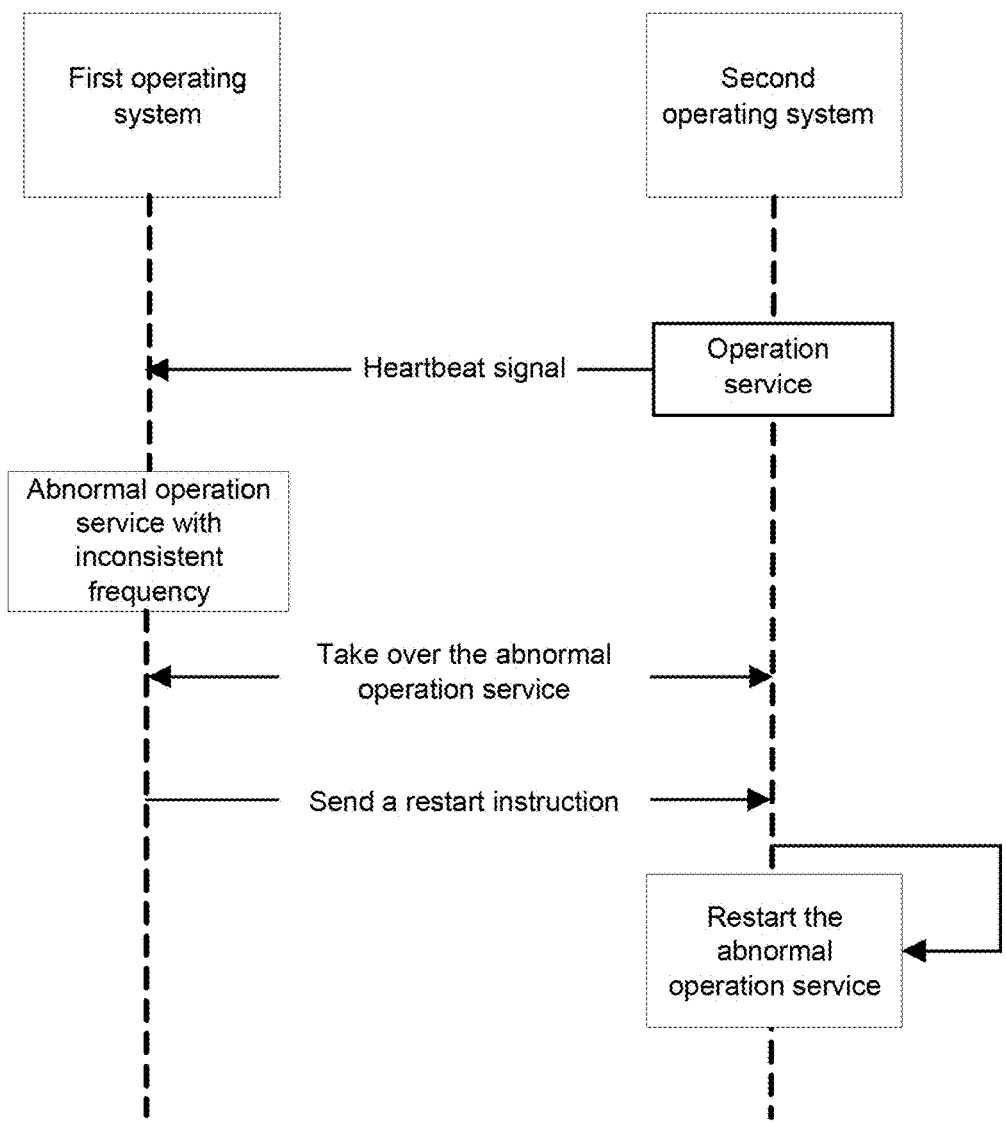
FIG. 10 is a schematic diagram of a system anomaly monitoring process according to an embodiment of the present disclosure.

FIG. 10 is a schematic diagram of a system anomaly monitoring process according to an embodiment of the present disclosure. As shown in FIG. 10, the first operating system receives the heartbeat signals of the operation services executed on the second operating system and detects the abnormal operation service in which the frequency of the heartbeat signal does not match the target frequency; and then the first operating system takes over the abnormal operation service on the second operating system to continue execution. In addition, the first operating system sends the restart instruction to the second operating system, so as to cause the second operating system to restart the abnormal operation service.

In some embodiments of the present disclosure, the dual system may be, but is not limited to, started by using the following manners: booting the first operating system to start; and booting the second operating system to start.

In some embodiments of the present disclosure, the first operating system is first booted to start, and then the second operating system is booted to start. The first operating system may be, but is not limited to, an operating system of which start process is faster and simpler. During the starting of the second operating system, the first operating system may execute some urgent operation services or operation services that facilitate the starting of the second operating system. Therefore, the start efficiency of the operating systems may be improved, or the processing efficiency of the operation services is improved.

In some embodiments of the present disclosure, the first operating system and the second operating system may be, but are not limited to, started in sequence. The first operating system may be, but is not limited to, started faster than the second operating system; and the first operating system may also be, but is not limited to, started with simpler conditions required than the second operating system. After starting first, the first operating system may run the services that may meet the conditions required for the starting of the second operating system or that may accelerate the starting of the second operating system, such that the plurality of systems may be started and run the services more efficiently and rapidly.

For example, after the first operating system is booted to start, the first operating system may run the services (for example, services such as fan running and parameter control) that may control chip environment parameters to achieve the requirements for starting the second operating system, such that the chip environment parameters rapidly reach an environment for the second operating system to start and run, thereby improving the start efficiency and running efficiency of the operating systems.

In some embodiments of the present disclosure, the first operating system may be, but is not limited to, booted to start by a boot loader of the first operating system; and the second operating system may be, but is not limited to, booted to start by a boot loader of the second operating system. Alternatively, the first operating system and the second operating system may be booted to start by the same boot loader.

In some embodiments of the present disclosure, the first operating system may be, but is not limited to, booted to start by using the following manners: after the chip is started and powered on, waking up, by the processor, the first processor core in the processor that is allocated for the first operating system; and executing the boot loader of the first operating system by the first processor core, so as to boot the first operating system to start.

In some embodiments of the present disclosure, the first processor core of the first operating system may be, but is not limited to, determined according to the processor cores owned by the processor where the first operating system is located. For example, the processor where the first operating system is located may include, but is not limited to, the plurality of processor cores (processor core 0 to processor core N); and one or more processor cores (for example, processor core 0) in the plurality of processor cores may be, but are not limited to, allocated to the first operating system as the first processor core of the first operating system.

In some embodiments of the present disclosure, the boot loader of the first operating system may be, but is not limited to, stored in a specific storage space on the chip, and is particularly configured to start the first operating system.

In some embodiments of the present disclosure, the first processor core of the first operating system may be, but is not limited to, configured to execute the boot loader of the first operating system; and the first operating system may be, but is not limited to, started by executing the boot loader of the first operating system.

In some embodiments of the present disclosure, the first operating system may be, but is not limited to, booted to start by executing, by the first processor core, the boot loader of the first operating system through the following manners: executing an SPL by the first processor core, where the boot loader of the first operating system includes the SPL; and loading the first operating system by the SPL.

In some embodiments of the present disclosure, the boot loader of the first operating system may include, but is not limited to, the SPL; and the first processor core may load, but is not limited to, the first operating system by executing the SPL.

In some embodiments of the present disclosure, the second operating system may be, but is not limited to, booted to start by using the following manners: waking up, by the SPL, the second processor core that is allocated for the second operating system; and executing the boot loader of the second operating system by the second processor core, so as to boot the second operating system to start.

In some embodiments of the present disclosure, the second processor core of the second operating system may be, but is not limited to, determined according to the processor cores of the processor where the second operating system is located. For example, the processor where the second operating system is located may include, but is not limited to, the plurality of processor cores (processor core 0 to processor core N); and one or more processor cores (processor core 1 to processor core N) in the plurality of processor cores may be, but are not limited to, allocated to the second operating system as the second processor core of the second operating system.

In some embodiments of the present disclosure, the second processor core of the second operating system may be, but is not limited to, woken up according to the SPL. For example, after the first operating system is loaded by using the SPL, the second processor core of the second operating system may be, but is not limited to, woken up according to the SPL. Alternatively, during the process of loading the first operating system by using the SPL, the second processor core of the second operating system may be, but is not limited to, woken up according to the SPL.

In some embodiments of the present disclosure, the boot loader of the second operating system may be, but is not limited to, executed by the second processor core, so as to boot the second operating system to start.

In some embodiments of the present disclosure, the second operating system may be, but is not limited to, booted to start by executing, by the second processor core, the boot loader of the second operating system through the following manners: executing a U-Boot by the second processor core, where the boot loader of the second operating system includes the U-Boot; and loading the second operating system by the U-Boot.

In some embodiments of the present disclosure, the second processor core may load, but is not limited to, the second operating system by executing the U-Boot; and the U-Boot may include, but is not limited to, the U-Boot.

In some embodiments of the present disclosure, the SPL is executed by the first processor core by using the following manners: performing safe start checking on codes of the SPL by a boot memory on the chip; and if a checking result is normal, executing the SPL by the first processor core.

In some embodiments of the present disclosure, the boot loader of the operating system may include, but is not limited to, the SPL; the boot loader of the operating system may be, but is not limited to, used as the boot memory; and the codes of the SPL included in the boot loader of the operating system are verified by the boot memory. For example, the SPL (the SPL may be, but is not limited to, the SPL) of the first operating system may be, but is not limited to, obtained according to the boot loader (the boot loader may be, but is not limited to, BootROM) of the first operating system; and the codes of the SPL may be, but is not limited to, verified according to the boot memory (the boot memory may be, but is not limited to, the BootROM) of the first operating system.

In some embodiments of the present disclosure, the process of performing safe start checking on the codes of the SPL by the boot memory may include, but is not limited to: reading, by the boot memory, the codes of the SPL and a verification code, performing operation on the codes of the SPL by an agreed operation mode (for example, Hashing operation), so s to obtain an operational value, and then comparing the operational value with the read verification code, where if the operational value is consistent with the verification code, the checking result being normal; and if the operational value is inconsistent with the verification code, the checking result being abnormal.

In some embodiments of the present disclosure, the SPL may also perform safe start checking on the codes of the U-Boot; the SPL reads the codes of the U-Boot and the verification code; operation is performed on the codes of the U-Boot by the agreed operation mode (for example, Hashing operation, which may be the same or different from the operation mode of the boot memory to check the SPL), so s to obtain an operational value; and then the operational value is compared with the read verification code, if the operational value is consistent with the verification code, the checking result is normal; and if the operational value is inconsistent with the verification code, the checking result is abnormal. When the checking result is normal, the second operating system is loaded by the U-Boot.

In some embodiments of the present disclosure, examples of the starting of the first operating system and the second operating system are provided. For example, the first processor core is CPU-0, and the second processor core is CPU-1 to CPU-N. The first operating system and the second operating system may be, but are not limited to, started by using the following manners: starting and powering up the chip; waking up the first processor core CPU-0 of the first operating system in the processor; using the first processor core CPU-0 to execute the boot loader of the first operating system, which may be, but is not limited to, the SPL; performing safe start checking on the codes of the SPL by the boot memory (which may be, but is not limited to, the BootROM) on the chip; if the checking result is normal, executing the SPL (which may be, but is not limited to, the SPL) by the first processor core, so as to load the first operating system; waking up the second processor cores CPU-1 to CPU-N of the second operating system by the SPL; and executing the U-Boot (which may be, but is not limited to, the U-Boot) by the second processor cores, so as to load the second operating system.

From the above descriptions about the implementation modes, those skilled in the art may clearly know that the method according to the foregoing embodiments may be implemented in a manner of combining software and a necessary universal hardware platform, and of course, may also be implemented through hardware, but the former is an implementation mode under many circumstances. Based on such an understanding, the technical solutions of the present disclosure substantially or parts making contributions to the conventional art may be embodied in form of software product, and the computer software product is stored in a storage medium (for example, a ROM/RAM), a magnetic disk and an optical disk), including a plurality of instructions configured to enable a terminal device (which may be a mobile phone, a computer, a server, a network device, or the like) to execute the method in each embodiment of the present disclosure.

Figure 11:
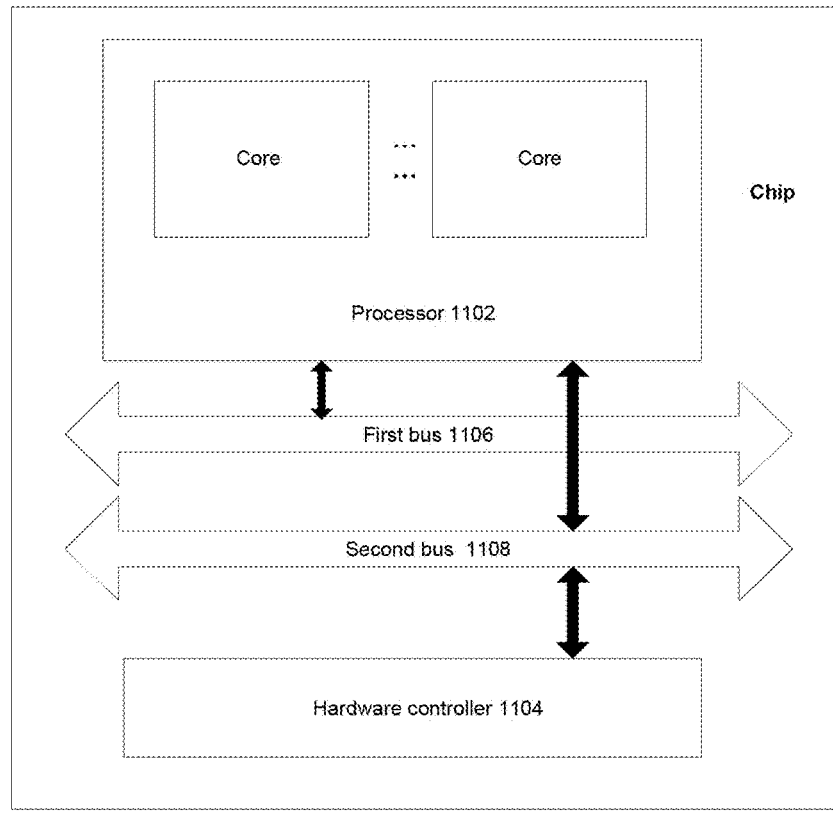
FIG. 11 is a schematic diagram I of an embedded system according to an embodiment of the present disclosure.

In some embodiments of the present disclosure, an embedded system is further provided that is configured to implement the method for controlling running of an operating system. FIG. 11 is a schematic diagram I of an embedded system according to an embodiment of the present disclosure. As shown in FIG. 11, the embedded system may include a chip and at least two operating systems. The chip includes a processor 1102, a hardware controller 1104, a first bus 1106, and a second bus 1108. The bandwidth of the first bus 1106 is higher than the bandwidth of the second bus 1108; the first bus 1106 is configured as a multi-master and multi-slave mode; and the second bus 1108 is configured as a one-master and multi-slave mode. The at least two operating systems run on the basis of the processor 1102; the at least two operating systems communicate with each other by means of the first bus 1106; and the at least two operating systems control the hardware controller by means of the second bus 1108.

The chip may be the BMC chip. The processor may be a multi-core processor. The hardware controller may be configured to control an external device connected to the corresponding external interface. The first bus is configured to be in a multi-master and multi-slave mode and may be a bus used for communication between the plurality of processor cores of the processor, for example, Advanced High Performance Bus (AHB). The second bus is configured to be in a one-master and multi-slave mode and may be a bus used by the processor for control of the hardware controller, for example, an Advanced Peripheral Bus (APB). The bandwidth of the first bus is higher than the bandwidth of the second bus.

The embedded system may include the at least two operating systems, and the at least two operating systems run on the basis of the processor. The processing resources of the processor are dynamically allocated to the at least two operating systems. The processing resources of the processor include the processor cores. The at least two operating systems communicate via the first bus, and the at least two operating systems realize control of the hardware controller via the second bus.

In some embodiments of the present disclosure, there may be one or a plurality of hardware controllers. The hardware controller may include, but are not limited to, a controller corresponding to at least one of the following chip peripherals: I2C, a Universal Serial Bus (USB), a UART, an Analog to Digital Converter (ADC), a Joint Test Action Group (JTAG), a Real_Time Clock (RTC), a General Purpose Input/Output (GPIO), a Watch Dog Timer (WDT), a virtual UART, a super I/O, a Serial General Purpose Input/Output (SGPIO), Pulse Width Modulation (PWM), FanTach (fan speed regulation), a timer, a PECI, and a mailbox, and may also include the controllers of other types. There may be one or a plurality of external interfaces; and the external interface may include, but are not limited to, the external interface corresponding to any controller.

Figure 12:
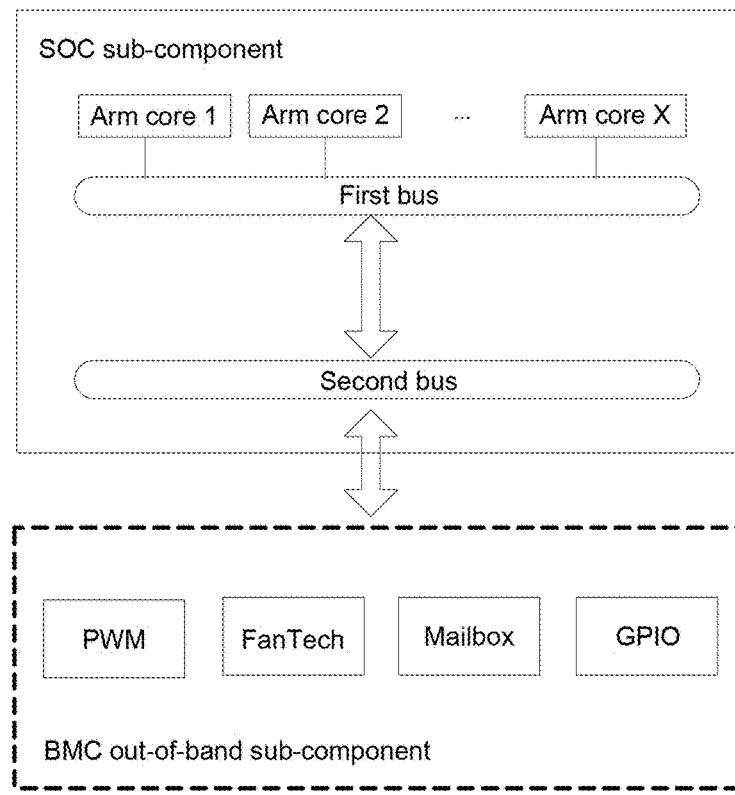
FIG. 12 is a structural block diagram of an BMC chip according to an embodiment of the present disclosure.

For example, an example of the BMC chip may be shown in FIG. 12. The hardware of the BMC chip may include, but is not limited to, an SOC sub-component and a BMC out-of-band sub-component. The SOC sub-component mainly includes ARM cores (ARM Core 1, ARM Core 2 . . . , ARM Core X), and may also include, but is not limited to, a (Double Data Rate) DDR 4 controller (memory controller), a Media Access Control Address (MAC) controller (network controller), a Secure Digital (SD) Card/Embedded Multi Media Card (eMMC) controller (storage controller), a PCIe Root Complex (RC) controller, a Static Random-Access Memory (SRAM), and a SPI controller.

The cores are connected to the controllers by the second bus, so as to implement interaction between the cores and the controllers. In addition, ARM cores are connected to the first bus (for example, the cores may be connected via an Advanced extensible Interface (AXI) bridge), and communication between cores is realized via the first bus. In addition, the interconnection between the first bus and the second bus is also realized in the SOC sub-component (for example, by means of bridge conversion). In this way, a physical path is provided for the SOC sub-component to access peripherals on the second bus.

The DDR4 controller may be connected to other components or devices through a DDR4 Physical Layer (PHY) interface. The MAC controller is connected to other components or devices through the Reduced Gigabit Media Independent Interface (RGMII). The SD card/eMMC controller is connected to other components or devices through the SD interface. The PCIe RC controller is connected to other components or devices through the PCIe PHY interface.

The BMC out-of-band sub-component mainly includes the controller corresponding to the chip peripherals such as a PWM, a GPIO, FanTach (fan speed regulation), and mailbox. Through these controllers, out-of-band management functions such as PECI communication of the BMC (for example, the use of the GPIO to simulate the PECI), and fan regulation may be realized. From FIG. 12, it may be learned that the BMC out-of-band sub-component may implement, but is not limited to, the interaction with the SOC sub-component through the second bus.

The BMC chip implement the interaction among a on-chip ARM core, a storage unit, and a controller hardware resource through the first bus and the second bus. Dynamic balanced scheduling of the processor resources mainly involves the ARM core resource scheduling of the BMC chip; and inter-core communication refers to the communication performed between the ARM cores. For example, the Linux system occupies the cores of the RTOS. The Linux system first sends an inter-core interrupt (interrupt number 9) on a certain core of Core 2 to Core N to Core 1 by an on-chip first bus. If the current RTOS is in the idle state, occupation is allowed: Core 1 replies to an inter-core interrupt (interrupt number 10) via the first bus, and an external controller resource (for example, PWM/PECI) mapped by the current Core 1 is released; and the Linux system receives the inter-core interrupt 10, initiates an occupation flow; adds the Core 1 into Linux SMP scheduling, and obtains the control power of the PWM/PECI peripherals, which may be controlled via the second bus.

In one aspect, the at least two operating systems include the first operating system and the second operating system. The chip loads a communication value to the first bus, and the first bus sends a communication signal carrying the communication value to a communication register corresponding to the second operating system, so as to realize the communication between the first operating system and the second operating system, where the communication value is configured to indicate communication content between the first operating system and the second operating system.

In another aspect, the chip loads a control value to the second bus, and the second bus sends a control signal carrying the control value to a register corresponding to the hardware controller, so as to realize control of the hardware controller by the operating systems, where the control value is configured to indicate control content of the operating systems over the hardware controller.

The operating system controls the hardware controller by accessing (for example, executing a read operation and a write operation) the registers of each hardware controller. The mode that the operating system accesses the registers of the hardware controller may, but is not limited to, read or write the addresses of the registers of each hardware controller. These addresses of the registers may be, but is not limited to, unique and determined when the chip is designed. For example, a specific function (for example, a communication function between the operating systems or a control function of the operating system over the hardware controller) may be achieved by writing, by the operating system, a specific value (that is, the communication value or the control value) into a specific address (that is, the communication register or the register corresponding to the hardware controller). That is to say; different functions correspond to different control values, such that the correspondence relationship between the functions of the hardware controller and the control values is maintained in the chip. For example, a control value 00 means that an air conditioner accelerates by one gear; and a control value 01 means that the air conditioner decelerates by one gear, and so on.

Interactions such as communication and control between the operating systems and between the operating systems and the hardware controllers may, but are not limited to, be performed via the bus. The read and write operations of the operating system on the registers of the hardware controllers are eventually converted into control signals of the first bus (or the second bus) to the hardware controllers; and this part of the conversion work and the process of the control of the first bus (or the second bus) to the hardware controllers may be, but are not limited to, realized automatically by internal hardware of the chip. An implementation process follows bus specifications. During the operation process of the first bus (or the second bus), in one aspect, a physical signal related to a bus protocol may be transmitted and controlled; and in another aspect, valid data may be transmitted to the hardware controllers by a physical data channel.

The first bus system may include, but is not limited to, 3 parts: a master component, a slave component, and an infrastructure; and transmissions throughout the first bus are sent by the master component, and the slave component is responsible for response. The infrastructure may include, but is not limited to, an arbiter, a master-to-slave multiplexer, a slave-to-master multiplexer, a decoder, a dummy slave, and a dummy master. For the multi-master-multi-slave mode of the first bus, the master first sends an issuing request to the arbiter, and the arbiter determines when to allow the master to acquire the permission of bus access. After acquiring the permission, the master sends the data and the control signal to the arbiter, and the arbiter determines a corresponding slave path through address analysis; and then the request is sent to a corresponding destination. Likewise, the response data is analyzed by the decoder, and is then returned to the corresponding master. Multiple-to-multiple access is achieved through such a multiplexing mechanism.

For the one-master and multi-slave mode of the second bus, the second bus may be hung under the first bus system; services are converted between bus systems through a bridge (bridge structure); and in this case, the bridge is the master of the second bus, and other peripheral devices (that is, the hardware controllers) are all slaves. A data request may only be sent from the master to the slave; and the slave returns the corresponding response data to the master after receiving the request. One-to-many access may be implemented in this process; and the access may not involve arbitration and decoder analysis operations in the first bus.

By means of the embedded system in which the first bus is configured to be in the multi-master and multi-slave mode, and the second bus is configured to be in the one-master and multi-slave mode, the first bus in the multi-master and multi-slave mode may complete communication between the systems more efficiently by using relatively more complex logic circuits and bus protocols; and the second bus in the one-master and multi-slave mode may reduce the complexity of structures while the control of the system to the hardware controller is completed by using relatively simple logic circuits and bus protocols, such that the power consumption of the entire embedded system is reduced, and the configuration and cooperation of various modes on the bus may better improve the running performance of the embedded system.

By means of the embedded system, the first operating system and the second operating system run on the basis of the processor; and the communication between the operating systems and the control of the hardware controller are realized by the bus with different functions. Since both the first operating system and the second operating system run on the basis of the same processor, addition and deployment of hardware devices are avoided, and system costs are reduced, such that the processor resources may be rationally used to support the running between systems. Therefore, the technical problem of low running efficiency of the operating system may be solved, thereby achieving the technical effect of improving the running efficiency of the operating system.

In some embodiments of the present disclosure, the at least two operating systems include the first operating system and the second operating system. The first operating system controls, on the basis of the processor, a target hardware controller to run a target operation service; the first operating system releases the target hardware controller by means of the second bus when the target operation service runs to a target service state; the second operating system controls, by means of the second bus, the target hardware controller to run the target operation service.

In some embodiments of the present disclosure, the target operation service is run by the target hardware controller, and the first operating system controls the target hardware controller on the basis of the processor. The second operating system may take over the target operation service by taking over the target hardware controller.

In some embodiments of the present disclosure, the takeover process of the target operation service is similar to that in the foregoing embodiments and is not described herein again.

When the first operating system writes a specific value corresponding to disabling of the target hardware controller (that is, the control value) to a register of the target hardware controller, so as to achieve the purpose of disabling the target hardware controller when the target operation service is run to a target service state. The specific value to be written is automatically loaded into a data channel of the second bus by the hardware of the chip, and the control of the hardware controller is implemented ultimately in a hardware manner (that is, implementing a releasing operation).

The second operating system writes a specific value corresponding to the target operation service (that is, the control value) to the register of the target hardware controller, so as to achieve the purpose of controlling the target hardware controller to run the target operation service. The specific value to be written is automatically loaded into a data channel of the second bus by the hardware of the chip, and the control of the hardware controller is implemented ultimately in a hardware manner (that is, implementing the running of the target operation service).

In some embodiments of the present disclosure, the second operating system sends a first interrupt request to the first operating system by means of the first bus, wherein the first interrupt request is configured to request to take over the target hardware controller; the first operating system releases the target hardware controller by means of the second bus in response to the first interrupt request; or the first operating system releases the target hardware controller by means of the second bus when a service attribute of the target operation service reaches a target service attribute.

In some embodiments of the present disclosure, the second operating system may proactively request to take over the target hardware controller, so as to take over the target operation service; and the first operating system may also proactively release the target hardware controller, so as to release the target operation service.

In some embodiments of the present disclosure, the process of releasing and taking over the target hardware controller is similar to that in the foregoing embodiments and is not described herein again.

The second operating system writes a specific value corresponding to a first interrupt request (that is, the communication value) into an interrupt register, so as to send the first interrupt request to the first operating system. The specific value to be written is automatically loaded into a data channel of the first bus by the hardware of the chip, and an interrupt request is implemented ultimately in a hardware manner.

In some embodiments of the present disclosure, the first operating system determines, in response to the first interrupt request, whether the target hardware controller is taken over by the second operating system; and insofar as the target hardware controller is taken over by the second operating system, the first operating system releases the target hardware controller by means of the second bus.

In some embodiments of the present disclosure, the first operating system may determine whether the target hardware controller is taken over by the second operating system. The determination process is similar to that in the foregoing embodiments and is not described herein again.

In some embodiments of the present disclosure, insofar as the target hardware controller is not taken over by the second operating system, the first operating system sends a second interrupt request to the second operating system by means of the first bus, where the second interrupt request is configured to indicate rejection of the second operating system to take over the target hardware controller.

In some embodiments of the present disclosure, the process that the first operating system rejects the second operating system to take over the target hardware controller is similar to that in the foregoing embodiments and is not described herein again.

In some embodiments of the present disclosure, the first operating system sends a third interrupt request to the second operating system, where the third interrupt request is configured to indicate that the first operating system has released the target hardware controller; and in response to the third interrupt request, the second operating system controls, by means of the second bus, the target hardware controller to run the target operation service.

In some embodiments of the present disclosure, the process that the first operating system notifies the second operating system that the target hardware controller has been released is similar to that in the foregoing embodiments and is not described herein again.

The second operating system writes a specific value corresponding to the target operation service (that is, the control value) to the register of the target hardware controller, so as to achieve the purpose of controlling the target hardware controller to run the target operation service. The specific value to be written is automatically loaded into a data channel of the second bus by the hardware of the chip, and the control of the hardware controller is implemented ultimately in a hardware manner.

In some embodiments of the present disclosure, the at least two operating systems include the first operating system and the second operating system. The first operating system runs on the basis of a target processor core in the processor; the first operating system releases the target processor core when running to a target system state; the second operating system adds the target processor core into a scheduling resource pool of the second operating system, where the scheduling resource pool includes a processor core in the processor that is allocated for the second operating system.

In some embodiments of the present disclosure, the process that the at least two operating systems occupy the target processor core is similar to that in the foregoing embodiments and is not described herein again.

In some embodiments of the present disclosure, the second operating system sends a fourth interrupt request to the first operating system by means of the first bus, wherein the fourth interrupt request is configured to request to occupy the target processor core; the first operating system releases the target processor core in response to the fourth interrupt request; or the first operating system releases the target processor core when a system attribute reaches a target system attribute.

In some embodiments of the present disclosure, the second operating system may proactively occupy the target processor core; and the first operating system may also proactively release the target processor core.

In some embodiments of the present disclosure, the process occupying and releasing the target processor core is similar to that in the foregoing embodiments and is not described herein again.

In some embodiments of the present disclosure, the first operating system determines, in response to the fourth interrupt request, whether the target processor core is occupied by the second operating system; and insofar as the target processor core is occupied by the second operating system, the first operating system releases the target processor core.

In some embodiments of the present disclosure, the first operating system may determine whether the target processor core is occupied by the second operating system. The process is similar to that in the foregoing embodiments and is not described herein again.

In some embodiments of the present disclosure, insofar as the target processor core is not occupied by the second operating system, the first operating system sends a fifth interrupt request to the second operating system by means of the first bus, where the fifth interrupt request is configured to indicate rejection of the second operating system to occupy the target processor core.

In some embodiments of the present disclosure, the process that the first operating system rejects the second operating system to occupy the target processor core is similar to that in the foregoing embodiments and is not described herein again.

In some embodiments of the present disclosure, the first operating system sends a sixth interrupt request to the second operating system, where the sixth interrupt request is configured to indicate that the first operating system has released the target processor core; and the second operating system adds, in response to the sixth interrupt request, the target processor core into the scheduling resource pool.

In some embodiments of the present disclosure, the process that the first operating system notifies the second operating system that the target processor core has been released is similar to that in the foregoing embodiments and is not described herein again.

In some embodiments of the present disclosure, the at least two operating systems include the first operating system and the second operating system. A target processor core in the processor has been added into a scheduling resource pool of the second operating system, where the scheduling resource pool includes a processor core in the processor that is allocated for the second operating system; the second operating system releases the target processor core when the first operating system is woken up; and the first operating system runs on the basis of the target processor core.

In some embodiments of the present disclosure, the process that the first operating system wakes up and uses the target processor core is similar to that in the foregoing embodiments and is not described herein again.

In some embodiments of the present disclosure, the second operating system releases the target processor core when it is detected that the first operating system is woken up; or the first operating system sends a seventh interrupt request to the second operating system when being woken up, where the seventh interrupt request is configured to request the second operating system to release the target processor core; and the second operating system is configured to, in response to the seventh interrupt request, release the target processor core.

In some embodiments of the present disclosure, the second operating system proactively releases the target processor core when the first operating system is woken up or the first operating system proactively requests the second operating system to release the target processor core. The process is similar to that in the foregoing embodiments and is not described herein again.

In some embodiments of the present disclosure, the at least two operating systems include the first operating system and the second operating system. The chip further includes a storage space, and the at least two operating systems control the storage space by means of the first bus; the first operating system generates service data during running on the basis of the processor; the first operating system stores the service data to the storage space by means of the first bus, and sends an eighth interrupt request to the second operating system by means of the first bus, where the eighth interrupt request is configured to request the second operating system to read the service data from the storage space; and the second operating system reads the service data from the storage space in response to the eighth interrupt request.

In some embodiments of the present disclosure, the first operating system and the second operating system may, but are not limited to, implement the interaction of the inter-system service data through the storage space and transmission of the interrupt requests. The interaction process of the inter-system service data is similar to that in the foregoing embodiments and is not described herein again.

The first operating system writes the specific value into the specific address of the storage controller, so as to achieve the purpose of storing the service data to the storage space. The specific value to be written is automatically loaded into the data channel of the first bus by the hardware of the chip, and the control of the storage controller and the storage of the service data are implemented ultimately in a hardware manner (that is, implementing transmission of the valid data through the physical data channel).

In some embodiments of the present disclosure, the first operating system runs on the basis of the periodicity of the processor; or the first operating system runs on the basis of the processor in response to a received wake-up request; or the first operating system runs on the basis of the processor according to a matching degree between the current operation service generated on the processor and the first operating system.

In some embodiments of the present disclosure, the running mechanism of the first operating system is similar to that in the foregoing embodiments and is not described herein again.

In some embodiments of the present disclosure, the first operating system hibernates at the end of running; and during the hibernation of the first operating system, the second operating system adds a target processor core used by the first operating system into a scheduling resource pool of the second operating system, where the scheduling resource pool includes processors other than the target processor core in the processor.

In some embodiments of the present disclosure, the process that the target processor core is occupied by the second operating system during the hibernation of the first operating system is similar to that in the foregoing embodiments and is not described herein again.

In some embodiments of the present disclosure, the at least two operating systems communicate with each other by means of a communication protocol deployed by the first bus; or the at least two operating systems communicate with each other by means of the first bus, the second bus, and a communication hardware controller in the hardware controller.

In some embodiments of the present disclosure, the at least two operating systems may, but are not limited to, communicate with each other by the communication protocol deployed by the first bus, that is, may, but are not limited to, implement inter-core communication in the form of software.

In some embodiments of the present disclosure, the at least two operating systems may, but are not limited to, also communicate with each other by the first bus, the second bus, and the communication hardware controller in the hardware controller, that is, may, but are not limited to, implement inter-core communication in the form of hardware.

In some embodiments of the present disclosure, the at least two operating systems communicate with each other by sending an Inter-Processor Interrupt (IPI) request through the first bus; or one of the at least two operating systems sends a system interrupt request to the first bus; the first bus forwards the system interrupt request to the second bus; the second bus sends the system interrupt request to a mailbox hardware component controlled by the communication hardware controller; and the mailbox hardware component sends the system interrupt request to the other one of the at least two operating systems by means of the second bus and the first bus.

In some embodiments of the present disclosure, the occupation and releasing of the processor resources between different operating systems, and the interaction of the service data may, but are not limited to, be completed through the inter-core interrupt, such as the SGI (inter-core interrupt in the Linux system). One operating system sends a resource occupation request (for example, a core occupation request) or a resource releasing request (for example, a core releasing request) to another operating system through the IPI, so as to request to perform occupation or releasing of the processing resources.

In some embodiments of the present disclosure, the inter-core communication may, but is not limited to, be implemented by a mailbox channel mailbox connected to a mailbox controller in the out-of-band sub-component.

In some embodiments of the present disclosure, the at least two operating systems include the first operating system and the second operating system. The first operating system monitors, by means of the first bus, operation services executed on the second operating system; and the first operating system takes over an abnormal operation service by means of the first bus when there is an abnormal operation service in the operation services executed on the second operating system.

In some embodiments of the present disclosure, the process of monitoring, by the first operating system, the abnormal operation service on the second operating system is similar to that in the foregoing embodiments and is not described herein again.

The operation services of the second operating system write values to the specific address of the storage controller at a certain frequency; and the first operating system reads the specific address of the storage controller, so as to achieve the purpose of monitoring the operation services executed on the second operating system. The specific address of the storage controller that needs to be read is automatically loaded into the address channel of the first bus by the hardware of the chip, so as to read the specific address of the storage controller in a hardware manner; the read value is returned to the first operating system from the data channel of the first bus in the form of hardware: and finally, the operation services executed on the second operating system are monitored.

The takeover of the abnormal operation service by the first operating system may be the control of the hardware controller corresponding to the abnormal operation service. The first operating system writes the specific value to the register of the hardware controller of the abnormal operation service, so as to control the hardware controller. The specific value to be written is automatically loaded into the data channel of the first bus by the hardware of the chip, and the control of the hardware controller and the takeover of the abnormal operation service are implemented ultimately in a hardware manner.

In some embodiments of the present disclosure, the first operating system receives, by means of the first bus, heartbeat signals of the operation services executed on the second operating system; and the first operating system takes over, by means of the first bus, the abnormal operation service in which the frequency of the heartbeat signal does not match a corresponding target frequency.

In some embodiments of the present disclosure, the process of monitoring, by the first operating system, the abnormal operation service on the second operating system by monitoring the frequency of the heartbeat signal is similar to that in the foregoing embodiments and is not described herein again.

The first operating system reads the value of the specific address of the storage controller, so as to achieve the purpose of receiving the heartbeat signal of the operation services executed on the second operating system. The specific address of the storage controller that needs to be read is automatically loaded into the address channel of the first bus by the hardware of the chip, so as to read the specific address of the storage controller in a hardware manner; the read value is returned to the first operating system from the data channel of the first bus in the form of hardware; and finally, the heartbeat signal of the operation services executed on the second operating system are received.

In some embodiments of the present disclosure, after taking over the abnormal operation service, the first operating system sends a restart instruction to the second operating system by means of the first bus, where the restart instruction is configured to indicate restart of the abnormal operation service.

In some embodiments of the present disclosure, the process of restarting the abnormal operation service after the first operating system takes over the abnormal operation service on the second operating system is similar to that in the foregoing embodiments and is not described herein again.

The first operating system writes the specific value into the specific address of the storage controller after taking over the abnormal operation service, so as to achieve the purpose of restarting the abnormal operation service of the second operating system. The specific value to be written is automatically loaded into the data channel of the first bus by the hardware of the chip, and the value of the specific address of the storage controller is updated in a hardware manner. The second operating system reads the specific value and performs analysis, so as to restart the corresponding abnormal operation service.

In some embodiments of the present disclosure, the chip further includes: a memory, and the memory stores a start booting component; and the chip runs the start booting component after being powered on, so as to boot one of the at least two operating systems to start, and the start booting component guides another operating system in the at least two operating systems to start.

In some embodiments of the present disclosure, the start booting process of the plurality of operating systems is similar to that in the foregoing embodiments and is not described herein again.

In some embodiments of the present disclosure, the at least two operating systems include the first operating system and the second operating system. The first operating system controls, on the basis of the processor, a target hardware controller to run a target operation service; the first operating system releases the target hardware controller by means of the second bus when the target operation service runs to a target service state; the second operating system controls, by means of the second bus, the target hardware controller to run the target operation service; the first operating system runs on the basis of a target processor core in the processor; the first operating system releases the target processor core when running to a target system state; and the second operating system adds the target processor core into a scheduling resource pool of the second operating system, where the scheduling resource pool includes a processor core in the processor that is allocated for the second operating system. The chip further includes a storage space, and the at least two operating systems control the storage space by means of the first bus; the first operating system generates service data during running on the basis of the processor; the first operating system stores the service data to the storage space by means of the first bus, and sends an eighth interrupt request to the second operating system by means of the first bus, where the eighth interrupt request is configured to request the second operating system to read the service data from the storage space; and the second operating system reads the service data from the storage space in response to the eighth interrupt request.

In some embodiments of the present disclosure, the operating systems may take over the hardware controller and occupy the processor core. The process is similar to that in the foregoing embodiments and is not described herein again.

Some embodiments of the present disclosure further provide another embedded system that is configured to implement the method for controlling running of an operating system. The embedded system may run on the BMC chip. The embedded system includes a first operating system, a second operating system, a controller, and a processor. The first operating system and the second operating system run on the basis of a processor. The controller is configured to detect a running state of the first operating system during running, and control, according to the running state, processor resources used by the first operating system.

By means of the embedded system, the first operating system and the second operating system run on the basis of the processor; the controller detects the running state of the first operating system during running, and controls, according to the running state, the processor resources used by the first operating system. Since both the first operating system and the second operating system run on the basis of the same processor, addition and deployment of hardware devices are avoided, system costs are reduced, and the processor resources used by the operating system may be controlled during the running of the operating system, such that the processor resources may be rationally used to support the running between systems. Therefore, the technical problem of low running efficiency of the operating system may be solved, thereby achieving the technical effect of improving the running efficiency of the operating system.

In some embodiments of the present disclosure, the first operating system and the second operating system may be similar to those in the foregoing embodiments. The first operating system and the second operating system run on the basis of the processor. The controller may be a software component running under the first operating system or the second operating system.

In some embodiments of the present disclosure, the processing logic of the controller may, but is not limited to, be deployed on the processor, and may also be deployed on the first operating system, or may also, but is not limited to, be divided into a first control unit and a second control unit, which are deployed on the first operating system and the second operating system, respectively, according to functions, so as to realize the functions such as inter-system control of the processor resources, operation service management, and service interactions.

In some embodiments of the present disclosure, the controller is configured to perform at least one of the following: detect a service state of a target operation service run by the first operating system on the basis of the processor, where the running state includes the service state; and detect a system state of the first operating system, where the running state includes the system state, and the first operating system runs on the basis of a target processor core in the processor. In some embodiments of the present disclosure, the detection of the controller to the service state and the system state is similar to that in the foregoing embodiments and is not described herein again.

In some embodiments of the present disclosure, the controller is configured to release the target operation service when it is detected that the service state is a target service state, where the processor resources include the target operation service; the second operating system is configured to run the target operation service; and/or the controller is configured to release the target processor core when it is detected that the system state is a target system state, where the processor resources include the target processor core; and the second operating system is configured to add the target processor core into a scheduling resource pool of the second operating system, and the scheduling resource pool includes a processor core in the processor that is allocated for the second operating system.

In some embodiments of the present disclosure, the process that the controller controls the target operation service and the target processor core to release is similar to that in the foregoing embodiments and is not described herein again.

In some embodiments of the present disclosure, the embedded system further includes: a first service interaction thread running on the first operating system, and a second service interaction thread running on the second operating system. The controller is configured to determine, when a first interrupt request sent to the first service interaction thread by the second service interaction thread is acquired, that the service state is detected as the target service state, where the first interrupt request is configured to request to take over the target operation service; or the controller is configured to determine, when a service attribute of the target service state reaches a target service attribute, that the service state is detected as the target service state.

In some embodiments of the present disclosure, the process of the interaction between the operating systems may, but is not limited to, be controlled by the service interaction threads that are respectively deployed on the operating systems.

In some embodiments of the present disclosure, the process of detecting the service state is similar to that in the foregoing embodiments and is not described herein again.

In some embodiments of the present disclosure, the controller is configured to: in response to the first interrupt request, determine whether the target operation service is taken over by the second operating system; and insofar as the target operation service is taken over by the second operating system, release the target operation service.

In some embodiments of the present disclosure, the process that the controller determines whether the target operation service is taken over by the second operating system is similar to that in the foregoing embodiments and is not described herein again.

In some embodiments of the present disclosure, the embedded system further includes; the first service interaction thread running on the first operating system, and the second service interaction thread running on the second operating system. The first service interaction thread is configured to, insofar as the target operation service is not taken over by the second operating system, send a second interrupt request to the second service interaction thread, where the second interrupt request is configured to indicate rejection of the second operating system to take over the target operation service.

In some embodiments of the present disclosure, the process of rejecting the second operating system to take over the target operation service is similar to that in the foregoing embodiments and is not described herein again.

In some embodiments of the present disclosure, the embedded system further includes the first service interaction thread running on the first operating system, and the second service interaction thread running on the second operating system. The first service interaction thread is configured to send a third interrupt request to the second service interaction thread, where the third interrupt request is configured to indicate that a target hardware controller has been released; and the second operating system is configured to, in response to the third interrupt request, control the target hardware controller to run the target operation service.

In some embodiments of the present disclosure, the process of notifying that the target hardware controller has been released is similar to that in the foregoing embodiments and is not described herein again.

In some embodiments of the present disclosure, the embedded system further includes; the first service interaction thread running on the first operating system, and the second service interaction thread running on the second operating system. The controller is configured to determine, when a fourth interrupt request sent to the first service interaction thread by the second service interaction thread is acquired, that the system state is detected as the target system state, where the fourth interrupt request is configured to request to occupy the target processor core; or the controller is configured to when a system attribute of the first operating system reaches a target system attribute, determine that the system state is detected as the target system state.

In some embodiments of the present disclosure, the process of detecting the system state is similar to that in the foregoing embodiments and is not described herein again.

In some embodiments of the present disclosure, the controller is configured to: in response to the fourth interrupt request, determine whether the target processor core is occupied by the second operating system; and insofar as the target processor core is occupied by the second operating system, releasing the target processor core.

In some embodiments of the present disclosure, the process that the controller determines whether the target processor core is occupied by the second operating system is similar to that in the foregoing embodiments and is not described herein again.

In some embodiments of the present disclosure, the embedded system further includes; the first service interaction thread running on the first operating system, and the second service interaction thread running on the second operating system. The first service interaction thread is configured to, insofar as the target processor core is not occupied by the second operating system, send a fifth interrupt request to the second service interaction thread, where the fifth interrupt request is configured to indicate rejection of the second operating system to occupy the target processor core.

In some embodiments of the present disclosure, the process of rejecting the second operating system to occupy the target processor core is similar to that in the foregoing embodiments and is not described herein again.

In some embodiments of the present disclosure, the embedded system further includes the first service interaction thread running on the first operating system, and the second service interaction thread running on the second operating system. The first service interaction thread is configured to send a sixth interrupt request to the second service interaction thread, where the sixth interrupt request is configured to indicate that the first operating system has released the target processor core; and the second operating system is configured to, in response to the sixth interrupt request, add the target processor core into the scheduling resource pool.

In some embodiments of the present disclosure, the process of notifying that the target processor core has been released is similar to that in the foregoing embodiments and is not described herein again.

In some embodiments of the present disclosure, the controller is further configured to: when a target processor core in the processor has been added into a scheduling resource pool of the second operating system and the first operating system is woken up for running, detect whether the target processor core is released, where the scheduling resource pool includes a processor core in the processor that is allocated for the second operating system; and insofar as the second operating system has released the target processor core when the first operating system is woken up, run the first operating system on the basis of the target processor core.

In some embodiments of the present disclosure, the operation process when the first operating system is woken up is similar to that in the foregoing embodiments and is not described herein again.

In some embodiments of the present disclosure, the embedded system further includes the first service interaction thread running on the first operating system, and the second service interaction thread running on the second operating system. The first service interaction thread is configured to, insofar as it is detected that the target processor core is not released, send a seventh interrupt request to the second service interaction thread, where the seventh interrupt request is configured to request the second operating system to release the target processor core; and the second operating system is configured to, in response to the seventh interrupt request, release the target processor core.

In some embodiments of the present disclosure, the negotiation process that the second operating system releases the target processor core is similar to that in the foregoing embodiments and is not described herein again.

In some embodiments of the present disclosure, the embedded system further includes the first service interaction thread running on the first operating system, and the second service interaction thread running on the second operating system. The first service interaction thread is configured to: acquire service data generated in the process that the first operating system runs on the basis of the processor; store the service data to a storage space on the processor; and send an eighth interrupt request to the second service interaction thread, where the eighth interrupt request is configured to request the second operating system to read the service data from the storage space; and the second operating system is configured to read the service data from the storage space in response to the eighth interrupt request.

In some embodiments of the present disclosure, the interaction process of the service data between the operating systems is similar to that in the foregoing embodiments and is not described herein again.

Figure 13:
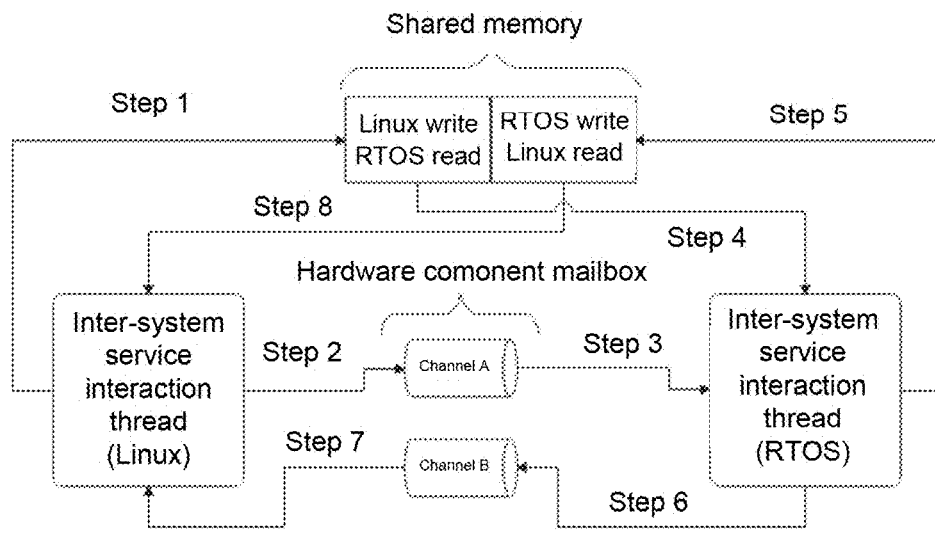
FIG. 13 is a schematic diagram of a service data communication process between operating systems according to an implementation of the present disclosure.

Some embodiments of the present disclosure provide a process of achieving inter-system service data communication on the basis of a hardware component. For example, the first operating system is an RTOS, and the second operating system is Linux. FIG. 13 is a schematic diagram of a service data communication process between operating systems according to an optional implementation of the present disclosure. As shown in FIG. 13, the Linux and the RTOS have service interaction capabilities, which may be, but is not limited to, implemented through inter-core communication, for example, by using a shared memory-based communication architecture. The effect of using a mailbox as the hardware component is to transmit a pointer in a memory from a core where the Linux is located to a core where the RTOS is located, and the sending and receiving of the pointer use separate mailbox channels. The shared memory may be accessed by all the cores; and the space of the shared memory may be from a fixed storage area of the memory DDR of a system. The Linux core first writes data into the shared memory; then a mailbox transmits an interrupt request onto the RTOS core; and after receiving the interrupt request, the RTOS core may directly read the data from the shared memory. Since the entire process does not involve an data copy operation, high communication efficiency is achieved, particularly facilitating transmission of a big data volume.

An inter-system service interaction thread (which is the second service interaction thread) on the Linux is also referred to as a Linux thread; and an inter-system service interaction thread (which is the first service interaction thread) on the RTOS is also referred to as an RTOS thread. The above heterogeneous multi-system inter-core communication process may include, but is not limited to, the following steps.

At S1, the Linux thread copies the data to a specified position 1 in the shared memory.

At S2, the Linux thread writes information such as an address 1 of the specified position 1 in the shared memory and the interrupt request into a channel A of the hardware component mailbox.

At S3, the RTOS thread receives the interrupt request and the address 1 in the channel A of the hardware component mailbox.

At S4, the RTOS thread reads the data stored in the address 1 from the shared memory. At S5, the RTOS thread copies the data to a specified position 2 of the shared memory.

At S6, the RTOS thread writes information such as an address 2 of the specified position 2 in the shared memory and the interrupt request into a channel B of the hardware component mailbox.

At S7, the Linux thread receives the interrupt request and the address 2 in the channel B of the hardware component mailbox.

At S8, the Linux thread reads the data from the address 2 in the shared memory.

By means of the above inter-core communication mechanism, message passing, processing and response between the inter-system service interaction thread of the Linux and the inter-system service interaction thread of the RTOS are realized.

In some embodiments of the present disclosure, the controller is further configured to: control the first operating system to run on the basis of the periodicity of the processor; or in response to a received wake-up request, control the first operating system to run on the basis of the processor; or according to a matching degree between an operation service generated on the processor and the first operating system, control the first operating system to run on the basis of the processor.

In some embodiments of the present disclosure, the process that the controller controls the first operating system to wake up is similar to that in the foregoing embodiments and is not described herein again.

In some embodiments of the present disclosure, the controller is configured to: detect service information of the current operation service generated on the processor; and when it is detected that the matching degree between the service information and the first operating system is higher than a matching degree threshold, control the first operating system to run the current operation service on the basis of the processor.

In some embodiments of the present disclosure, the process that the controller determines a matching degree between an operation service and the first operating system is similar to that in the foregoing embodiments and is not described herein again.

In some embodiments of the present disclosure, the controller is configured to: detect a target response speed and/or a target resource occupation quantity of the current operation service, where the service information includes the target response speed and/or the target resource occupation quantity, the target response speed is a response speed that the processor needs to achieve for the current operation service, and the target resource occupation quantity is a resource quantity that the processor is required to provide for the current operation service; and when the target response speed is less than or equal to a speed threshold, and/or the target resource occupation quantity is less than or equal to an occupation quantity threshold, determine that the matching degree between the service information and the first operating system is greater than the matching degree threshold.

In some embodiments of the present disclosure, the process of processing service information by the controller is similar to that in the foregoing embodiments and is not described herein again.

In some embodiments of the present disclosure, the controller is further configured to control the first operating system to hibernate at the end of running.

In some embodiments of the present disclosure, the process that the controller controls the first operating system to hibernate is similar to that in the foregoing embodiments and is not described herein again.

In some embodiments of the present disclosure, the embedded system further includes a first service interaction thread running on the first operating system, and a second service interaction thread running on the second operating system. The first service interaction thread is configured to notify that the second service interaction thread is allowed to occupy a processor core used by the first operating system; and the second operating system is configured to, during the hibernation of the first operating system, add a target processor core used by the first operating system into a scheduling resource pool of the second operating system, where the scheduling resource pool includes processors other than the target processor core in the processor.

In some embodiments of the present disclosure, the process that the second operating system occupies the processor cores during the hibernation of the first operating system is similar to that in the foregoing embodiments and is not described herein again.

In some embodiments of the present disclosure, the embedded system further includes a service takeover thread running on the first operating system. The service takeover thread is configured to monitor operation services executed on the second operating system and take over an abnormal operation service when there is an abnormal operation service in the operation services executed on the second operating system.

In some embodiments of the present disclosure, the service takeover thread is deployed on the first operating system to monitor the operation services executed on the second operating system.

In some embodiments of the present disclosure, the process of monitoring the operation services executed on the second operating system is similar to that in the foregoing embodiments and is not described herein again.

In some embodiments of the present disclosure, the service takeover thread is configured to: receive a heartbeat signal of each operation service executed on the second operating system; and determine, as the abnormal operation service, the operation service in which the frequency of the heartbeat signal does not match a corresponding target frequency.

In some embodiments of the present disclosure, the process of monitoring, by the service takeover thread, the abnormal operation service through the frequency of the heartbeat signal is similar to that in the foregoing embodiments and is not described herein again.

In some embodiments of the present disclosure, the service takeover thread is further configured to: after the first operating system takes over the abnormal operation service, send a restart instruction to the second operating system, where the restart instruction is configured to indicate restart of the abnormal operation service.

In some embodiments of the present disclosure, the process that the service takeover thread controls the second operating system to restart the abnormal operation service is similar to that in the foregoing embodiments and is not described herein again.

In some embodiments of the present disclosure, the embedded system further includes a start booting component, configured to boot the starting of the first operating system, and boot the starting of the second operating system.

In some embodiments of the present disclosure, the start booting process of the plurality of operating systems is similar to that in the foregoing embodiments and is not described herein again.

Figure 14:
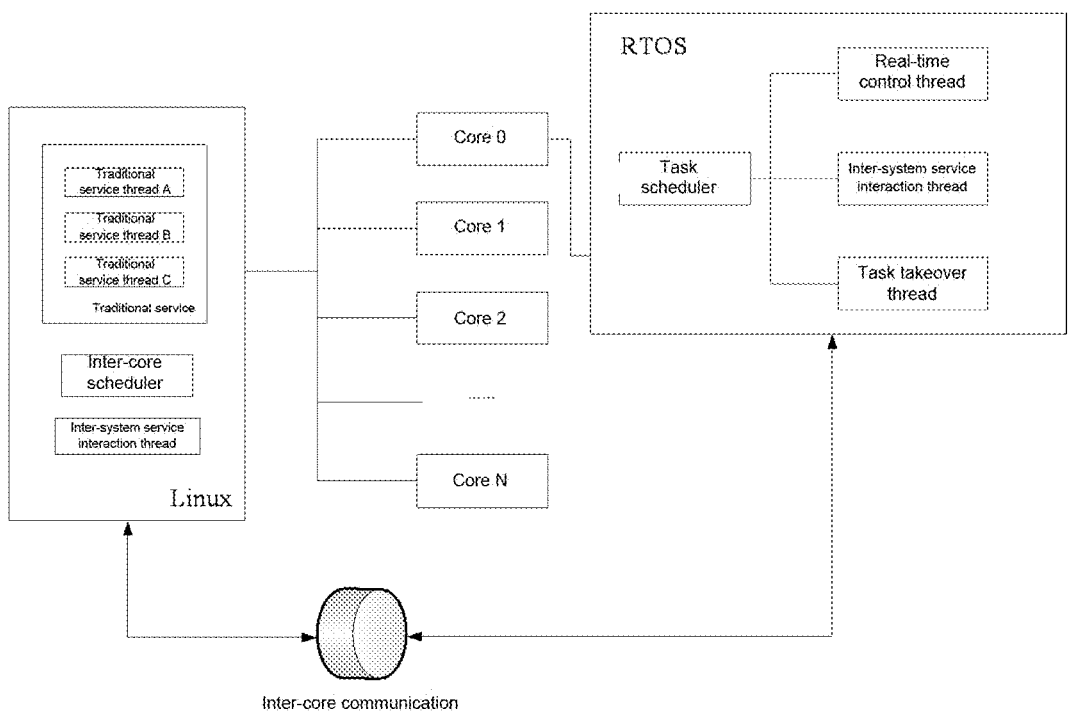
FIG. 14 is a schematic diagram of a service management process in an embedded system according to an implementation of the present disclosure.

Some embodiments of the present disclosure further provide a process of service management in an embedded system. For example, the first operating system is an RTOS, and the second operating system is Linux. FIG. 14 is a schematic diagram of a service management process in an embedded system according to an implementation of the present disclosure. As shown in FIG. 14, the processor of the embedded system is deployed with n+1 CPU cores, which respectively are Core 0, Core 1, . . . , and Core n. Core 0 is allocated to the RTOS; Core 1 to Core n are allocated to the Linux; Core 0 is a dynamically-configurable CPU core, that is, the RTOS may release Core 0 in certain cases described above, so as to be scheduled and used by the Linux; and the Linux may also occupy Core 0 under a certain mechanism, and schedules the resources of Core 0 to run own tasks.

The RTOS may include a task scheduler and various threads (for example, a real-time control thread, a task management thread, and an inter-system service interaction threads). The task scheduler is configured to schedule and manage the threads; and the scheduling of the threads may be performed in a round-robin manner or a thread priority manner.

Figure 15:
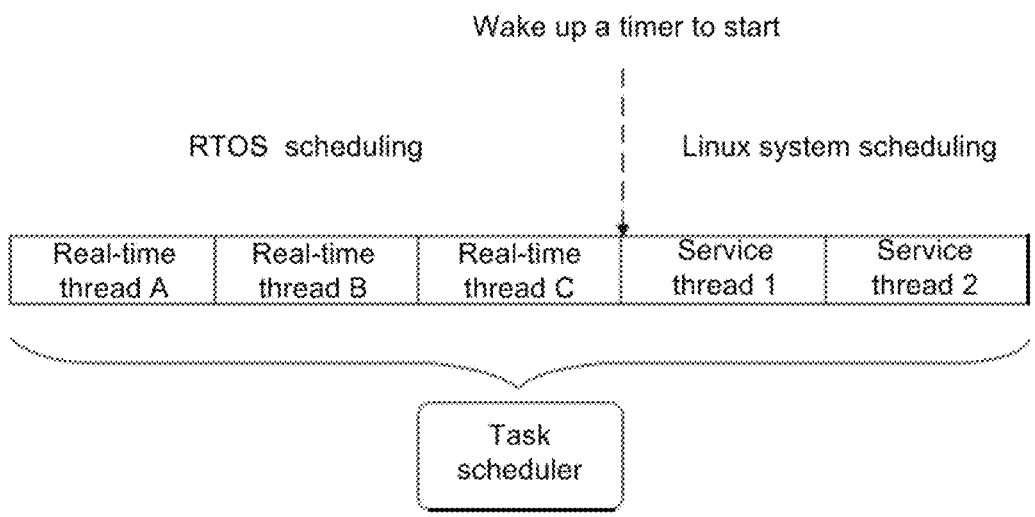
FIG. 15 is a schematic diagram of a task scheduling process according to an implementation of the present disclosure.

FIG. 15 is a schematic diagram of a task scheduling process according to an implementation of the present disclosure. As shown in FIG. 15, the task scheduler allocates time slices for the real-time threads when using the round-robin manner. For example, the time slices are respectively allocated for the real-time thread A, the real-time thread B, and the real-time thread C. The time slices after the real-time thread C belong to a null scheduling state. The task scheduler may wake up a timer to start. The time slices after the real-time thread C are allocated to the Linux, and the Linux occupies Core 0 by scheduling a service thread 1 and a service thread 2.

The real-time control thread is configured to process the high real-time thread in the RTOS. The task takeover thread is mainly designed to ensure the robustness of the system and the continuity of the services. Once the Linux fails to run traditional service threads due to an error for some reason, the RTOS takes over the service through the task takeover thread, and then the Linux is reset; and the service is returned to the Linux again after the Linux run normally. The inter-system service interaction thread is then configured to achieve inter-core communication functions between the RTOS and the Linux.

The Linux system includes the traditional service thread, an inter-core scheduler, the inter-system service interaction thread, etc. The traditional service thread is configured to process a large number of complex non-real-time services in the system (such as the traditional service thread A, the traditional service thread B, and the traditional service thread C). The inter-core scheduler is configured to complete the occupation and scheduling of Core 0. The inter-system service interaction thread is configured to achieve the communication between the Linux and the RTOS.

The embedded system may, but is not limited to, use the following running processes.

At step a, a system is powered on; the RTOS is first booted to start; then the Linux system is booted to start; and the RTOS occupies a CPU core 0, and the Linux system occupies Core 1 to Core n.

At step b, after the RTOS starts, the task scheduler allocates the time slices to the threads that need to be scheduled according to a round-robin time slice policy; if there are free time slices, the time slices are recorded in a free time slice chain table and configured to wake up a register (i.e., the timer); otherwise, no free time slice recording or wake-up register operation is performed.

At step c, the RTOS system starts the inter-system service interaction thread, waits for an interaction process, and uses the above inter-core communication mechanism for actual interaction.

At step d, the Linux system starts normally, and traditional services are scheduled, while the inter-core scheduler and the task takeover thread are in a silent state.

At step e, the Linux system starts the inter-core scheduler; the start process involves two scenarios; the first scenario is that, when the RTOS task scheduler finds that there is no thread to be scheduled in a scheduling period, an inter-core interrupt of Core 0 is released to the Linux system, the RTOS pushes the running data into a stack and then enters the hibernation state; the above interrupt triggers the Linux to start the inter-core scheduler; when receiving the interrupt, the scheduler notifies the Linux system to take over the Core 0 and a component responsible for scheduling balancing in the Linux allocates the threads to Core 0 for scheduling. The second scenario is that, when the Linux system detects that a CPU occupation rate is too high, the Linux inter-core scheduler is started and the inter-core interrupt that occupies Core 0 is triggered to the RTOS; after receiving the interrupt, the RTOS pushes the running data into the stack and then enters the hibernation state; and at the same time, the Linux system takes over Core 0 for scheduling.

At step f, once the Linux system has an error for some reason and causes the traditional service thread to be unable to run, the RTOS takes over the service through the task takeover thread, then the Linux system is reset, and when the Linux system runs normally, the Linux system returns the taken over service to the Linux system.

By means of the running process of the embedded system, parallel management and control are performed on the plurality of operating systems in the embedded system; by using the RTOS to replace traditional hardware devices, such as a CPLD, an EC chip and a real-time control chip, real-time management control of the embedded system is realized. The current situation that the real-time service processing capability of a traditional embedded system is insufficient is effectively improved by using a general embedded system and an embedded heterogeneous system architecture of the RTOS. Meanwhile, by allocating real-time sensitivity tasks of the traditional embedded system to the RTOS, the workload of the traditional embedded system is significantly reduced, and the running efficiency of the system is improved. In addition, the hibernation and wake-up policies of the CPU core 0 enable the embedded CPU arithmetic power to be fully utilized, such that the utilization of CPU resources in the embedded system is effectively improved. In addition, using the RTOS to replace the traditional hardware logic devices such as the CPLD, the EC chip, and the real-time control chip, the most direct benefit is the savings of hardware costs. In addition, because of software implementation, compared with the traditional implementation based on hardware devices, higher flexibility and expansion capabilities are achieved.

Figure 16:
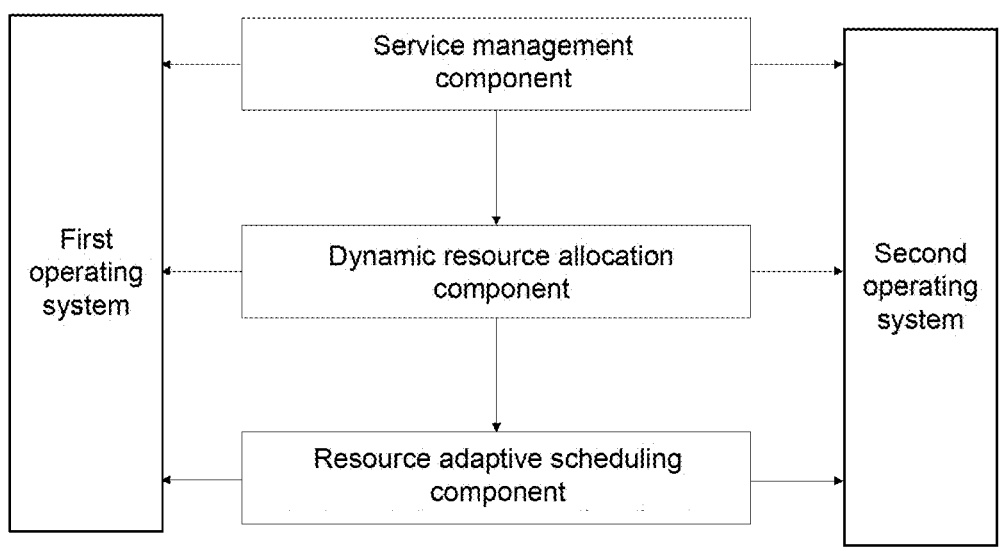
FIG. 16 is a schematic diagram II of an embedded system according to an embodiment of the present disclosure.

Another aspect of an embodiment of the present disclosure further provides another embedded system. The embedded system may run on the BMC chip. FIG. 16 is a schematic diagram II of an optional embedded system according to an embodiment of the present disclosure. As shown in FIG. 16, the embedded system may include a first operating system, a second operating system, a service management component, a dynamic resource allocation component, and a resource adaptive scheduling component.

The first operating system and the second operating system run on a processor, and the response speed of the first operating system is higher than that of the second operating system.

The service management component is configured to allocate a group of services to be allocated to the corresponding operating systems according to a dynamic resource allocation rule. The dynamic resource allocation rule includes performing dynamic resource allocation according to at least one of the following: the service response speed, or the service resource occupation rate.

The dynamic resource allocation component is configured to determine a resource allocation result corresponding to the group of services to be allocated. The resource allocation result is configured to indicate the processing resource corresponding to each service to be allocated in the group of services to be allocated in the processing resources of the processor. The processing resources of the processor include processor cores.

The resource adaptive scheduling component is configured to allocating the processing resources of the processor to the first operating system and the second operating system according to the operating system corresponding to each service to be allocated and the resource allocation result.

In some embodiments of the present disclosure, the first operating system and the second operating system may be similar to those in the foregoing embodiments and are not described herein again. The service management component, the dynamic resource allocation component, and the resource adaptive scheduling component may be software components running under the first operating system or the second operating system. By performing component division, the development and maintenance of different functional components may be facilitated, and at the same time, the flexibility of resource allocation may be improved by flexibly setting the dynamic resource allocation rule.

Through the embedded system, by allocating the processing resources of the processor to the first operating system or the second operating system, the problem of low overall utilization rate of core resources due to the idle state of most of the processing resources of the multi-core processor in the related art is solved, thereby improving the utilization rate of the processing resources.

Some embodiments of the present disclosure further provide an apparatus for controlling running of an operating system. The apparatus is configured to implement the above embodiments and the optional embodiments, and what has been described will not be described again. As used below; the term "component" may be a combination of software and/or hardware that implements a predetermined function. Although the apparatus described in the following embodiments is implemented in software, but implementations in hardware, or a combination of software and hardware, are also possible and conceived.

Figure 17:
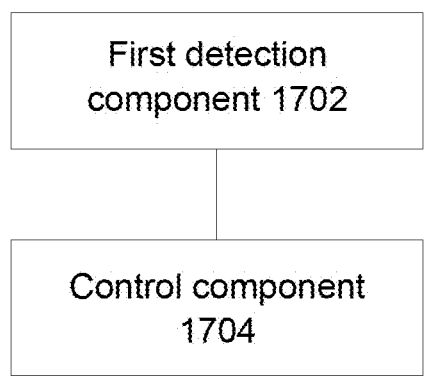
FIG. 17 is a structural block diagram of a apparatus for controlling running of an operating system according to an embodiment of the present disclosure.

FIG. 17 is a structural block diagram of an apparatus for controlling running of an operating system according to an embodiment of the present disclosure. As shown in FIG. 17, the apparatus includes a first detection component and a control component.

The first detection component 1702 is configured to detect a running state of a first operating system during running. The first operating system and a second operating system run on the basis of a processor.

The control component 1704 is configured to control, according to the running state, processor resources used by the first operating system.

By means of the apparatus, the first operating system and the second operating system run on the basis of the processor; the first detection component detects the running state of the first operating system during running; and the control component controls, according to the running state, the processor resources used by the first operating system. Since both the first operating system and the second operating system run on the basis of the same processor, addition and deployment of hardware devices are avoided, system costs are reduced, and the processor resources used by the operating system may be controlled during the running of the operating system, such that the processor resources may be rationally used to support the running between systems. Therefore, the technical problem of low running efficiency of the operating system may be solved, thereby achieving the technical effect of improving the running efficiency of the operating system.

In some embodiments of the present disclosure, the first detection component is configured to perform at least one of the following operations.

A service state of a target operation service run by the first operating system on the basis of the processor is detected, and the running state includes the service state.

The system state of the first operating system is detected. The running state includes the system state, and the first operating system runs on the basis of a target processor core in the processor.

In some embodiments of the present disclosure, the first detection component is configured to perform at least one of the following operations.

The target operation service is released when it is detected that the service state is a target service state. The processor resources include the target operation service. The second operating system is configured to run the target operation service.

The target processor core is released when it is detected that the system state is the target system state. The processor resources include the target processor core. The second operating system is configured to add the target processor core into a scheduling resource pool of the second operating system. The scheduling resource pool includes a processor core in the processor that is allocated for the second operating system.

In some embodiments of the present disclosure, the apparatus further includes a first determination component and a second determination component.

The first determination component is configured to, when a first interrupt request sent to the first operating system by the second operating system is acquired, determine that the service state is detected as the target service state, where the first interrupt request is configured to request to take over the target operation service.

The second determination component is configured to, when a service attribute of the target operation service reaches a target service attribute, determine that the service state is detected as the target service state.

In some embodiments of the present disclosure, the first detection component is configured to perform the following operations.

In response to the first interrupt request, whether the target operation service is taken over by the second operating system is determined.

Insofar as the target hardware controller is taken over by the second operating system, the target operation service is released.

In some embodiments of the present disclosure, the apparatus further includes a first sending component.

The first sending component is configured to, after whether the target operation service is taken over by the second operating system is determined, insofar as the target operation service is not taken over by the second operating system, send a second interrupt request to the second operating system. The second interrupt request is configured to indicate rejection of the second operating system to take over the target operation service.

In some embodiments of the present disclosure, the apparatus further includes a second sending component.

The second sending component is configured to, when it is detected that the service state is a target service state, and after a target operation service is released, send a third interrupt request to the second operating system. The third interrupt request is configured to indicate that the target operation service has been released. The second operating system is configured to run the target operation service in response to the third interrupt request.

In some embodiments of the present disclosure, the apparatus further includes a third determination component and a fourth determination component.

The third determination component is configured to, when a fourth interrupt request sent to the first operating system by the second operating system is acquired, determine that the system state is detected as the target system state, where the fourth interrupt request is configured to request to occupy the target processor core.

The fourth determination component is configured to, when a system attribute of the first operating system reaches a target system attribute, determine that the system state is detected as the target system state.

In some embodiments of the present disclosure, the third determination component is configured to perform the following operations.

In response to the fourth interrupt request, whether the target processor core is occupied by the second operating system is determined.

Insofar as the target processor core is occupied by the second operating system, the target processor core is released.

In some embodiments of the present disclosure, the apparatus further includes a third sending component.

The third sending component is configured to, after whether the target processor core is not occupied by the second operating system is determined, and insofar as the target processor core is not occupied by the second operating system, send a fifth interrupt request to the second operating system. The fifth interrupt request is configured to indicate rejection of the second operating system to occupy the target processor core.

In some embodiments of the present disclosure, the apparatus further includes a fourth sending component.

The fourth sending component is configured to, when it is detected that the system state is a target system state, and after the target processor core is released, send a sixth interrupt request to the second operating system. The sixth interrupt request is configured to indicate that the first operating system has released the target processor core. The second operating system is configured to add the target processor core into the scheduling resource pool in response to the sixth interrupt request.

In some embodiments of the present disclosure, the apparatus further includes a second detection component and a running component.

The second detection component is configured to, when a target processor core in the processor has been added into a scheduling resource pool of the second operating system and the first operating system is woken up for running, detect whether the target processor core is released, where the scheduling resource pool includes a processor core in the processor that is allocated for the second operating system.

The second detection component is configured to, insofar as the second operating system has released the target processor core when the first operating system is woken up, run the first operating system on the basis of the target processor core.

In some embodiments of the present disclosure, the apparatus further includes a fifth sending component.

The fifth sending component is configured to, after whether the target processor core is released is detected, and when it is detected that the target processor core is not released, send a seventh interrupt request to the second operating system. The seventh interrupt request is configured to request the second operating system to release the target processor core. The second operating system is configured to release the target processor core in response to the seventh interrupt request.

In some embodiments of the present disclosure, the apparatus further includes an acquisition component, a storage component, and a sixth sending component.

The acquisition component is configured to acquire service data generated in the process that the first operating system runs on the basis of the processor.

The storage component is configured to store the service data to a storage space on the processor.

The sixth sending component is configured to send an eighth interrupt request to the second operating system. The eighth interrupt request is configured to request the second operating system to read the service data from the storage space; and the second operating system is configured to read the service data from the storage space in response to the eighth interrupt request.

In some embodiments of the present disclosure, the apparatus further includes a first control component, a response component, and a second control component.

The first control component is configured to control the first operating system to run on the basis of the periodicity of the processor.

The response component is configured to, in response to a received wake-up request, control the first operating system to run on the basis of the processor.

The second control component is configured to, according to a matching degree between an operation service generated on the processor and the first operating system, control the first operating system to run on the basis of the processor.

In some embodiments of the present disclosure, the second control component is configured to perform the following operations.

Service information of the current operation service generated on the processor is detected.

When it is detected that the matching degree between the service information and the first operating system is higher than a matching degree threshold, the first operating system is controlled to run the current operation service on the basis of the processor.

In some embodiments of the present disclosure, the second control component is configured to perform the following operations.

A target response speed and/or a target resource occupation quantity of the current operation service is detected. The service information includes the target response speed and/or the target resource occupation quantity, the target response speed is a response speed that the processor needs to achieve for the current operation service, and the target resource occupation quantity is a resource quantity that the processor is required to provide for the current operation service.

When the target response speed is less than or equal to a speed threshold, and/or the target resource occupation quantity is less than or equal to an occupation quantity threshold, it is determined that the matching degree between the service information and the first operating system is greater than the matching degree threshold.

In some embodiments of the present disclosure, the apparatus further includes a third control component.

The third control component is configured to control the first operating system to hibernate at the end of running.

In some embodiments of the present disclosure, the apparatus further includes a notification component.

The notification component is configured to, after the first operating system is controlled to hibernate at the end of running, notify that the second operating system is allowed to occupy the processor cores used by the first operating system. The second operating system is configured to, during the hibernation of the first operating system, add a target processor core used by the first operating system into a scheduling resource pool of the second operating system, and the scheduling resource pool includes processors other than the target processor core in the processor.

In some embodiments of the present disclosure, the apparatus further includes a monitoring component and a takeover component.

The monitoring component is configured to monitor operation services executed on the second operating system.

The takeover component is configured to, when it is monitored that there is an abnormal operation service in the operation services executed on the second operating system, take over the abnormal operation service by the first operating system.

In some embodiments of the present disclosure, the monitoring component is configured to perform the following operations.

A heartbeat signal of each operation service executed on the second operating system is received.

The operation service in which the frequency of the heartbeat signal does not match a corresponding target frequency is determined as the abnormal operation service.

In some embodiments of the present disclosure, the apparatus further includes a seventh sending component.

The seventh sending component is configured to, after the first operating system takes over the abnormal operation service, send a restart instruction to the second operating system, where the restart instruction is configured to indicate restart of the abnormal operation service.

In some embodiments of the present disclosure, the apparatus further includes a first booting component and a second booting component.

The first booting component is configured to boot the first operating system to start.

The second booting component is configured to boot the second operating system to start.

It is to be noted that, each of the above components may be implemented by software or hardware. For the latter, it may be implemented in the following manners, but is not limited to the follow; the above components are all located in a same processor; or the above components are located in different processors in any combination.

An embodiment of the present disclosure further provides a chip. The chip includes a programmable logic circuit and at least one of executable instructions. The chip runs in an electronic device and is configured to implement steps in any one of the above method embodiments.

An embodiment of the present disclosure further provides a BMC chip. The BMC chip may include a storage unit and a processing unit connected to the storage unit. The storage unit is configured to store a program; and the processing unit is configured to run the program to execute steps in any one of the above method embodiments.

An embodiment of the present disclosure further provides a mainboard. The mainboard includes at least one processor; and at least one memory, configured to store at least one program. When the at least one program is performed by the at least one processor, the at least one processor is enabled to implement steps in any one of the above method embodiments.

An embodiment of the present disclosure further provides a server, which includes a processor, a communication interface, a memory, and a communication bus. The processor, the communication interface, and the memory communicate with each other by means of the communication bus. The memory is configured to store a computer program. The processor is configured to implement steps in any one of the above method embodiments when executing the program stored in the memory, so as to achieve the same technical effect.

The communication bus of the server may be a Peripheral Component Interconnect (PCI) bus or an Extended Industry Standard Architecture (EISA) bus, etc. The communication bus may be divided into an address bus, a data bus, a control bus, and the like. The communication interface is configured to achieve communication between the server and other devices.

The memory may include an RAM, or may include a Non-Volatile Memory (NVM), such as at least one disk memory. In some embodiments of the present disclosure, the memory may also be at least one storage apparatus located remotely from the foregoing processor. The above processor may be a general processor, including a Central Processing Unit (CPU) and a Network Processor (NP), or may be a Digital Signal Processor (DSP), an Application Specific Integrated Circuit (ASIC), a Field-Programmable Gate Array (FPGA) or other programmable logic devices, discrete gate or transistor logic devices, and discrete hardware components.

For the server, the server is at least highly scalable and stable. As the enterprise network is not possible to remain unchanged for a long time, for the network information technology today, if the server does not have certain extendibility, the future development of the enterprise is affected to impact the use of the enterprise, such that the extendibility is to become the most basic characteristics, later better utilization may be guaranteed when higher extendibility is realized. In addition to hardware extendibility, the extendibility also includes software extendibility, because the functions of the server are still very complex compared with a computer, it is important not only in the hardware configuration, but also in software configuration. Trying to achieve more functionality is also unthinkable without full software support.

In addition, since the server needs to process a large amount of data to support the continuous running of the services, the server also has a very important feature, namely, high stability, and if data transmission of the server may not run stably, it will undoubtedly have a great impact on the services.

According to the solutions of the present disclosure, the processing resources used by the first operating system are controlled according to the detected running state of the first operating system during running, such that the server may rationally allocate the processor resources, so as to rely on the allocated resources to perform more rational performance extension. In addition, according to the operation services allocated for the first operating system and/or the control of the running of the first operating system by the processor cores, the server is enabled to perform rational scheduling and control whether it extends the software resources or extends the hardware resources, thereby improving the extendibility of the server. In addition, through the rational scheduling of the processor resources and the operating systems, the running of the server may be more stable, thereby improving the stability of the server.

An embodiment of the present disclosure further provides a non-transitory readable storage medium. The non-transitory readable storage medium stores a computer program. Steps in any one of the above method embodiments are executed when the computer program is configured to run.

In some embodiments of the present disclosure, the non-transitory readable storage medium may include, but is not limited to, a USB flash disk, a Read-Only Memory (ROM), a Random Access Memory (RAM), and various media that may store computer programs, such as a mobile hard disk, a magnetic disk, or an optical disk.

An embodiment of the present disclosure further provides an electronic device. The electronic device includes a memory and a processor. The memory is configured to store a computer program. The processor is configured to run the computer program to execute steps in any one of method embodiments described above.

In some embodiments of the present disclosure, the electronic device may further include a transmission device and an input/output device. The transmission device is connected to the processor. The input/output device is connected to the processor.

For some examples in the embodiments of the present disclosure, refer to the examples described in the foregoing embodiments and the exemplary implementations, and this embodiment will not be repeated thereto.

It is apparent that those skilled in the art should understand that the above-mentioned components or steps of this application may be implemented by a general computing device and may also be gathered together on a single computing device or distributed in network composed of multiple computing devices. The above mentioned components or steps of this application may be implemented with program codes executable by the computing device, so that may be stored in a storage device for execution by the computing device, and in some cases, the steps shown or described may be performed in a different sequence than herein, or may be fabricated into individual integrated circuit components respectively, or multiple components or steps thereof are fabricated into a single integrated circuit component for implementation. In this way, this application is not limited to any specific combination of hardware and software.

The above are only the optional embodiments of this application and are not intended to limit this application. For those skilled in the art, this application may have various modifications and variations. Any modifications, equivalent replacements, improvements and the like made within the principle of this application shall fall within the scope of protection of this application.

The invention claimed is:

1. An embedded system, comprising a chip and at least two operating systems, wherein
    the chip comprises a processor, a hardware controller, a first bus, and a second bus, wherein a bandwidth of the first bus is higher than a bandwidth of the second bus, the first bus is configured as a multi-master and multi-slave mode, and the second bus is configured as a one-master and multi-slave mode;
    the at least two operating systems are configured to run on the basis of the processor;
    the at least two operating systems are configured to communicate with each other by the first bus; and
    the at least two operating systems are configured to control the hardware controller by the second bus;
    wherein the at least two operating systems comprise a first operating system and a second operating system; the first operating system is configured to control, on the basis of the processor, a target hardware controller to run a target operation service; the first operating system is configured to release the target hardware controller by the second bus in response to the target operation service running to a target service state; and the second operating system is configured to control, by the second bus, the target hardware controller to run the target operation service.

2. The embedded system as claimed in claim 1, wherein the second operating system is configured to send a first interrupt request to the first operating system by the first bus, wherein the first interrupt request is configured to request to take over the target hardware controller; the first operating system is configured to release the target hardware controller by the second bus in response to the first interrupt request; or
    the first operating system is configured to release the target hardware controller by the second bus in response to a service attribute of the target operation service reaching a target service attribute.

3. The embedded system as claimed in claim 2, wherein the first operating system is configured to determine, in response to the first interrupt request, whether the target hardware controller is taken over by the second operating system; and
    insofar as the target hardware controller is taken over by the second operating system, the first operating system is configured to release the target hardware controller by the second bus.

4. The embedded system as claimed in claim 3, wherein insofar as the target hardware controller is not taken over by the second operating system, the first operating system is configured to send a second interrupt request to the second operating system by the first bus, wherein the second interrupt request is configured to indicate rejection of the second operating system to take over the target hardware controller.

5. The embedded system as claimed in claim 1, wherein
the first operating system is configured to send a third interrupt request to the second operating system, wherein the third interrupt request is configured to indicate that the first operating system has released the target hardware controller; and
in response to the third interrupt request, the second operating system is configured to control, by the second bus, the target hardware controller to run the target operation service.

6. The embedded system as claimed in claim 1, wherein the at least two operating systems comprise a first operating system and a second operating system;
the first operating system is configured to run on the basis of a target processor core in the processor;
the first operating system is configured to release the target processor core in response to the first operating system running to a target system state; and
the second operating system is configured to add the target processor core into a scheduling resource pool of the second operating system, wherein the scheduling resource pool comprises a processor core in the processor that is allocated for the second operating system;
the second operating system is configured to send a fourth interrupt request to the first operating system by the first bus, wherein the fourth interrupt request is configured to request to occupy the target processor core;
the first operating system is configured to release the target processor core in response to the fourth interrupt request; or
the first operating system is configured to release the target processor core in response to a system attribute reaching a target system attribute;
the first operating system is configured to determine, in response to the fourth interrupt request, whether the target processor core is occupied by the second operating system; and
insofar as the target processor core is occupied by the second operating system, the first operating system is configured to release the target processor core;
insofar as the target processor core is not occupied by the second operating system, the first operating system is configured to send a fifth interrupt request to the second operating system by the first bus,
wherein the fifth interrupt request is configured to indicate rejection of the second operating system to occupy the target processor core.

7. The embedded system as claimed in claim 6, wherein
the first operating system is configured to send a sixth interrupt request to the second operating system, wherein the sixth interrupt request is configured to indicate that the first operating system has released the target processor core; and
the second operating system is configured to add, in response to the sixth interrupt request, the target processor core into the scheduling resource pool.

8. The embedded system as claimed in claim 1, wherein the at least two operating systems comprise a first operating system and a second operating system; and
a target processor core in the processor has been added into a scheduling resource pool of the second operating system, wherein the scheduling resource pool comprises a processor core in the processor that is allocated for the second operating system;
the second operating system is configured to release the target processor core in response to the first operating system being woken up; and
the first operating system is configured to run on the basis of the target processor core;
the second operating system is configured to release the target processor core in response to that it is detected that the first operating system is woken up; or
the first operating system is configured to send a seventh interrupt request to the second operating system in response to the first operating system being woken up, wherein the seventh interrupt request is configured to request the second operating system to release the target processor core; and
the second operating system is configured to release the target processor core in response to the seventh interrupt request.

9. The embedded system as claimed in claim 1, wherein the at least two operating systems comprise a first operating system and a second operating system; the chip further comprises a storage space, and the at least two operating systems control the storage space by the first bus;
the first operating system is configured to generate service data during running on the basis of the processor;
the first operating system is configured to store the service data to the storage space by the first bus, and send an eighth interrupt request to the second operating system by the first bus, wherein the eighth interrupt request is configured to request the second operating system to read the service data from the storage space; and
the second operating system is configured to read the service data from the storage space in response to the eighth interrupt request.

10. The embedded system as claimed in claim 1, wherein the at least two operating systems comprise a first operating system and a second operating system,
the first operating system is configured to run on the basis of a periodicity of the processor; or
the first operating system is configured to run on the basis of the processor in response to a received wake-up request; or
the first operating system is configured to run on the basis of the processor according to a matching degree between a current operation service generated on the processor and the first operating system;
the first operating system is configured to hibernate at an end of running; and
during a hibernation of the first operating system, the second operating system is configured to add a target processor core used by the first operating system into a scheduling resource pool of the second operating system, wherein the scheduling resource pool comprises processors other than the target processor core in the processor.

11. The embedded system as claimed in claim 1, wherein
the at least two operating systems are configured to communicate with each other by a communication protocol deployed by the first bus; or
the at least two operating systems are configured to communicate with each other by the first bus, the second bus, and a communication hardware controller in the hardware controller;
the at least two operating systems are configured to communicate with each other by sending an Inter-Processor Interrupt (IPI) request through the first bus; or
one of the at least two operating systems is configured to send a system interrupt request to the first bus; the first bus is configured to forward the system interrupt request to the second bus; the second bus is configured to send the system interrupt request to a mailbox hardware component controlled by the communication hardware controller; and the mailbox hardware component is configured to send the system interrupt request to the other one of the at least two operating systems by the second bus and the first bus.

12. The embedded system as claimed in claim 1, wherein the at least two operating systems comprise a first operating system and a second operating system; and the first operating system is configured to monitor, by the first bus, operation services executed on the second operating system; and the first operating system is configured to take over an abnormal operation service by the first bus in response to that there is an abnormal operation service in the operation services executed on the second operating system;

the first operating system is configured to receive, by the first bus, heartbeat signals of the operation services executed on the second operating system; and the first operating system is configured to take over, by the first bus, the abnormal operation service in which a frequency of the heartbeat signal does not match a corresponding target frequency; or after taking over the abnormal operation service, the first operating system is configured to send a restart instruction to the second operating system by the first bus, wherein the restart instruction is configured to indicate restart of the abnormal operation service.

13. The embedded system as claimed in claim 1, wherein the chip further comprises a memory, and the memory stores a start booting component; and the chip is configured to run the start booting component after being powered on, so as to boot one of the at least two operating systems to start, and the start booting component is configured to guide another operating system in the at least two operating systems to start.

14. The embedded system as claimed in claim 1, wherein the at least two operating systems comprise a first operating system and a second operating system; and the first operating system is configured to control, on the basis of the processor, a target hardware controller to run a target operation service; the first operating system is configured to release the target hardware controller by the second bus in response to the target operation service running to a target service state; the second operating system is configured to control, by the second bus, the target hardware controller to run the target operation service;

the first operating system is configured to run on the basis of a target processor core in the processor;

the first operating system is configured to release the target processor core in response to the first operating system running to a target system state; the second operating system is configured to add the target processor core into a scheduling resource pool of the second operating system, wherein the scheduling resource pool comprises a processor core in the processor that is allocated for the second operating system;

the chip is further configured to comprise a storage space, and the at least two operating systems are configured to control the storage space by the first bus; the first operating system is configured to generate service data during running on the basis of the processor; the first operating system is configured to store the service data to the storage space by the first bus, and send an eighth interrupt request to the second operating system by the first bus, wherein the eighth interrupt request is configured to request the second operating system to read the service data from the storage space;

and the second operating system is configured to read the service data from the storage space in response to the eighth interrupt request.

15. The embedded system as claimed in claim 1, wherein the at least two operating systems comprise a first operating system and a second operating system; and the chip is configured to load a communication value to the first bus, and the first bus is configured to send a communication signal carrying the communication value to a communication register corresponding to the second operating system, so as to realize communication between the first operating system and the second operating system, wherein the communication value is configured to indicate communication content between the first operating system and the second operating system; or the chip is configured to load a control value to the second bus, and the second bus is configured to send a control signal carrying the control value to a register corresponding to the hardware controller, so as to realize control of the hardware controller by operating systems, wherein the control value is configured to indicate control content of the operating systems over the hardware controller.

16. An embedded system, comprising a first operating system, a second operating system, a controller, and a processor, wherein the first operating system and the second operating system run on the basis of the processor; and the controller is configured to detect a running state of the first operating system during running, and control, according to the running state, processor resources used by the first operating system;

the first operating system is configured to control, on the basis of the processor, a target hardware controller to run a target operation service; the first operating system is configured to release the target hardware controller by the second bus in response to the target operation service running to a target service state; and the second operating system is configured to control, by the second bus, the target hardware controller to run the target operation service.

17. The embedded system as claimed in claim 16, wherein the controller is configured to perform at least one of the following:

detect a service state of a target operation service run by the first operating system on the basis of the processor, wherein the running state comprises the service state; and detect a system state of the first operating system, wherein the running state comprises the system state, and the first operating system runs on the basis of a target processor core in the processor;

the controller is configured to release the target operation service in response to that it is detected that the service state is a target service state, wherein the processor resources comprise the target operation service; the second operating system is configured to run the target operation service;

and/or the controller is configured to release the target processor core in response to that it is detected that the system state is a target system state, wherein the processor resources comprise the target processor core; and the second operating system is configured to add the target processor core into a scheduling resource pool of the second operating system, wherein the scheduling resource pool comprises a processor core in the processor that is allocated for the second operating system;

the embedded system further comprises a first service interaction thread running on the first operating system, and a second service interaction thread running on the second operating system, wherein the controller is configured to determine, in response to that a first interrupt request sent to the first service interaction thread by the second service interaction thread is acquired, that the service state is detected as the target service state, wherein the first interrupt request is configured to request to take over the target operation service; or the controller is configured to determine, in response to that a service attribute of the target operation service reaches a target service attribute, that the service state is detected as the target service state;

the controller is configured to: in response to the first interrupt request, determine whether the target operation service is taken over by the second operating system; and insofar as the target operation service is taken over by the second operating system, release the target operation service;

the embedded system further comprises a first service interaction thread running on the first operating system, and a second service interaction thread running on the second operating system, wherein the first service interaction thread is configured to, insofar as the target operation service is not taken over by the second operating system, send a second interrupt request to the second service interaction thread, wherein the second interrupt request is configured to indicate rejection of the second operating system to take over the target operation service.

18. A method for controlling running of an operating system, comprising:

detecting a running state of a first operating system during running, wherein the first operating system and a second operating system run on the basis of a processor; and controlling, according to the running state, processor resources used by the first operating system;

the first operating system is configured to control, on the basis of the processor, a target hardware controller to run a target operation service; the first operating system is configured to release the target hardware controller by the second bus in response to the target operation service running to a target service state; and the second operating system is configured to control, by the second bus, the target hardware controller to run the target operation service.

19. The method as claimed in claim 18, wherein detecting the running state of the first operating system during running comprises at least one of the following:

detecting a service state of a target operation service run by the first operating system on the basis of the processor, wherein the running state comprises the service state;

detecting a system state of the first operating system, wherein the running state comprises the system state, and the first operating system runs on the basis of a target processor core in the processor;

wherein controlling, according to the running state, the processor resources used by the first operating system comprises at least one of the followings: releasing the target operation service in response to that it is detected that the service state is a target service state, wherein the processor resources comprise the target operation service; the second operating system is configured to run the target operation service; or releasing the target processor core in response to that it is detected that the system state is a target system state, wherein the processor resources comprise the target processor core; and the second operating system is configured to add the target processor core into a scheduling resource pool of the second operating system, wherein the scheduling resource pool comprises a processor core in the processor that is allocated for the second operating system;

the method further comprising: in response to that a first interrupt request sent to the first operating system by the second operating system is acquired, determining that the service state is detected as the target service state, wherein the first interrupt request is configured to request to take over the target operation service; or in response to that a service attribute of the target operation service reaches a target service attribute, determining that the service state is detected as the target service state;

wherein releasing the target operation service in response to that it is detected that the service state is the target service state comprises: in response to the first interrupt request, determining whether the target operation service is taken over by the second operating system; and insofar as a target hardware controller is taken over by the second operating system, releasing the target operation service.

* * * * *